United States Patent
Freeman et al.

(10) Patent No.: US 11,741,639 B2
(45) Date of Patent: Aug. 29, 2023

(54) LOCATING AND AUGMENTING OBJECT FEATURES IN IMAGES

(71) Applicant: HOLITION LIMITED, London (GB)

(72) Inventors: Russell Freeman, London (GB); Maria Jose Garcia Sopo, London (GB); Tereza Drskova, London (GB)

(73) Assignee: HOLITION LIMITED, London (GB)

( * ) Notice: Subject to any disclaimer, the term of this patent is extended or adjusted under 35 U.S.C. 154(b) by 0 days.

(21) Appl. No.: 16/082,172

(22) PCT Filed: Mar. 2, 2017

(86) PCT No.: PCT/GB2017/050568
§ 371 (c)(1),
(2) Date: Sep. 4, 2018

(87) PCT Pub. No.: WO2017/149315
PCT Pub. Date: Sep. 8, 2017

(65) Prior Publication Data
US 2019/0122404 A1   Apr. 25, 2019

(30) Foreign Application Priority Data

Mar. 2, 2016 (GB) ..................................... 1603662
Mar. 2, 2016 (GB) ..................................... 1603665
May 13, 2016 (GB) ..................................... 1608424

(51) Int. Cl.
G06T 11/00 (2006.01)
G06T 7/246 (2017.01)
(Continued)

(52) U.S. Cl.
CPC ............ *G06T 11/001* (2013.01); *G06T 7/251* (2017.01); *G06T 11/60* (2013.01); *G06V 10/56* (2022.01);
(Continued)

(58) Field of Classification Search
None
See application file for complete search history.

(56) References Cited

U.S. PATENT DOCUMENTS 6,293,284 B1   9/2001   Rigg
7,110,000 B2 *  9/2006   Zhang ................... G06T 11/001
                                                         345/428
(Continued)

FOREIGN PATENT DOCUMENTS

EP   2615576 A1   7/2013
EP   2615577 A1   7/2013
(Continued)

OTHER PUBLICATIONS

GB Search Report issued in corresponding Patent Application No. GB1603662.6, dated Sep. 27, 2016, 2 pages.
(Continued)

*Primary Examiner* — Aaron M Richer
(74) *Attorney, Agent, or Firm* — Butzel Long; Donald J. Lecher

(57) ABSTRACT

A system and method of augmenting image data are described. In one embodiment, the method comprises receiving data of an image captured by a camera, the captured image including a region having a visible feature of an object, storing masking data defining a plurality of masks, each mask defining a respective masked portion of the region of the captured image, sampling pixel values at predefined locations of the captured image data, selecting at least one stored mask based on the sampled pixel values, modifying pixel values in the or each selected masked portion of the region of the captured image based on colourisation parameters, and outputting the captured image with the modified pixel values for display. In other embodiments pixel values of one or more identified regions of a face in a target image are modified based on the augmentation
(Continued)

characteristics derived from corresponding identified regions of a face in a source image.

14 Claims, 52 Drawing Sheets

(51) Int. Cl.
 *G06V 10/56* (2022.01)
 *G06V 40/16* (2022.01)
 *G06T 11/60* (2006.01)

(52) U.S. Cl.
 CPC .......... *G06V 40/161* (2022.01); *G06V 40/171* (2022.01); *G06T 2207/30201* (2013.01)

(56) References Cited

U.S. PATENT DOCUMENTS

| | | | |
|---|---|---|---|
| 8,433,107 | B1 | 4/2013 | Zhang |
| 2003/0223622 | A1 | 12/2003 | Simon |
| 2007/0237421 | A1 | 10/2007 | Luo |
| 2010/0214288 | A1 | 8/2010 | Xiao |
| 2012/0123759 | A1 | 5/2012 | Cho |
| 2012/0177288 | A1* | 7/2012 | Chaussat ............... G06T 11/001 382/165 |
| 2012/0275689 | A1* | 11/2012 | Birtwistle ............. G06T 11/001 382/154 |
| 2013/0169827 | A1 | 7/2013 | Santos |
| 2013/0314437 | A1 | 11/2013 | Fujiwara |
| 2015/0378968 | A1* | 12/2015 | Varadarajan .......... G06F 11/368 715/237 |

FOREIGN PATENT DOCUMENTS

| | | |
|---|---|---|
| EP | 2820970 A1 | 1/2015 |
| EP | 2821959 A1 | 1/2015 |
| EP | 2821966 A1 | 1/2015 |
| GB | 2517270 A | 2/2015 |
| JP | 2007257165 A | 10/2007 |
| WO | 2008102440 A1 | 8/2008 |
| WO | 2015127394 A1 | 8/2015 |

OTHER PUBLICATIONS

GB Search Report issued in corresponding Patent Application No. GB1603662.6, dated Aug. 10, 2016, 5 pages.
GB Search Report issued in corresponding Patent Application No. GB1603665.9, dated Aug. 10, 2016, 3 pages.
GB Search and Examination Report issued in corresponding Patent Application No. GB1608424.6, dated Nov. 17, 2016, 7 pages.

* cited by examiner

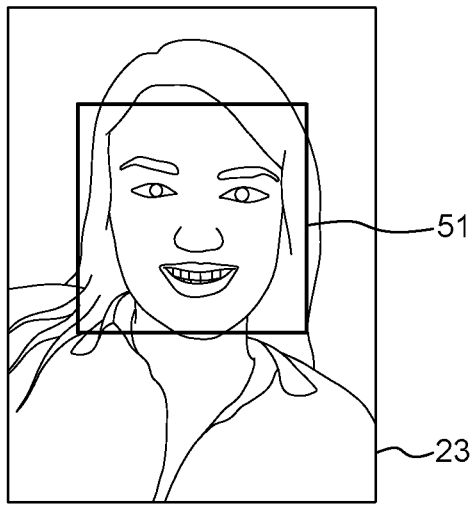
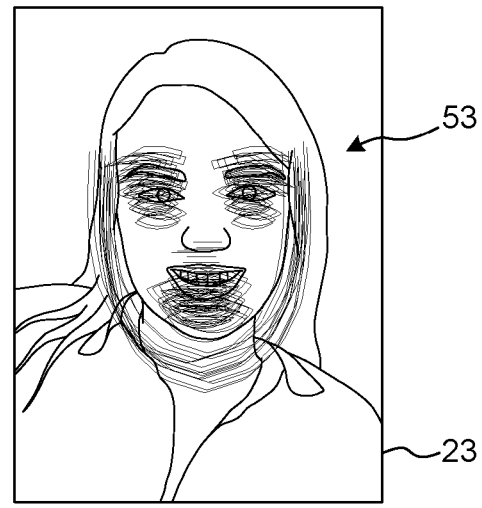
FIG. 12A    FIG. 12B
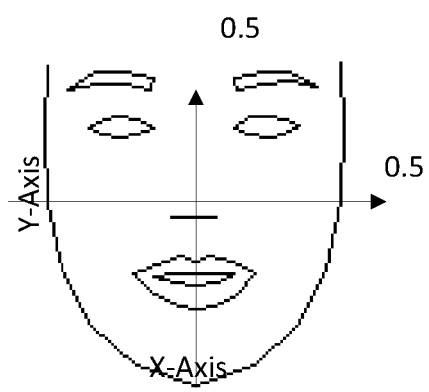
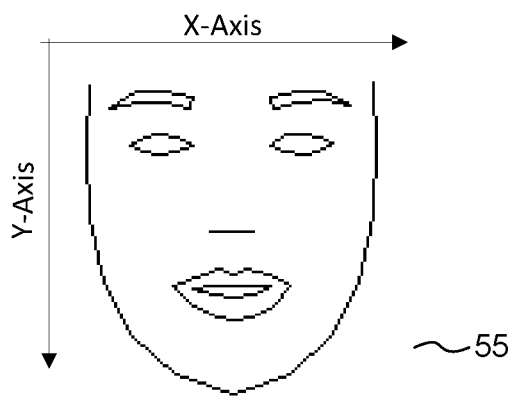
FIG. 12C    FIG. 12D

FIG. 18E
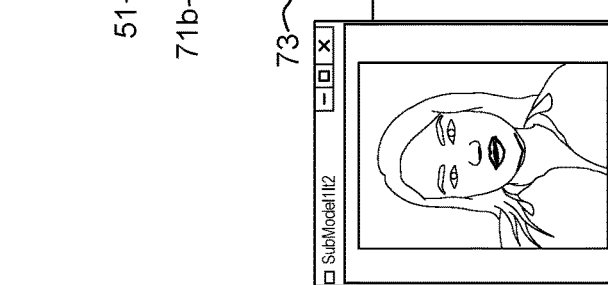
FIG. 18C
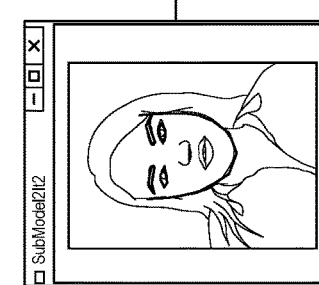
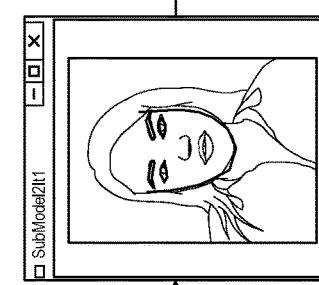
FIG. 18D
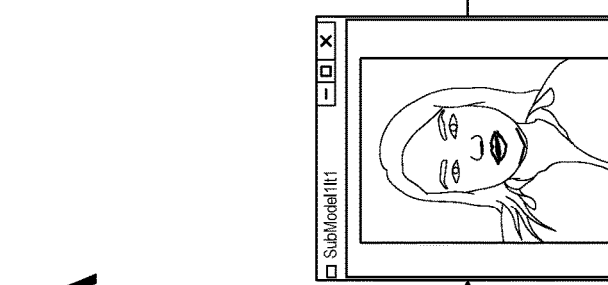
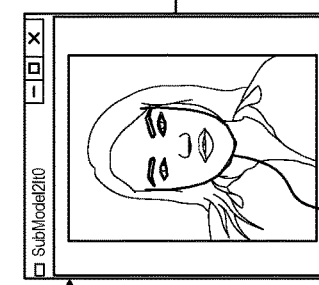
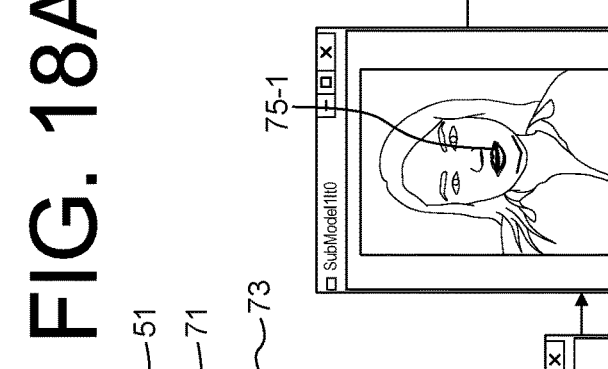
FIG. 18A
FIG. 18B

LOCATING AND AUGMENTING OBJECT
FEATURES IN IMAGES

FIELD OF THE INVENTION

This invention relates to an image processing system, and more particularly to techniques for locating and augmenting object features in images.

BACKGROUND OF THE INVENTION

Choosing a new cosmetic product is often a tedious and time consuming process, and is only usually possible in a retail environment where samples are made available. An important consideration for a customer trying on any new product is seeing how it looks as they move around, taking momentary opportunity to view themselves wearing the cosmetic from particular angles or with particular expressions.

Utilising the mass availability of handheld, or other, computing devices to make real-time virtual try-on of new cosmetics possible in any environment has the potential to radically change the way the customer finds the perfect product. Three main challenges for any such system are first, locating and tracking the features of a subject in a live captured image data stream, second, augmenting a virtual cosmetic product accurately and realistically in place over the live images, and finally to do all this in real-time, particularly on devices having limited hardware capabilities.

Conventional virtual makeup/makeover systems, for example as discussed in EP1194898, U.S. Pat. No. 7,079,158, EP1196893, EP2821959 and EP2821966 provide various interfaces that allow users/customers to apply virtual makeup products to an image of a face.

What is desired are real-time augmentation systems that provide processing efficiency, enhanced functionality and/or improved accuracy and realism, for a better user experience.

STATEMENTS OF THE INVENTION

Aspects of the present invention are set out in the accompanying claims.

In one aspect, there is provided a computer-implemented method of augmenting image data, the method comprising receiving data of an image captured by a camera, the captured image including at least a portion of a person's face including a region having a visible feature, retrieving augmentation values to augment said region of the captured image, computing at least one characteristic of the visible feature based on captured image data associated with the visible feature, modifying the retrieved augmentation values based on said computed at least one characteristic, augmenting pixel values in said region of the captured image based on the modified augmentation values, and outputting the captured image with the augmented pixel values for display.

In another aspect, there is provided a computer-implemented method of augmenting image data, the method comprising modifying pixel values of one or more identified regions of a face in a captured image based on augmentation parameters that are modified to take into account detected colour characteristics of said one or more identified regions of the face.

In yet another aspect, there is provided a computer-implemented method of processing image data including at least a portion of a person's face, to compute characteristics of a plurality of makeup products applied to the face, wherein characteristics of a foundation makeup product are computed from pixel values from a first plurality of defined regions of the face, and wherein characteristics of at least one other makeup product are computed from a weighted average of pixel values from a second plurality of defined regions of the face, which pixel values are weighted based on a calculated difference from at least one computed characteristic of the foundation makeup product.

The image processing may further comprise determining a location of the face in the captured image and extracting pixels of the captured image corresponding to the face. The location may be determined by modifying an instance of a stored model to fit the face in the captured image. The colourisation parameters may comprise mask data to determine one or more masked regions of said captured image. The colourisation parameters may further comprise data defining at least one texture image defining values to augment said one or more masked regions of said captured image. The mask data may define at least one polygonal region defined by three or more of vertices, wherein each vertex is associated with a corresponding labelled feature point of the model fitted to the face in the captured image.

The processing may further comprise determining a transformation of the at least one polygonal region of the mask data based on received coordinates of the corresponding feature points of the model fitted to the face in the captured image. The determined transformation may be applied to corresponding regions of the texture image data defined by the at least one polygonal regions of the mask data The colourisation parameters may comprise data defining a mathematical model to generate an array of augmentation values. The colourisation parameters may further comprise data identifying one or more material properties. Each material property may be associated with one or more of a highlight adjustment, a colour adjustment, a glitter adjustment, a lighting model adjustment, a blend colour adjustment, and an alpha blend adjustment to the retrieved augmentation values.

The colourisation parameters may further comprise data defining one or more shader modules to modify said pixel values based on the modified colourisation parameters. The processing may further comprise modifying the captured image data comprises alpha blending the results of augmenting captured image data with each of a plurality of modified retrieved colourisation parameter values in sequence.

The visible feature may be one or more of a foundation, blusher, eyeshadow and lipstick makeup product visible in the face in the captured image. Characteristics of the applied blusher visible feature may comprise blush colour and intensity parameters. Characteristics of the applied eyeshadow visible feature may comprise eyeshadow colour and intensity, and glitter parameters. The eyeshadow colour and intensity parameters may be computed based on pixel values a plurality of defined regions around each eye. Characteristics of the applied eyeshadow visible feature may comprise primary colour, secondary colour, colour intensities, glitter intensity and gloss intensity parameters. Characteristics of the applied foundation visible feature may comprise a colour parameter based on a computed colour of applied foundation in a cheek region and a computed colour of applied foundation in a region adjacent an eye.

A plurality of images may be captured by the camera in sequence, each captured image in sequence including the visible feature, and further comprising calculating the average of the calculated characteristics of the visible feature from each of the plurality of captured images.

In another aspect, there is provided a computer-implemented method of augmenting image data, the method comprising receiving data of a source image and at least one target image captured by a camera, the source image including a visible feature of an object, and each target image including a corresponding visible feature of a corresponding object; identifying a region of pixels in the source image associated with the visible feature; calculating at least one characteristic of the visible feature based on pixel values of at least one of the pixels in the identified region of the source image; identifying a region of pixels in the or each target image associated with the corresponding visible feature; and modifying pixel values of the identified region in the or each target image based on the calculated at least one characteristic of the corresponding visible feature in the source image.

In another aspect, there is provided a computer-implemented method of augmenting image data, the method comprising modifying pixel values of one or more identified regions of a face in a target image based on the augmentation characteristics derived from corresponding identified regions of a face in a source image.

The processing may further comprise determining a location of the source face in the source image and extracting pixels of the source image corresponding to the located face. Determining a location may comprise modifying an instance of a stored face model to match the source face in the source image. The region may be calculated based on the locations of a predefined plurality of vertices of the modified instance of the face model. The characteristics may be computed from an average of pixel values within the region.

The processing may further comprise retrieving colourisation parameters from a database based on the computed characteristics, the colourisation parameters defining values to augment said region of the captured image. The colourisation parameters may include one or more texture data files, each associated with at least one characteristic of a visible feature of a face, and retrieving a matching texture data file based on the calculated at least one characteristic of the visible feature in the source image, wherein pixel values of the identified region in the or each target image are modified at least based on data values of the retrieved texture data file.

In a further aspect, the present invention provides a computer-implemented method of augmenting image data, the method comprising receiving data of an image captured by a camera, the captured image including a region having a visible feature of an object; storing masking data defining a plurality of masks, each mask defining a respective masked portion of the region of the captured image; sampling pixel values at predefined locations of the captured image data; selecting at least one stored mask based on the sampled pixel values; modifying pixel values in the or each selected masked portion of the region of the captured image based on colourisation parameters; and outputting the captured image with the modified pixel values for display.

Each mask may define variations of the appearance of the visible feature. The plurality of masks may be arranged in groups, each group associated with a respective visible feature or aspect of a visible feature in the captured image.

Selection of at least one stored mask may comprise generating a feature descriptor based on the sampled pixel values, and identifying a selected one of the stored masks based on a classification of the feature descriptor. A trained classifier may be used to identify a stored mask.

The processing may further comprise storing shape model data defining a representation of the object shape, the shape representation identifying locations of a plurality of labelled points, at least a subset of said labelled points associated with the visible feature of the object.

In further aspects, the present invention provides a system comprising means for performing the above methods. In yet other aspects, there is provided a computer program arranged to carry out the above methods when executed by a programmable device.

BRIEF DESCRIPTION OF THE DRAWINGS

There now follows, by way of example only, a detailed description of embodiments of the present invention, with references to the figures identified below.

FIG. 12, which comprises FIGS. 12A to 12E, show further examples of the processing steps performed by the shape model training module of FIG. 2.

FIG. 13, which comprises FIGS. 13A and 13B, is a flow diagram illustrating the main processing steps performed by the shape model training module of FIG. 4 to determine cascading regression coefficient matrices according to an embodiment of the invention.

FIG. 18, which comprises FIGS. 18A to 18E, shows an exemplary sequence of display screens during the tracking process of FIG. 15.

FIG. 25, which comprises

FIG. 26, which comprises

FIG. 27, which comprises

FIG. 28, which comprises

FIG. 29, which comprises

FIG. 30, which comprises

FIG. 31, which comprises

FIG. 32, which comprises

FIG. 38, which comprises

FIG. 47, which comprises

DETAILED DESCRIPTION OF EMBODIMENTS OF THE INVENTION

First Embodiment

Figure 1:
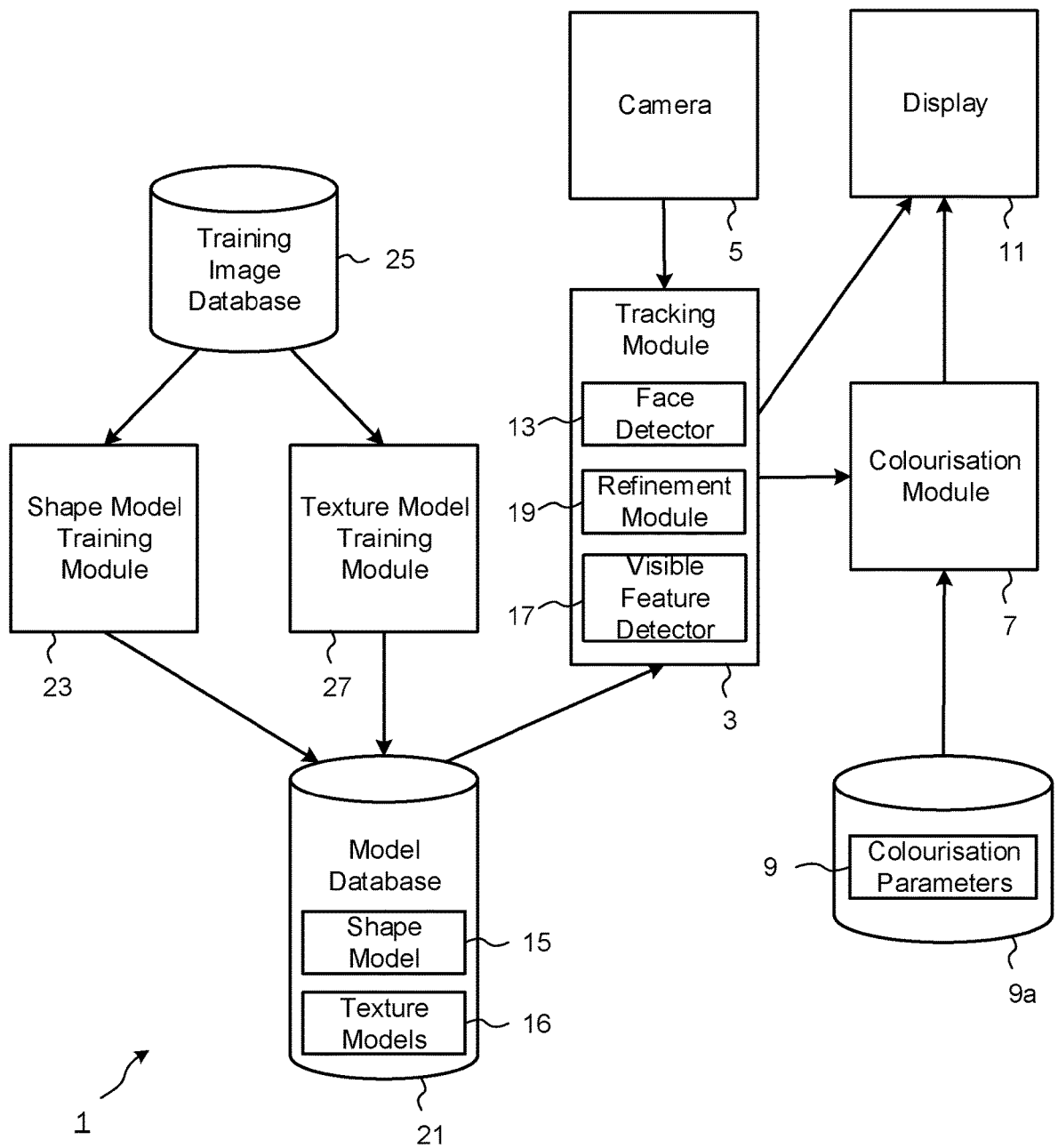
FIG. 1 is a block diagram showing the main components of an augmented reality system according to a first embodiment of the invention.

Referring to FIG. 1, a first embodiment of an augmented reality system 1 is schematically illustrated. The augmented reality system 1 comprises a tracking module 3 that automatically processes image data of a scene captured by a camera 5 to detect and determine the location of an object in the captured scene. A colourisation module 7 of the system 1 modifies captured image data of the detected object, based on colourisation parameters 9 corresponding to one or more virtual try-on products, retrieved from a database 9a for example. The augmented image data is then output to a display 11. Alternatively or additionally, the tracking module 3 may be configured to output image frames as captured to the display 11, with the colourisation module 7 configured to output the regions of modified pixels to the display 11, over the captured pixels of respective regions in the captured image frame. Preferably the operations are conducted in real time, or near real time.

In this exemplary embodiment, the augmented reality system 1 simulates the visible appearance of virtual make-up products applied to respective facial features of a detected face in a captured image frame. Aspects of the invention may be applicable to other types of objects with visible features that can be reproduced virtually. Enhanced realism is achieved by modifying the colourisation parameters 9 of the or each applied virtual make-up product based on computed characteristics from corresponding regions of the captured image data indicative of the presence of actual make-up applied to the detected face. Accordingly, the tracking module 3 in this embodiment includes a face detector module 13 that automatically detects and determines the location of the person's face in the captured image data based on a trained face shape model 15. The face detector 13 can implement any known face detector algorithm. The tracking module 3 also includes a visible feature detector 17 that automatically identifies regions of pixels in the captured image associated with one or more visible features of the detected face, such as predefined cheek, eye and lip regions of the person's face that have applied makeup products. Typical makeup products comprise foundation, blush, eye liner, eyeshadow, eyeliner, mascara, lipstick, lip gloss, lip liner, or the like. The visible feature detector 17 computes characteristics of the identified visible features based on pixel values in the respective identified regions of the captured image data, defined relative to feature points of a trained mesh representation of the face, based for example on a trained texture model 16. The tracking module 3 may also include a refinement module 19 that performs processing to refine an initial approximation of the location of the detected face in the captured image frame, as will be described below. The trained face shape model 15 may be stored in a memory of the augmented system 1, such as a model database 21.

In this embodiment, the tracking module 3 passes the captured image frame data together with the determined location of the target face in that frame to the colourisation module 7. A visible feature locator 21 of the colourisation module 7 extracts and processes the face pixels of a target image frame to identify respective regions of pixels associated with corresponding visible features. One or more shader modules 7a of the colourisation module 7 modify the pixel values of each identified region to augment the captured image data with the appearance of applied virtual makeup, based on colourisation parameters 9 such as masks and adjustment properties retrieved from the database 9a that are modified based on the computed characteristics of each corresponding visible feature in the image.

The augmented reality system 1 may further include a shape model training module 23 for processing training images in a training image database 25 to generate and store trained shape models 15 for use during real-time processing of input image data from the camera 5 by the tracking module 3. A texture model training module 27 may also be provided to generate and store trained texture models 16, for example based on a representative image in the training image database 25 as will be described below. The processing of image data by the shape model training module 23 and texture model training module 27 may be referred to as "offline" pre-processing, as the training processes are typically carried out in advance of the "real-time" image processing by the tracking module 3.

The system 1 may be implemented by any suitable computing device of a type that is known per se, such as a desktop computer, laptop computer, a tablet computer, a smartphone such as an iOS™, Blackberry™ or Android™ based smartphone, a 'feature' phone, a personal digital assistant (PDA), or any processor-powered device with suitable user input, camera and display means. Additionally or alternatively, the display 11 can include an external computing device, such as a mobile phone, tablet PC, laptop, etc. in communication with a host device for example via a data network (not shown), for example a terrestrial cellular network such as a 2G, 3G or 4G network, a private or public wireless network such as a WiFi™-based network and/or a mobile satellite network or the Internet.

Shape Model Training Module

Figure 2:
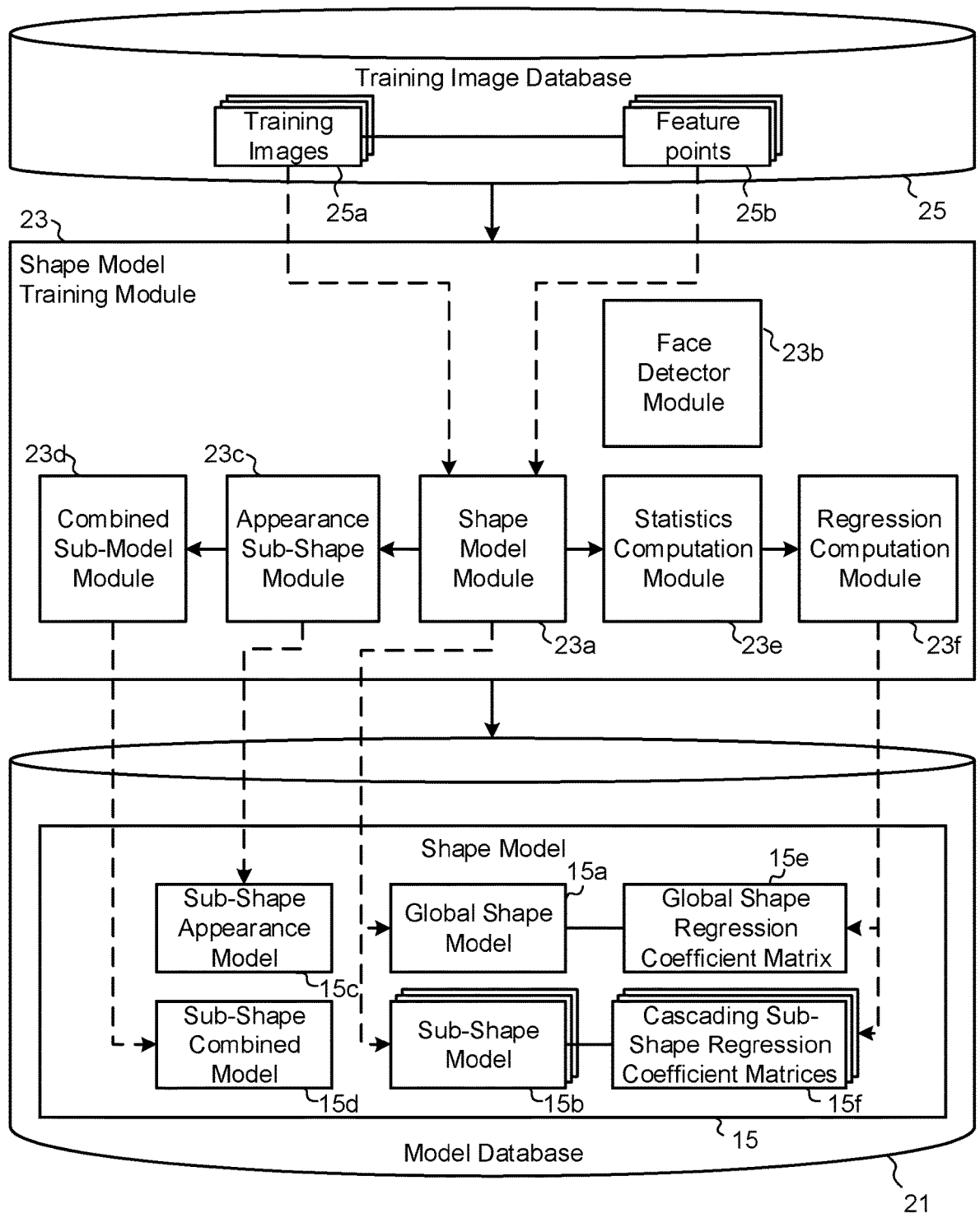
FIG. 2 is a block diagram showing the main components of the shape model training module shown in FIG. 1 and the components of a trained shape model according to an embodiment of the invention.

An exemplary embodiment of a shape model training module 23 in the augmented reality system 1 will now be described in more detail with reference to FIG. 2, which shows the main elements of the shape model training module 23 as well as the data elements processed and generated by the shape model training module 23 for the trained shape models 15. As shown, the shape model training module 23 includes a shape model module 23a that retrieves training images 25a and corresponding user-defined feature points 25b from the training image database 25. The training image database 25 may store a plurality of training images 25a, each comprising the entire face of a respective person, including one or more facial features such as a mouth, eye or eyes, eyebrows, nose, chin, etc. For example, the training images 25a may include subject faces and facial features in different orientations and variations, such as front-on, slightly to one side, closed, pressed, open slightly, open wide, etc. The shape model training module 23 may include a face detector module 23b to detect and determine the location of a face in each retrieved training image 25a. The shape model module 23a generates and stores a global shape model 15a and a plurality of sub-shape models 15b for a trained shape model 15 in the model database 21, as will be described in more detail below. It will be appreciated that a plurality of trained shape models may be generated and stored in the model database 21, for example associated with respective different types of objects.

Figure 3:
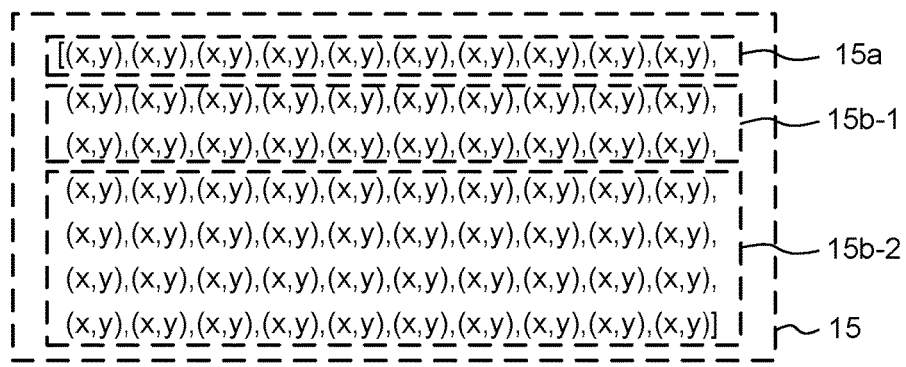
FIG. 3 is a schematic illustration of an exemplary data structure of a trained model including a global shape and a plurality of sub-shapes.

FIG. 3 is a schematic illustration of an exemplary data structure of a trained shape model 15, including a global shape 15a and a plurality of sub-shapes 15b. As shown, the exemplary data structure of the shape model 15 is an array of (x,y) coordinates, each coordinate associated with a respective feature point of the global shape 15a, corresponding to respective labelled feature point 25b in the training data. Each sub-shape model 15b may be associated with a respective subset of the (x,y) coordinates, each subset thereby defining a plurality of feature points 25b of the respective sub-shape. The subsets of feature points 25b for each sub-shape may overlap.

The shape model training module 23 may include an appearance sub-shape module 23c that can be used to generate sub-shape appearance models 15c for one or more of the sub-shape models 15b, for example based on predefined sub-shape detailed textures. The sub-shape detail textures may be pre-prepared grey scale textures, for example for the lip, cheek and eyes of a subject face. Different textures may be used to implement different appearance finishes, for example glossy, matt, shiny etc. The process of generating a sub-shape appearance model structure can involve warping (through piecewise affine transformations) an image representing the sub-shape detailed texture to the mean shape specified by the corresponding sub-shape model 15b. A combined sub-model module 23d can be provided to generate a sub-shape combined model 15d from a sub-shape model 15b and a corresponding sub-shape appearance model 15c.

In this exemplary embodiment, the shape model training module 23 also includes a statistics computation module 23e that computes and stores mean and standard deviation statistics based on the plurality of global shape models 15a of the trained models 15 generated by the shape model module 23a and the output of the face detector module 23b. The computed statistics can advantageously provide for more robust, accurate and efficient initial positioning of an object that is to be located within the bounding box output by the face detector module 23b.

A regression computation module 23f of the shape model training module 23 generates a global shape regression coefficient matrix 15e based on the global shape 15a generated by the shape model module 23a, and at least one sub-shape regression coefficient matrix 15f for each sub-shape 15b generated by the shape model module 23a. As is known in the art, the regression coefficient matrices 15e, 15f define an approximation of a trained function that can be applied, for example during a tracking phase, to bring the features of a candidate object shape from respective estimated locations to determined "real" positions in an input image. The generation of regression coefficient matrices 15e, 15f in the training process therefore define respective trained functions which relate the texture around an estimated shape and the displacement between their estimated positions and the final position where the shape features are truly located. The regression computation module 23f can be configured to compute the respective regression coefficient matrices 15e, 15f based on any known regression analysis technique, such as principal component regression (PCR), linear regression, least squares, etc. The plurality of regression coefficient matrices 15e, 15f form parts of the trained shape model 15 stored in the model database 21.

Texture Model Training Module

An exemplary embodiment of a texture model training module 27 in the augmented reality system 1 will now be described in more detail with reference to FIG. 4, which shows the main elements of the texture model module 27 as well as the data elements that are processed and generated by the texture model module 27 for the trained texture models 16. Reference is also made to FIG. 5A to 5E schematically illustrating examples of data that are processed and generated by the texture model training module 27 during the training process.

Figure 4:
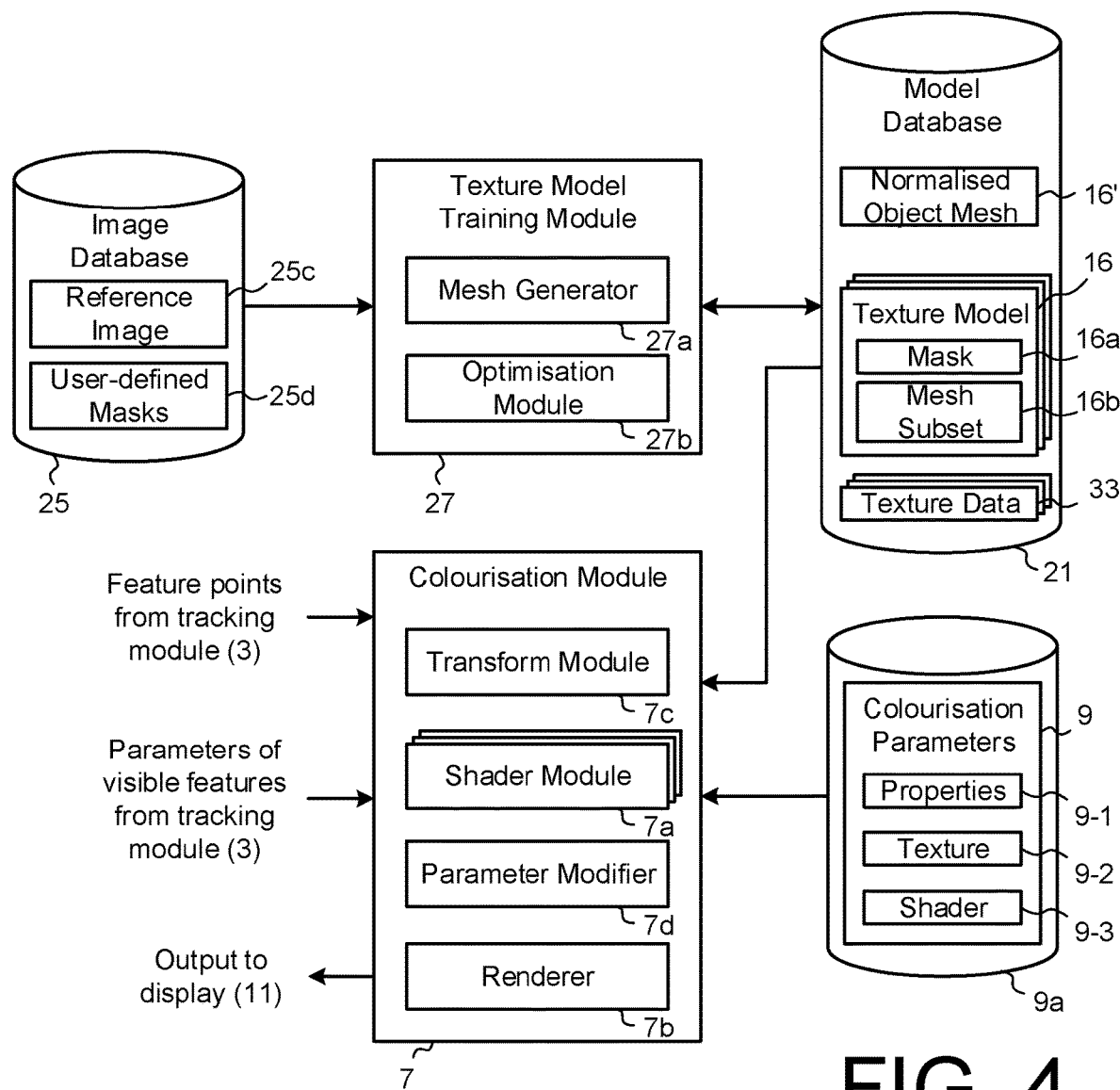
FIG. 4 is a block diagram showing the main components of an exemplary training module and colourisation module in the system of FIG. 1.
Figure 5A:
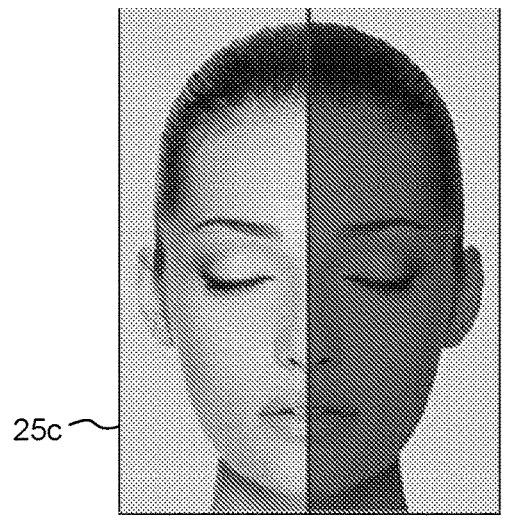
FIG. 5, which comprises FIGS. 5A to 5E, schematically illustrate examples of data processed and generated by the texture model training module during the training process.
FIG. 5F schematically illustrates an example of the trained model fitted to a detected face in a captured image.
Figure 5B:
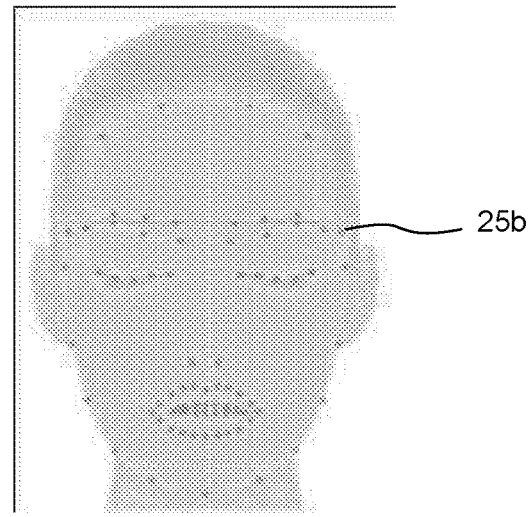

As shown in FIG. 4, the texture model training module 27 may include a mesh generator 27a that retrieves at least one reference image 25c from the training image database 25, for example as shown in FIG. 5A, and generates data defining a plurality of polygonal regions based on the retrieved reference image 25c, collectively referred to as a normalised mesh 31'. Each region is defined by at least three labelled feature points and represents a polygonal face of the two-dimensional normalised mesh 31'. It is appreciated that the normalised mesh may instead define three-dimensional polygonal regions. Preferably, the shape model training module 23 and the texture model training module 27 use the same set of labelled feature points as the tracking module 3, so that vertex and texture coordinate data can be shared across a common reference plane. The mesh generator 27a may be configured to receive data defining the location of labelled feature points 25b in the, or each, reference image 25c as determined by the tracking module 3. Alternatively, the texture model training module 27 may include a face detector module (not shown) to detect and determine the location of the face in a reference image 25c. As another alternative, the mesh generator 27a may prompt a user to input the location of each feature point for the, or each, reference image 25c. FIG. 5B schematically illustrates a plurality of defined feature points overlaid on a representation of a reference image 25c. Preferably, the reference image is a symmetrical reference face, in order to optimize texture space across all areas of the face where virtual makeup may be applied.

Figure 5C:
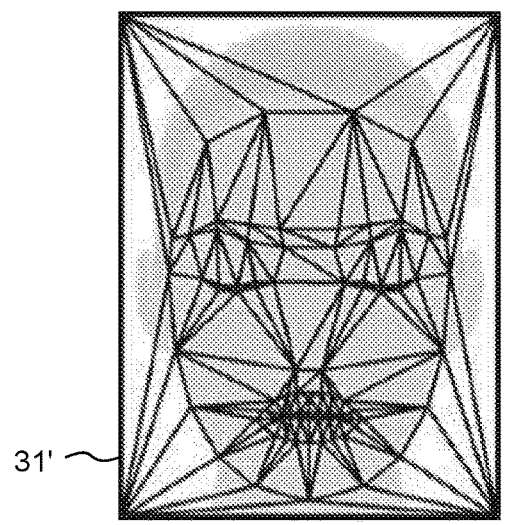
Figure 5D:
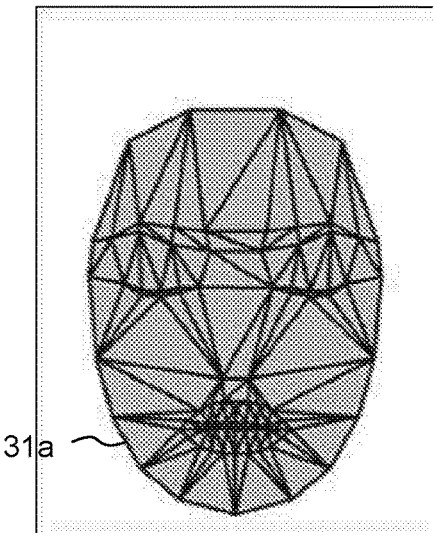
Figure 5E:
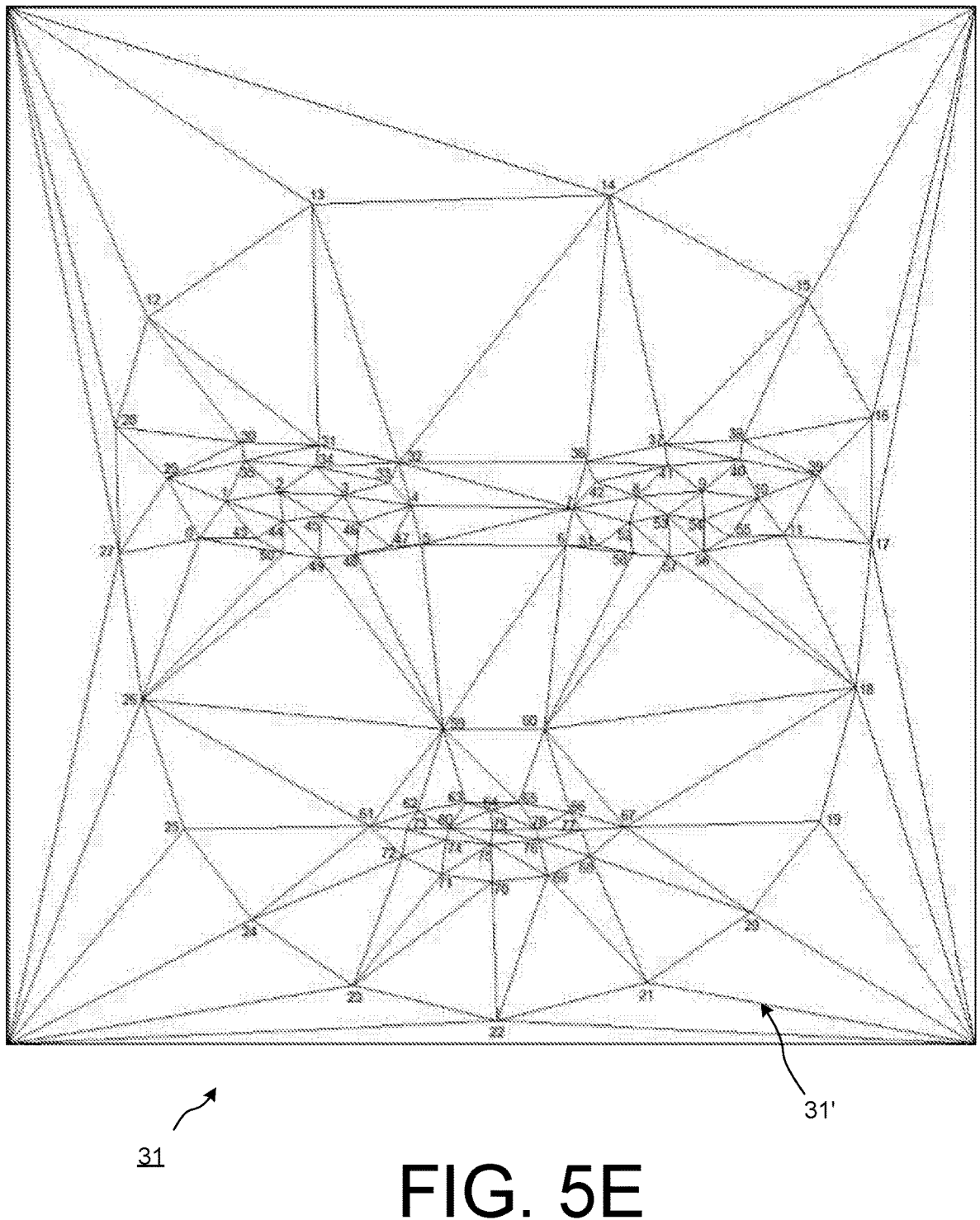

The texture model training module 27 may be configured to subsequently perform triangulation to generate a mesh of triangular regions based on the labelled feature points. Various triangulation techniques are known, such as Delaunay triangulation, and need not be described further. FIG. 5C schematically illustrates an example of a resulting normalised mesh 31' generated from the reference image shown in FIG. 5A and the plurality of labelled feature points shown in FIG. 5B. Optionally, the mesh generator 27a may further prompt the user for input to optimize the normalised mesh 31', for example by reducing or increasing the number of triangles for a particular region of the reference image. FIG. 5D schematically illustrates an example of a resulting optimised version 16a of the normalised mesh 31' shown in FIG. 5C. Alternatively, the mesh generator 27a may be configured to facilitate manual triangulation from the labelled featured points to generate an optimal normalised mesh 31a. It will be appreciated that in the context of the present embodiment, an optimal normalised mesh 31a consists of triangles that stretch in their optimum directions causing the least number of artefacts, resulting in a mesh that defines an ideal number of vertices and polygonal faces to be used for the application of virtual makeup as described below. FIG. 5E schematically illustrates a detailed example of a normalised mesh 31a of a trained texture model 16, including eighty labelled features points 25b that are numbered in sequence.

The normalised mesh 31' may be stored as a data structure including a first data array consisting of an indexed listing of the labelled feature points defined by x and y coordinates relative to a common two dimensional reference plane, and a second data array consisting of a listing of polygon faces defined by indices of three or more labelled feature points in the first data array. For example, the first data array be an indexed listing of m vertices: [$x_0, y_0, x_1, y_1, \ldots x_m, y_m$], each index corresponding to a different labelled feature point. The second data array may be listing of n exemplary polygon faces: [1/2/20, 1/21/5, . . . , 92/85/86], each polygon face defined by indices or three vertices in the first data array. The normalised mesh 31' data can be stored in the model database 21 of the system 1.

The texture model training module 27 also includes an optimisation module 27b that generates a plurality of optimised texture models 14, based on the normalised mesh 31' generated by the mesh generator 27a and data defining one or more user-defined masks 25d, retrieved from the training image database 25 for example. Each texture model 16 may be associated with one or more virtual make-up products having a set of colourisation parameters 9, the texture model 16 defining one or more regions of captured image data corresponding to predefined areas of a person's face that are to be augmented with the associated colourisation parameters 9. Each texture model 16 generated by the optimisation module 27b includes data defining the associated mask 16a such as a copy of or pointer to the image data defining the respective user-defined mask 16a, and a mesh subset 16b comprising a subset of the polygonal regions of the normalised mesh 31' that is determined based on the associated mask 16a, as will be described in more detail below. In this way, the optimisation module 27b can be used to take a given makeup mask and output only the necessary polygonal faces that are to be used by the colourisation module 7 to render the respective portions of the augmented image data.

Many masks can be compounded together to produce a particular desired virtual look or appearance, which consists of multiple layers of virtually applied makeup, including for example one or more of lipstick, blusher, eyeshadow and foundation, in multiple application styles. The masks 16 may include black and white pixel data. Preferably, the masks 16 are grey-scale image data, for example including black pixels defining portions of a corresponding texture data file 20 that are not to be included in the colourisation process, white pixels defining portions of the corresponding texture data file 20 that are to be included at 100% intensity, and grey pixels defining portions of the corresponding texture data file 20 that are to be included at an intensity defined by the associated grey value. The white and grey pixels are referred to as the masked data regions. In this way, different masks 16 can be provided for various blurring effects.

Each texture model 16 is associated with texture data 33 that may also be stored in the model database 21, such as texture image data that is representative of the appearance of an associated applied virtual make-up product. The texture image data 33 may have the same dimensions as the captured image data received from the camera. Alternatively, it is appreciated that the normalised mesh 31' may be defined at a different scale from the texture image data 20, and an additional processing step can be used to compute the necessary transformation. Where the texture image data 33 has different dimensions from the captured image data, such as defining details of a portion of the overall face, metadata can be provided to identify the location of the texture portion relative to the pixel location of a captured image and/or reference image 25c. The texture data 33 may also include data identifying one or more associated material properties. Alternatively or additionally, the texture data 33 may define a mathematical model that can be used to generate an array of augmentation values to be applied by the colourisation module 7 to the captured image data.

Colourisation Module

An exemplary embodiment of a colourisation module 7 in the augmented reality system 1 will now be described in more detail, again with reference to FIG. 4 also showing the main elements of the colourisation module 7 as well as the data elements that are processed by the colourisation module 7 to generate augmented image data that is output to the display 11. As shown, the colourisation module 7 includes a plurality of shader modules 7a that determine and apply image colourisation to selected regions of captured image data and/or texture data files 33. For example, four custom virtual makeup shader modules 7a can be implemented by the colourisation module 7, each having a respective predefined identifier, and used to determine and apply image colourisation to represent virtual application of lipstick (which may include lip gloss or lip liner), blusher, eyeshadow (which may include eyeliner and mascara) and foundation to the captured image data. The output of a custom makeup shader module 7a is sent to a renderer 7b that augments the underlying user's face in the captured image from the camera 5 with the specified virtual makeup. As will be described in more detail below, each shader module 7a can be based on predefined sets of sub-shader modules to be applied in sequence, for example based on selected sets of colourisation parameters 9.

As shown in FIG. 4, predefined sets of colourisation parameters 9 can be stored in a colourisation parameters database 9a, each set 9 including one or more predefined property values 9-1, predefined texture values 9-2 such as respective identifiers of a stored texture model 16 and a stored texture data file 33, and a predefined shader type 9-3 such as an identifier of one or more shader modules 7a implemented by the colourisation module 7 that are to be used to augment associated regions of captured image data based on the property values 9-1 and/or texture values 9-2. The colourisation parameters database 9a may be a database of beauty product details, for example, whereby each product or group of products is associated with a respective set of colourisation parameters 9. Alternatively, the database 9a may include colourisation parameters 9 derived from product details retrieved from such a product database.

Figure 5F:
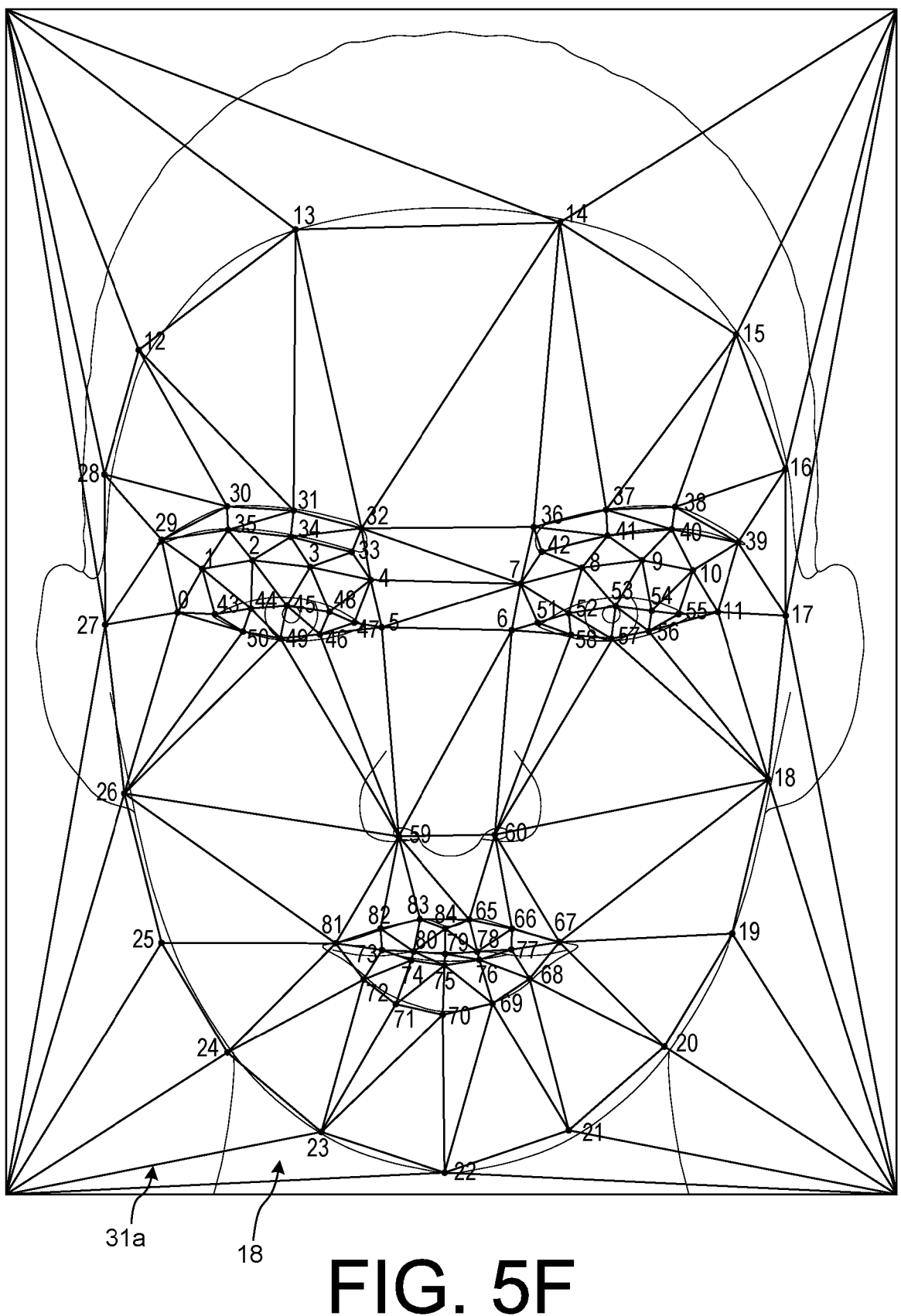

The colourisation module 7 may include a transform module 7c that receives data defining the location of labelled features points in the common reference plane, determined by the tracking module 3 for a captured image. The determined coordinates from the camera image data define the positions of the polygonal regions of a normalised mesh 31' that matches the detected object, the user's face in this embodiment. FIG. 5F schematically illustrates a plurality of defined feature points of a warped instance of the normalised mesh 31' to fit (or match) a detected face in a captured image, overlaid on a representation of the captured image 18. Preferably, the object face model defines a symmetrical reference face, in order to optimize the processing of mirrored areas of the left and right side of a face, where real applied makeup may be detected and virtual makeup may be applied. The transform module 7c determines a mapping from the vertices of a selected region of a trained mesh 31' to vertices of the corresponding tracked labelled feature points. The transform module 7c uses the determined mapping to transform the associated regions of mask data 16a and texture data 33 retrieved from the model database 21 for the particular set of colourisation parameters 9, into respective "warped" versions that can be processed by the shader modules 7a.

In this embodiment, the colourisation module 7 also includes a parameter modifier 7d that receives characteristics of the one or more detected visible features in the captured image, as computed by the visible feature detector 17 of the tracking module 3, and modifies the property values 9-1 and/or the texture values 9-2 of the retrieved colourisation parameters 9 corresponding to each identified visible feature, based on values of the respective received characteristics. For example, colour and intensity property values of a particular blush product may be modified based on the computed colour and intensity characteristics of detected foundation and/or blush makeup present on the face in the captured image. As another example, glitter intensity property values of a particular lipstick product may be modified based on the computed colour and glitter intensity characteristics of detected lipstick present on the lips of the face in the captured image.

After all of the regions and colourisation parameters are processed by the transform module 7c, the parameter modifier 7d and the respective defined shader module(s) 7a, the renderer 7b overlays the respective mesh subsets 16b of each texture model 16 according to the common reference plane, and in conjunction with an alpha blended shader sub-module (not shown), performs an alpha blend of the respective layers of associated regions of warped texture data. The blended result is an optimized view of what will get augmented on the user's face, taking into account characteristics of visible makeup product(s) already present on corresponding regions of the face. The final result is obtained by the renderer 7b applying the blended result back onto the user's face represented by the captured image data from the camera 5, and output to the display 11.

In this way, the colourisation module 7 uses the image data coordinates from the reference face, referenced by the mesh subsets 16b, as texture coordinates to the texture data files 33, for each texture model 16 associated with a respective set of colourisation parameters 9 for a selected virtual makeup product, transformed according to the tracked feature point locations, and rendered over the captured image data, resulting in the visual effect of morphing all of the selected virtual makeup products to the user's face in a real-time augmented reality display. It will be appreciated that the transform module 7c, shader modules 7a and renderer 7b may include calls to a set of predefined functions provided by a Graphics Processing Unit (GPU) of the system 1. Advantageously, the present embodiment provides for more efficient GPU usage, as only the portions of the respective texture data files and captured image data are transmitted to the GPU for processing.

Texture Model Training Process

A brief description has been given above of the components forming part of the texture model training module 27 of one embodiment. A more detailed description of the operation of these components in an embodiment will now be given with reference to the flow diagram of FIG. 6, for an example computer-implemented training process using the texture model training module 27. Reference is also made to FIG. 7A to 7C schematically illustrating examples of data that is processed and generated by the texture model training module 27 during the training process.

Figure 6:
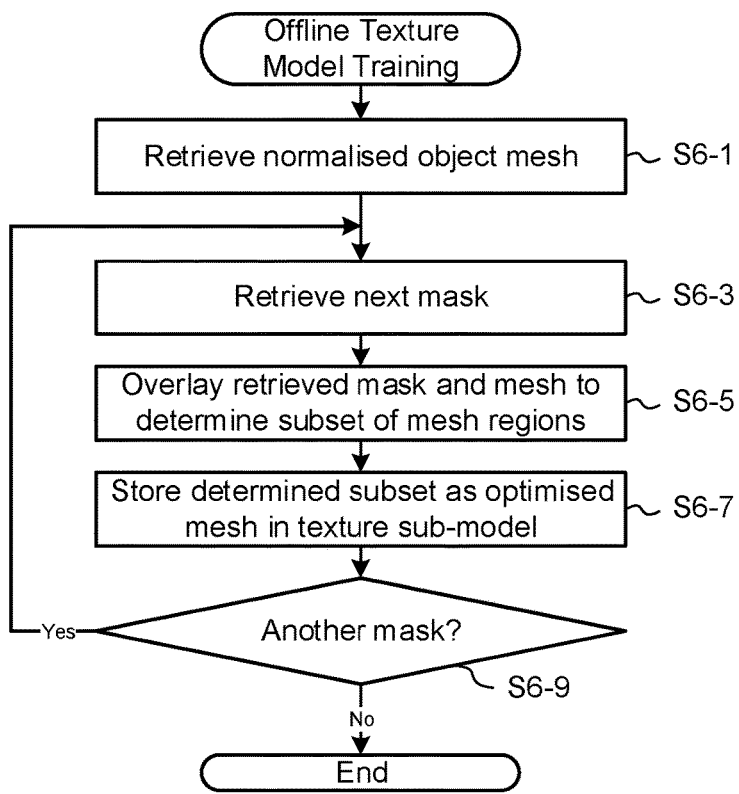
FIG. 6 is a flow diagram illustrating exemplary processing steps performed by the texture model training module of FIGS. 1 and 4.
Figure 7A:
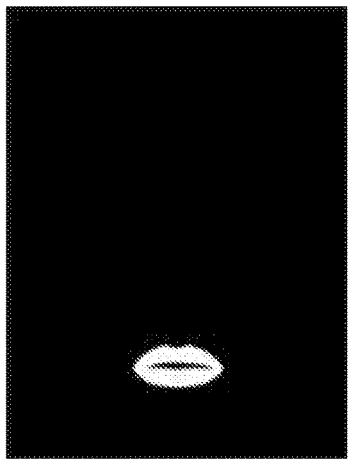
FIG. 7, which comprises FIGS. 7A to 7D, schematically illustrate further examples of data processed and generated by the texture model training module during the training process.
Figure 7B:
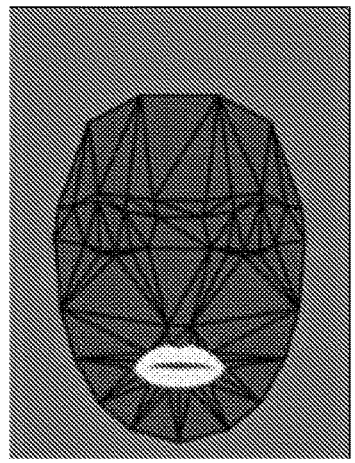
Figure 7C:
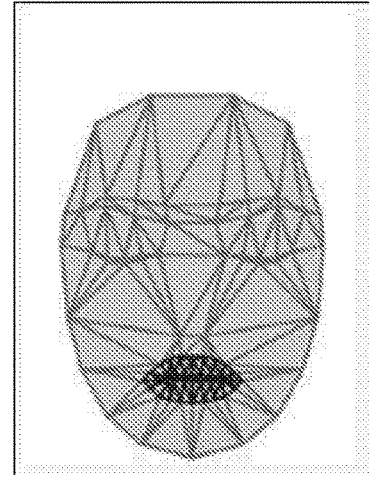
Figure 7D:
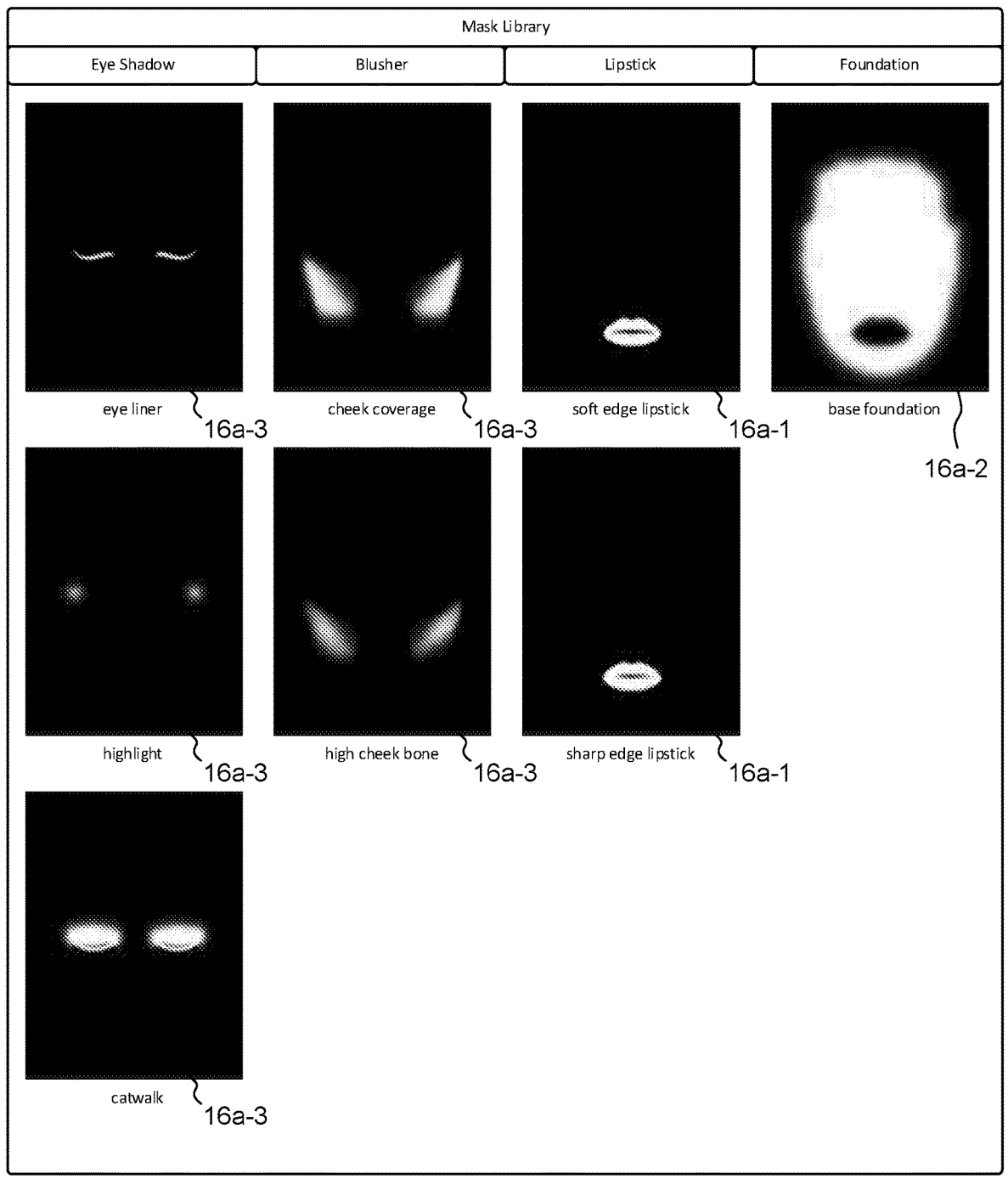

As shown in FIG. 6, the training process begins at step S6-1 where the texture model training module 27 retrieves a normalized object mesh 31' from the model database 21. At step S6-3, the texture model training module 27 retrieves a first one of the plurality of user-defined masks 25d from the image database 25. FIG. 7A shows an example of a mask 25d defining a lip region of the reference image 25c shown in FIG. 3a. At step S6-5, the texture model training module 27 overlays the retrieved mask 25d on the retrieved normalised object mesh 31' to determine a subset of regions of the normalised mesh 31' that include at least a portion of the masked data regions. FIG. 7B schematically illustrates an example of the masked regions shown in FIG. 7A, overlaid on the normalised mesh 31' shown in FIG. 3d. FIG. 7C schematically illustrates the subset of mesh regions as determined by the texture model training module 27. At step S5-7, the determined subset of mesh regions is stored as a mesh subset 16b in a texture model 16 along with a copy of the associated mask 16a, in the model database 21. At step S5-9, the texture model training module 27 determines if there is another user-defined mask 25d in the image database 25 to be processed, and if so, processing returns to step S5-3 where the next mask 25d is retrieved for processing as described above, until all of the user-defined masks 25d have been processed in this way. FIG. 7D schematically illustrates an exemplary final set of masks 16a as determined by the texture model training module 27 to define lipstick, foundation, blusher and eyeshadow regions of a captured image.

Shape Model Training Process

Figures 9, 10A:
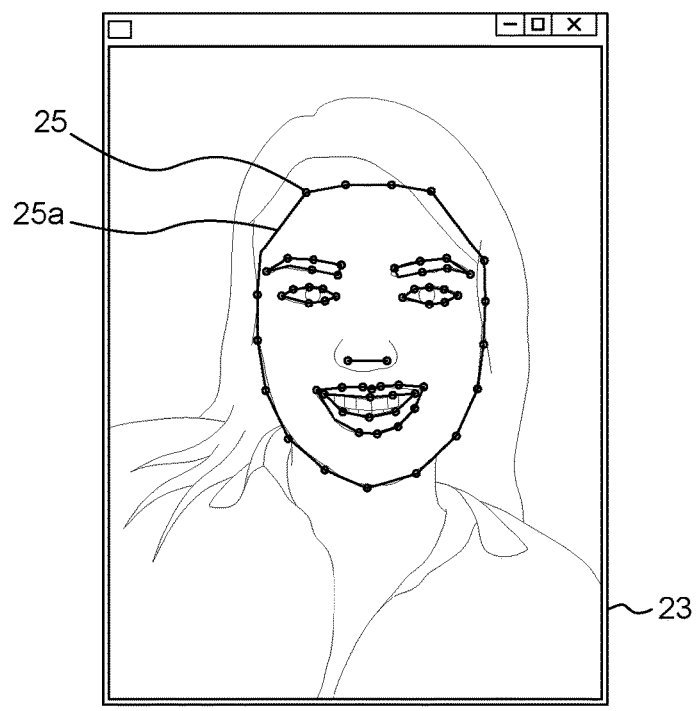
FIG. 9 shows an example of user-defined feature points defined a plurality of labelled feature points, displayed over a training image.
Figure 10B:
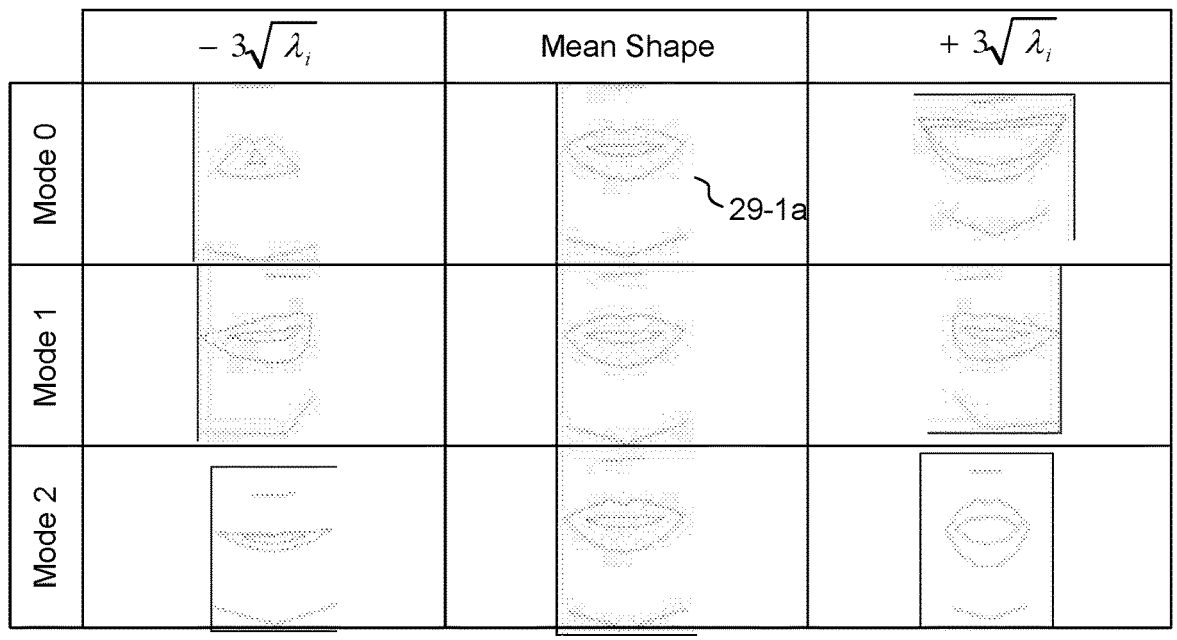
FIG. 10, which comprises FIGS. 10A to 10C, schematically illustrates examples of global and sub-shaped models generated by the training module according to an embodiment.
Figure 10C:
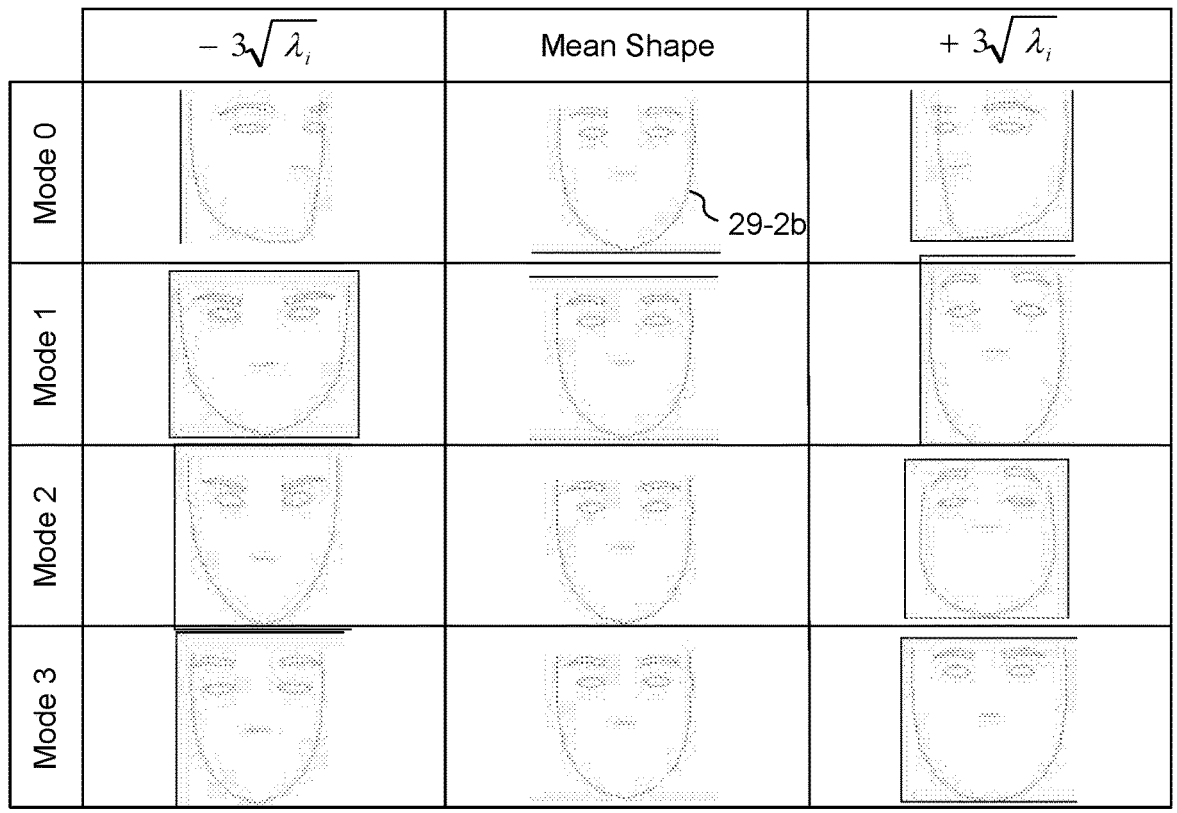

A brief description has been given above of the components forming part of the shape model training module 23 of an exemplary embodiment. A more detailed description of the operation of these components will now be given with reference to the flow diagram of FIG. 8, for an example computer-implemented training process using the shape model training module 23. Reference is also made to FIG. 9 schematically illustrating examples of user-defined shapes defined by labelled feature points, and to FIGS. 10A to 10C schematically illustrating examples of trained global and sub-shape models.

Figure 8:
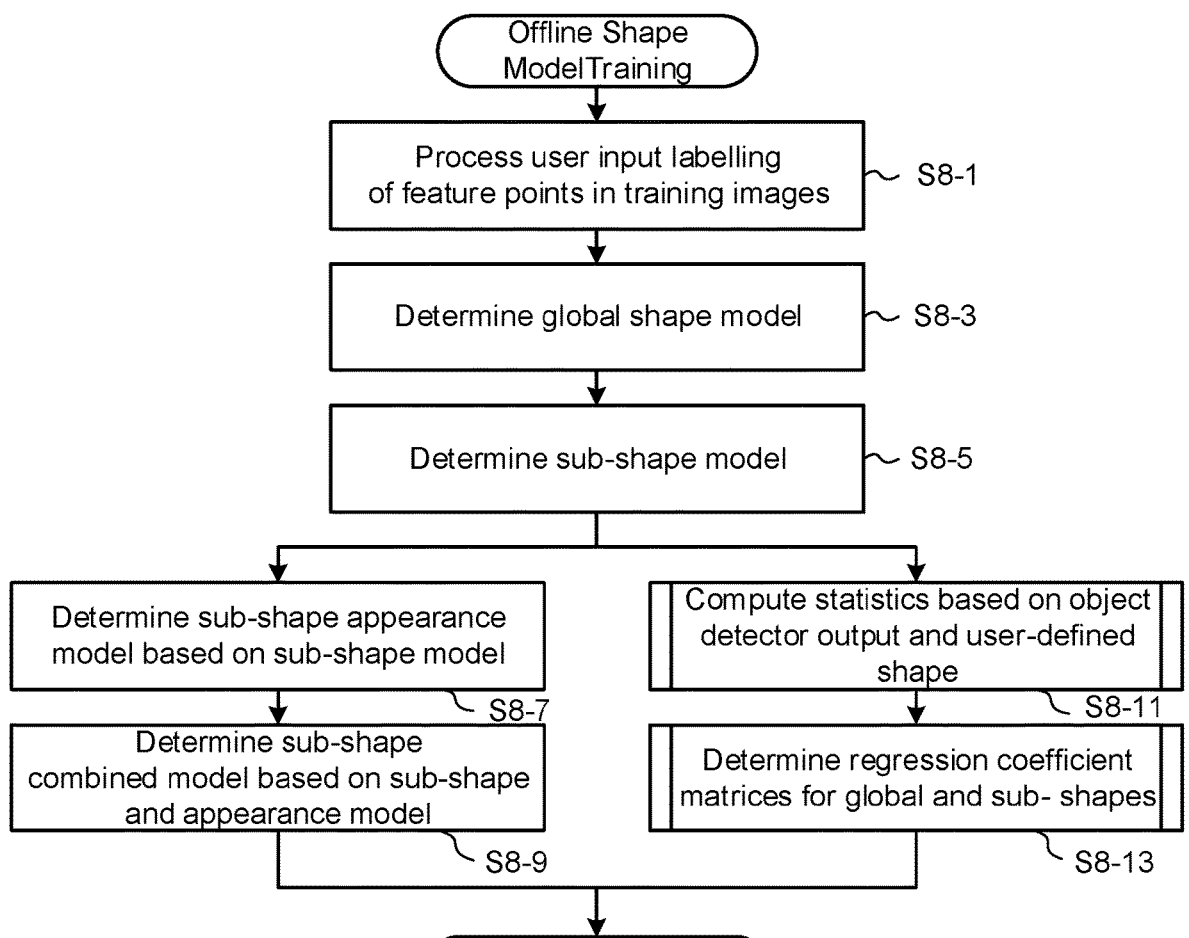
FIG. 8 is a flow diagram illustrating exemplary processing steps performed by the shape model training module of FIGS. 1 and 2.

As shown in FIG. 8, the training process may begin at step S8-1 where the shape model training module 23 processes user input to define a plurality of labelled feature points 25b in the training images 25a of the training image database 25. For example, a user interface may be provided to prompt the user to sequentially define a set of feature points 25b for a training image 23, each labelled feature point 25b associated with a respective location in the corresponding training image 23 and having a corresponding unique identifier. FIG. 9 shows an example of a resulting user-defined shape 25a displayed over an associated training image 23, as defined by the plurality of labelled feature points 25b. The data may be defined as a set or array of x and y positions in the image, defining respectively the x-axis and y-axis position in the image of each user-defined feature point 25b in the training image 23. The plurality of feature points 25b may be grouped into subsets of feature locations, each subset corresponding to respective sub-aspects of the overall object. In the present example, the overall object is a subject's face and the sub-aspects may be i) the lips, mouth and chin, and ii) the eyes, eyebrows, nose and face outline.

At step S8-3, the shape model module 23a of the shape model training module 23 determines a global shape model 27 for the trained face model 16, based on the training images 25a and associated feature points 25b retrieves from the training image database 25. Any known technique may be used to generate the global shape model 27. For example, in this embodiment, the shape model module 23a uses the Active Shape Modelling (ASM) technique, as mentioned above. FIG. 10A shows a schematic representation of an example global shape model 27 generated by the shape model module 23a using the ASM technique. In the illustrated example, the global shape model 27 of a subject's face includes three modes of variation as determined by the shape model module 23a from the training data. Each mode describes deviations from the same mean shape 27a of the global shape model, illustrated in the middle column, the deviations differing for each respective mode. For example, the illustrated mode zero represents deviations resulting from the subject's face turning left and right the second mode represents deviations of the lip and mouth in various open and closed positions, while the third mode represents deviations of the subject's face tilting vertically up and down.

It will be appreciated that the data structure of the global shaped model 27 will depend on the particular shape modelling technique that is implemented by the shape model module 23a. For example, the ASM technique processes the distribution of user-defined feature locations in the plurality of training images 25a in order to decompose the data into a set of eigenvectors and eigenvalues, and a corresponding set of parameters/weights between predefined limits, to define a deformable global shape model for a subject's face.

The precise steps of the ASM technique are known per se, and need not be described further.

At step S8-5, the shape model module 23a determines one or more sub-shape models 15b, again using the same shape modelling technique used to generate the global shape model 27. In this step, the ASM technique for example is applied to the respective subsets of feature locations, to generate respective sub-shape models 15b corresponding to respective sub-aspects of the overall face. FIG. 10B shows an example of a first sub-shape model 15b-1 corresponding to the lips, mouth and chin of a subject's face. FIG. 10C shows an example of a second sub-shape model 15b-2 corresponding to the eyes, eyebrows, nose and face outline of a subject's face. It will be appreciated that the number of modes of variation for a global and sub-shape model may vary depending on the complexity of the associated training data.

Returning to FIG. 8, at step S8-7, the appearance sub-shape module 23c determines a sub-shape appearance model 15c for one or more of the sub-shape models 15b generated by the shape model module 23a. In this example embodiment, an appearance model 15c is generated for the first sub-shape model 15b corresponding to the lips, mouth and chin of a subject's face. Any known technique for generating an appearance model 15c may be used, for example the Active Appearance Model (AAM) technique, as mentioned above. The particular implementation steps of this technique are known per se, and need not be described further. The result of the AAM technique applied by the appearance sub-shape module 23c is a deformable sub-shape appearance model 15c comprising a mean normalised grey level vector, a set of orthogonal modes of variation and a set of grey level parameters.

At step S8-9, the combined sub-model module 23c determines a sub-shape combined model 15d for each sub-shape appearance model 15c, based on the corresponding sub-shape model generated by the shape model module 23a. For example, the shape model derived from the labelled training images 25a can be processed to generate a set of shape model parameters, and the sub-shape appearance model 15c may be similarly processed to generate corresponding appearance model parameters. The shape model parameters and the appearance model parameters can then be combined, with a weighting that measures the unit differences between shape (distances) and appearance (intensities). As with the ASM and AAM techniques, the combined model can be generated by using principle component analysis and dimensionality reduction, resulting in a deformable combined model represented by a set of eigenvectors, modes of variation and deviation parameters.

Figure 11:
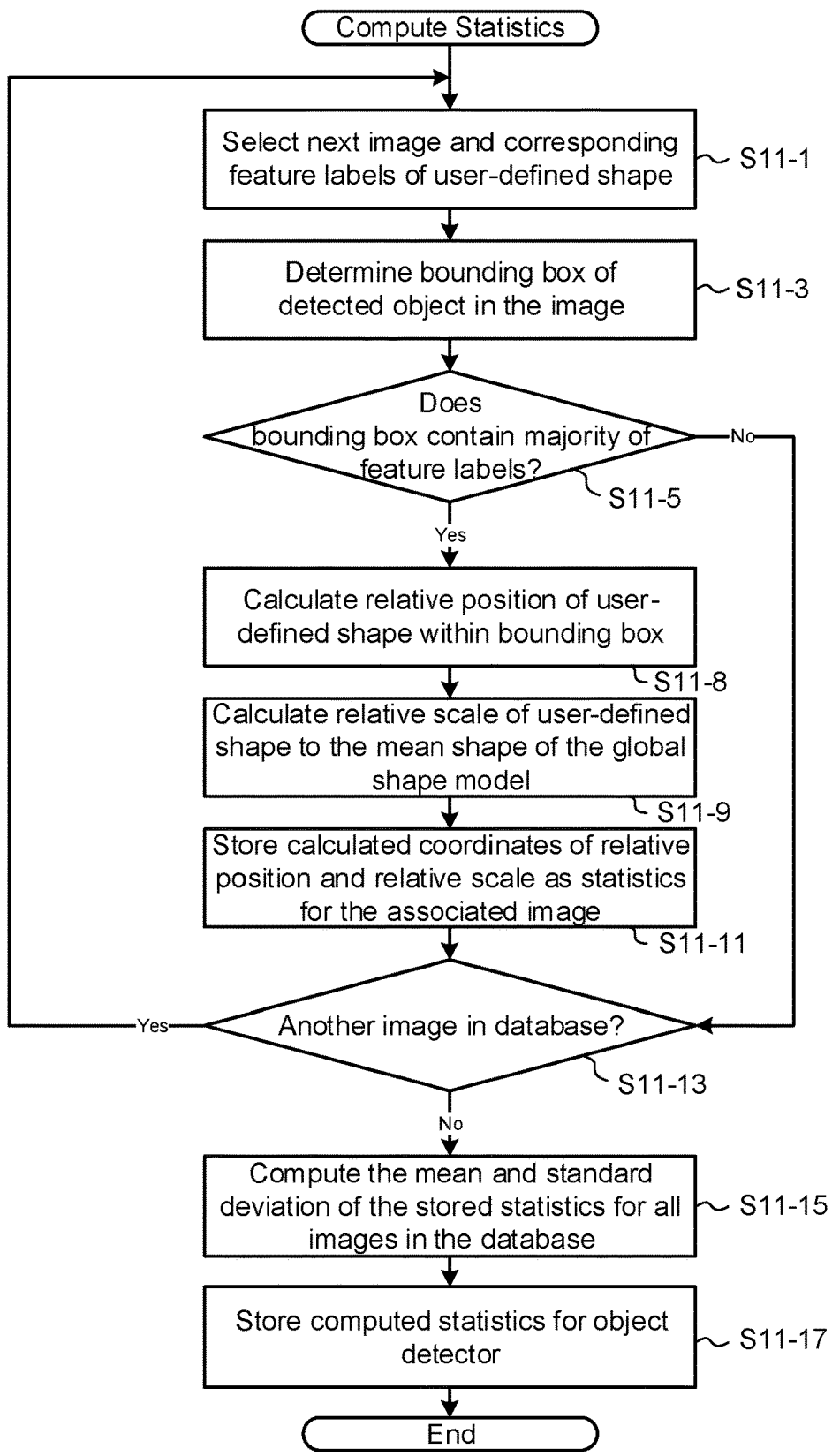
FIG. 11 is a flow diagram illustrating the processing steps performed by the shape model training module to compute statistics based on the object detector output and user-defined shape, according to an embodiment.

At step S8-11, the statistics computation module 23d can be used to compute a set of statistics to improve the robustness of initial positioning of a detected face within a bounding box output by the object detector module 42. This exemplary processing is described in more detail with reference to FIG. 11. As shown in FIG. 11, at step S11-1, the statistics computation module 23d selects a first image from the training images 25a in the image database 25. The corresponding feature points 25b of the user-defined shape for the training image 23 are also retrieved from the training image database 25. At step S11-3, the selected training image 23 is processed by the object detector module 42 to determine a bounding box of a detected subject's face in the image 23. FIG. 12A shows an example of a detected face in a training image, identified by the bounding box 51.

At step S11-5, the statistics computation module 23d determines if the identified bounding box 51 contains the majority of feature points 25b of the corresponding user-defined shape 25. For example, a threshold of 70% can be used to define a majority for this step. If it is determined that the bounding box 51 does not contain the majority of feature points 25b, then position and scale statistics are not computed for the particular training image 23 and processing skips to step S11-13 where the statistics computation module 23d checks for another training image to process. On the other hand, if it is determined that the bounding box 51 contains a majority of the feature points 25b, then at step S11-7, the relative position of the user-defined shape, as defined by the feature points 25b, within the identified bounding box 51 is calculated. At step S11-9, the statistics computation module 23d calculates the relative scale of the user-defined shape to the means shape 27a of the global shape model 27. At step S11-11, the calculated coordinates of the relative position and the relative scale are stored for example in the training image database 25, for subsequent computations as described below.

At step S11-13, the statistics computation module 23d determines if there is another training image 23 in the database 5 to be processed, and returns to step S11-1 to select and process the next image 23, as necessary. When it is determined that all of the training images 25a, or a pre-determined number of training images 25a, have been processed by the statistics computation module 23d, at step S11-15, a mean and standard deviation of the stored relative position and scale for all of the processed training images 25a is computed, and stored as computed statistics 44 for the particular face detector 13, for example in the training image database 25.

Returning to FIG. 8, the offline training process proceeds to step S8-13, where the regression computation module 23f of the shape model training module 23 proceeds to determine regression coefficient matrices 15e, 15f for the global shape model 27 and the plurality of sub-shaped models 29. This process is described in more detail with reference to FIGS. 13 and 14. The regression computation module 23f computes the regression coefficient matrices 15e, 15f based on feature point descriptors and corresponding offsets that are determined from the training images 25a in the database 5. In the present embodiment, the feature point descriptors are Binary Robust Independent Elementary Features (BRIEF) descriptors, derived from the calculated conversion of an input global or sub-shape feature points to a selected image, but other feature descriptors can be used instead such as ORB, FREAK, HOG or BRISK.

As is known in the art, regression analysis is a statistical process for modelling and analyzing several variables, by estimating the relationship between a dependent variable and one or more independent variables. As mentioned above, the regression coefficient matrices 15e, 15f define trained functions that represent a series of directions and re-scaling factors, such that a matrix can be applied to a candidate shape model to produce a sequence of updates to the shape model that converge to an accurately located shape with respect to an input image (e.g. a training image during a training process, or a captured image during a tracking process). In this embodiment, the plurality of sub-shape regression matrices 47 are arranged as a cascading data structure. Each regression matrix in level i, overcomes situations where the previous regression coefficient matrix did not lead to the final solution. For example, the first, highest level regression coefficient matrix approximates a linear function that tries to fit all cases in the database. The second and further lower level regression matrices fit situations that the first level regression matrix was not able to cope with. This cascading data structure thereby provides a more flexible function with improved generalization across variations in object shapes. The training process to determine the cascading sub-shape regression coefficient matrices 47 simulates similar captured image scenarios which might be captured and processed during the tracking procedure, utilising stored training data 5 defining the real or actual displacement or offset between the estimated and real position of the object shape feature points that are known for the training images 25a in the database 5. The texture around an estimated shape is described by the BRIEF features and the offset between corresponding labelled feature points can be measured in pixels coordinates in the reference image resolution.

Figure 13A:
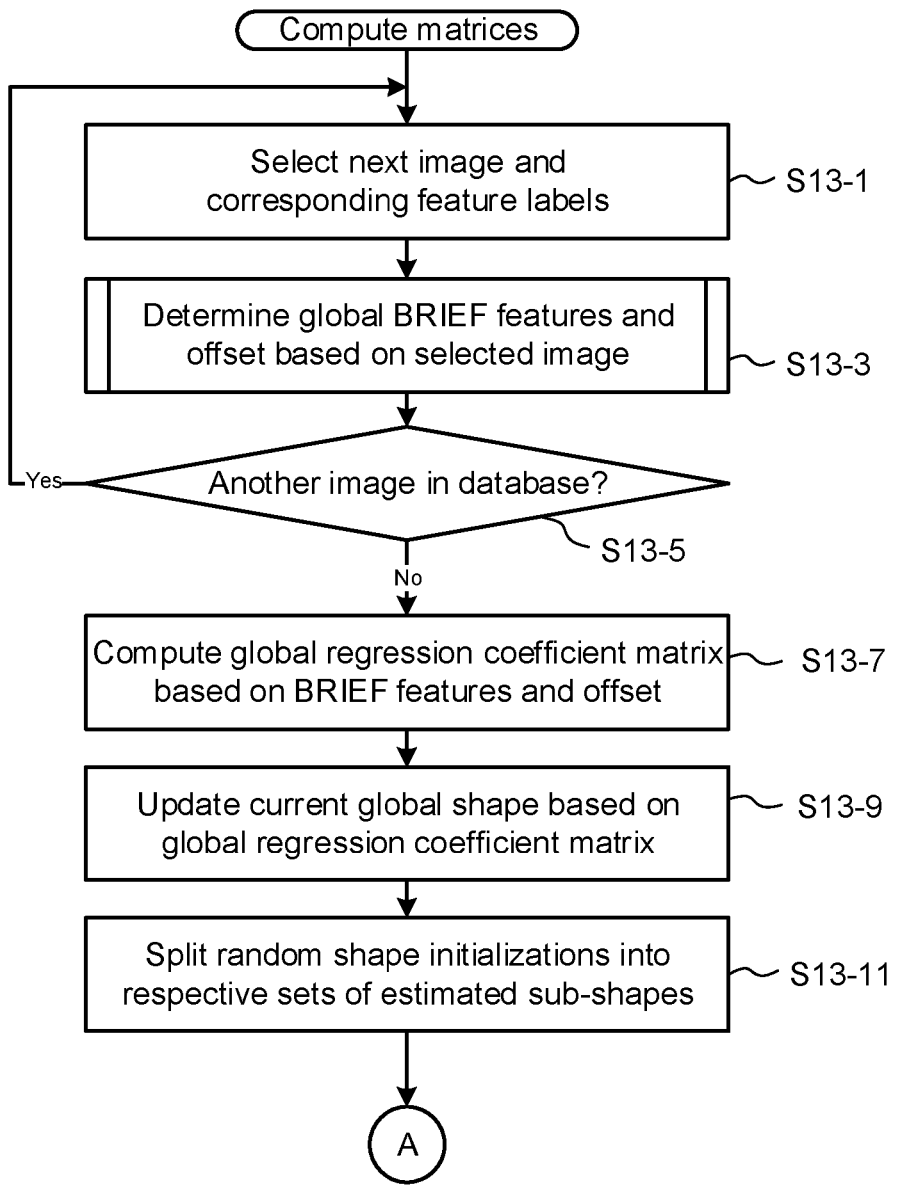
Figure 14:
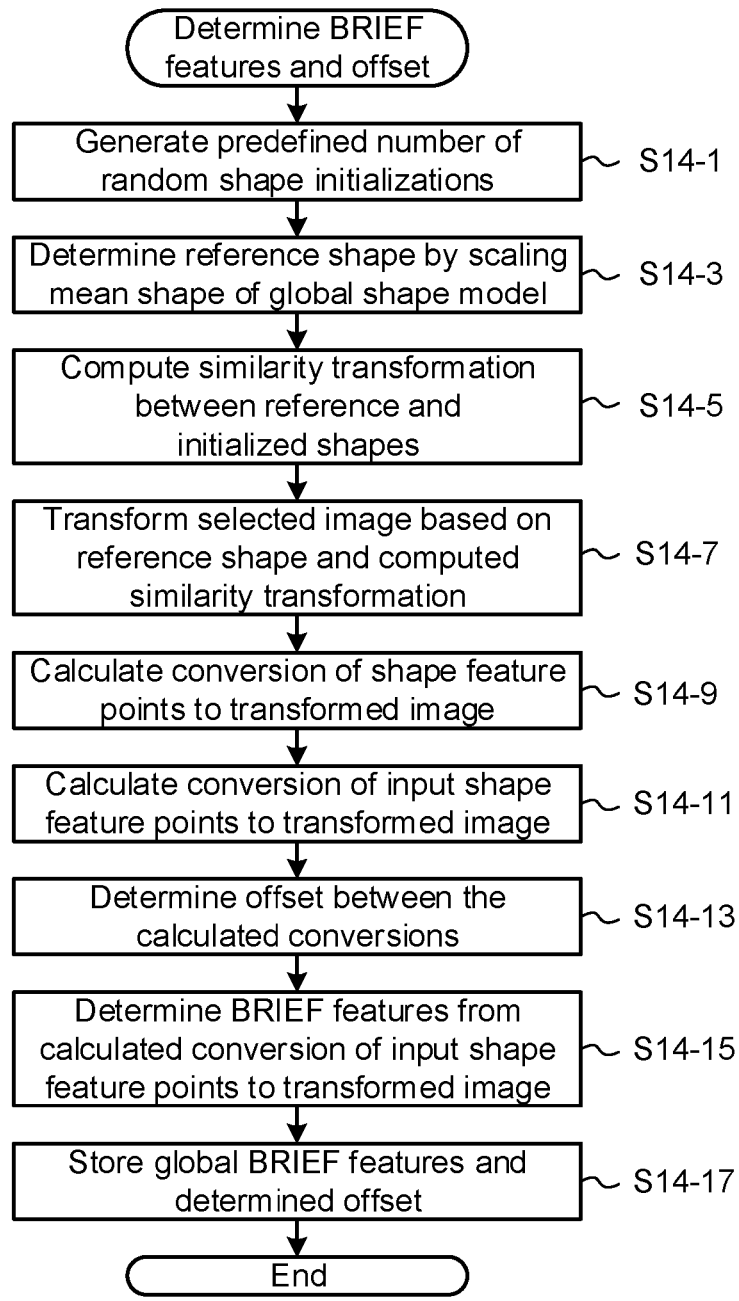
FIG. 14 is a flow diagram illustrating the sub-processing steps performed by the training module to determine offset values and feature point descriptors based on a selected training image.

As shown in FIG. 13A, at step S13-1, the regression computation module 23f selects a first image 23 and corresponding feature points 25b from the trained image database 25. At step S13-3, the regression computation module 23f computes and stores a first set of BRIEF features for the global shape 29 and corresponding offsets, based on the selected training image 23. The process carried out by the regression computation module 23f to process a selected training image 23 is described with reference to FIG. 14.

At step S14-1, the regression computation module 23f generates a pre-defined number of random shape initialisations 53, based on the generated global shape model 27. This generation process involves a bounding box obtained by the object detector module 42 and the output of the statistics computation module 23d. A random value is obtained for x and y displacements within the bounding box and scale relation with the mean shape 27a. Random values are extracted from the 68% of values drawn from a normal distribution or within one standard deviation away from the mean. For example, twenty random values may be computed for scale and x and y displacements, based on the computed statistics stored by the statistics computation module 23d at step S8-11 above, in order to generate a total of twenty different initializations for a single bounding box. This sub-process can be seen as a Monte Carlo initialization procedure which advantageously reduces over-fitting and provides a set of regression coefficient matrices that are capable of more generalised object representations than determinist methods or single initialization estimates, for example. FIG. 12B shows an example of various random shape initialisations 53 displayed over the initial global shape model 27, for a particular training image 23.

At step S14-3, a reference shape is determined by scaling the mean shape 27a of the global shape model 27, based on a pre-defined value specified by the user, for example 200 pixels as inter-ocular distance. This procedure determines the size of the image where all the computations will be performed during training and tracking. A conversion between shape model coordinates frame in unit space to the image plane in pixel coordinates is performed. FIG. 12C schematically illustrates an example of scaling of the mean shape and FIG. 12D schematically illustrates an example of the resulting reference shape 55. At step S14-5, the regression computation module 23f computes the similarity transformation between the reference shape 55 and the plurality of random shape initialisations 53.

Figure 12E:
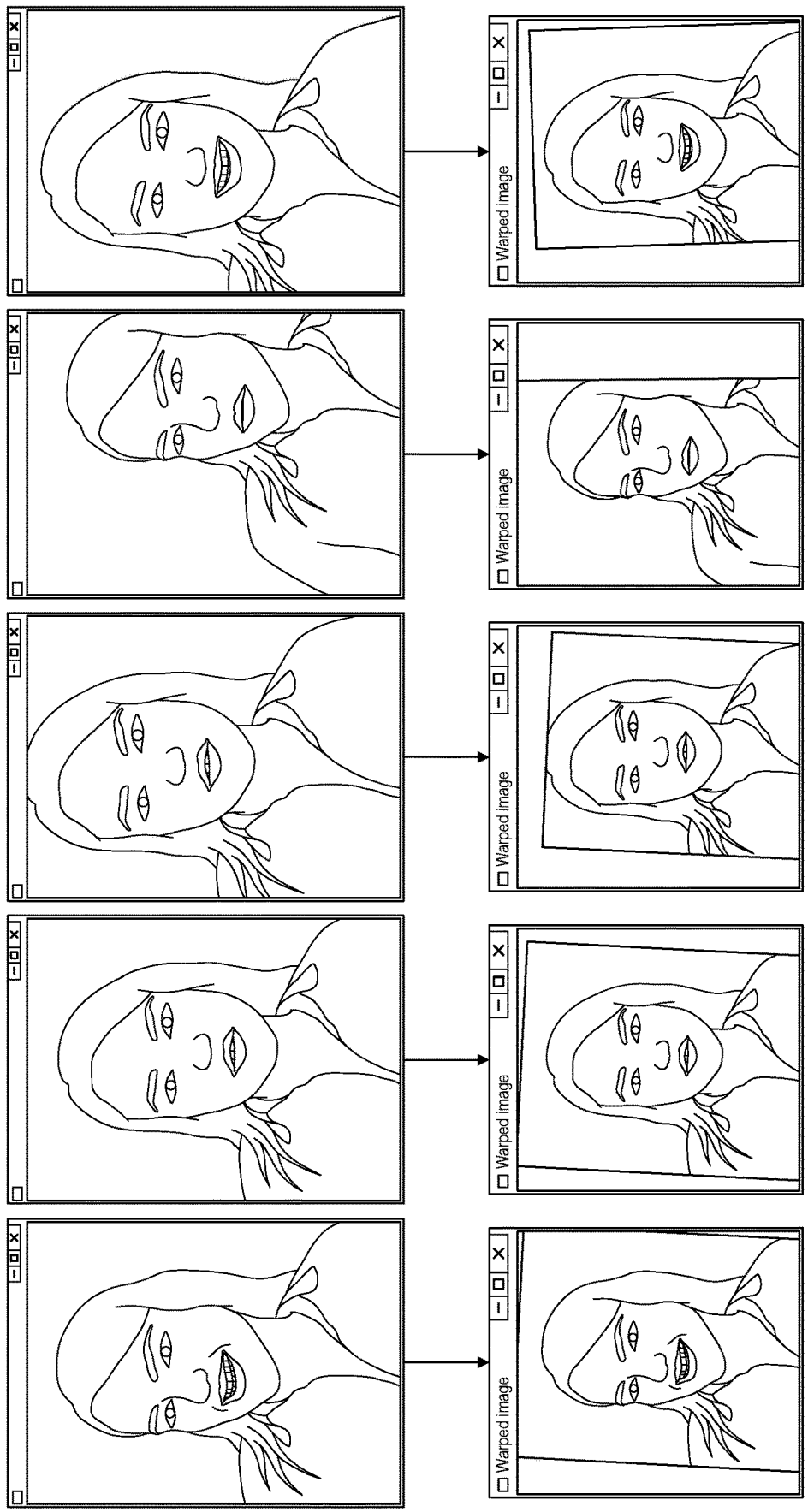

At step S14-7, the regression coefficient module 43 performs image processing on the selected training image 23 to transform the selected training image 23 based on the reference shape 55 and the computed similarity transformation. In this embodiment, the similarity transformation between the current estimate and the reference shape is computed through an iterative process aiming to minimize the distance between both shapes, by means of geometric transformations, such as rotation and scaling, to transform (or warp) the selected training image 23. In the first iteration, just scaling has a role since the first estimation is a scaled mean shape therefore, the rotation matrix will always be an identity matrix. In further iterations, once the initial scaled mean shape has been modified by the refinement process, scale and rotation will be of great importance. Subsequent regression coefficient matrices will operate in transformed images which will be very closely aligned with the reference shape. FIG. 12E shows examples of various geometric transformations that can be performed on respective training images 25a. Advantageously, image transformation in this embodiment is applied globally to the whole image by means of a similarity transformation, in contrast for example to piece-wise affine warping as employed in AAM, whereby no deformation is performed and computation speed is improved considerably.

At step S14-9, the regression computation module 23f calculates a conversion of the feature points 25b of the user-defined shape for the selected training image 23, to the corresponding locations for the labelled feature points in the transformed image generated at step S9-9. At step S14-11, the regression computation module 23f calculates a conversion of the input shape, that is the random shape initialization as defined by the process S9-3 and the current estimated shape in further iterations, to the corresponding feature locations in the transformed image. At step S14-13, the offset between the calculated conversions is determined by the regression computation module 23f. At step S14-15, the regression computation module 23f determines a set of BRIEF descriptors for the current estimated shape, derived from the calculated conversion of the input shape feature points to the transformed image. The determined BRIEF descriptor features and corresponding offsets are stored by the regression computation module 23f at step S14-17, for example in the training image database 25.

Returning to FIG. 13A, at step S13-5, the regression computation module 23f determines if there is another training image 23 in the database 5 to be processed and processing returns to steps S13-1 and S13-3 where regression computation module 23f determines a corresponding set of BRIEF descriptor features and corresponding offsets, based on each of the remaining, or a predetermined number of, training images 25a in the database 5. Once all of the training images 25a have been processed in this way, a regression coefficient matrix 45 for the global shape model 27 is computed and stored for the trained shape model 15 in the model database 21, taking as input all of the stored offsets and BRIEF features determined from the training images 25a.

Accordingly, at step S13-7, the regression computation module 23f computes the regression coefficient matrix 45 for the input global shape, based on the determined BRIEF features and corresponding offsets. In this embodiment, the regression computation module 23f is configured to compute the regression coefficient matrix 45 using a regression analysis technique known as Principal Component Regression (PCR), which reduces the dimensionality of the gathered BRIEF descriptors dataset before performing linear regression using least squares minimization in order to get a regression coefficient matrix. Since the obtained matrix has a dimension equal to the number of selected principal component, a conversion to the original dimensional space is efficiently computed. As known in the art, regression coefficient matrices are an optimal data structure for efficient facial feature detection, for example as discussed in "Supervised Decent Method And Its Applications To Face Alignment", Xiong and Torre. It is appreciated that alternative known regression analysis techniques may instead be used to compute the regression coefficient matrices, such as least squares regression, etc.

At step S13-9, the regression computation module 23f updates the global shape model 27 of the current trained shape model 15 stored in the model database 21, by applying the respective trained functions defined by the computed global regression coefficient matrix 45 to the global shape model 27. It will be appreciated that the computational process for applying the cascading regression coefficient matrix to the input shape is known per se and will depend on the specific regression analysis technique implemented by the system 1. At step S13-11, the regression computation module 23f processes the random shape initializations generated at step S10-1 above, to split each random shape initialization into a respective set of estimated sub-shapes, according to the plurality of defined sub-shape models 15b in the model database 21. For example, referring to the exemplary shape model in FIG. 5, the defined subset of (x,y) coordinates for features of each sub-shape 15b can be selected from each random shape initialization to obtain the respective estimated sub-shape.

The regression computation module 23f then processes the plurality of current sub-shapes 29 to generate a respective plurality of cascading sub-shape regression coefficient matrices 47 for each current sub-shape 15b, based on the estimated sub-shapes obtained at step S13-11 and the training images 25a in the database 5. In this exemplary embodiment, three cascading sub-shape regression coefficient matrices 47 are defined for each current sub-shape 15b. It is appreciated that any number of cascading levels can be defined. At step S13-13, the regression computation module 23f selects a first sub-shape model, and computes and stores respective BRIEF descriptor features for each estimate sub-shape of the current selected sub-shape model 15b, and the corresponding offset based on the training images 25a in the database 5, at the current cascade level.

Accordingly, at step S13-15, the regression computation module 23f selects a first training image 23 and associated feature points 25b from the training image database 25 at step S13-15. At step S13-17, the regression computation module 23f selects a first one of the estimated sub-shapes of the current selected sub-shape model 15b. At step S13-19, the regression computation module 23f determines and stores BRIEF descriptor features for the selected estimated sub-shape, as well as the corresponding offsets, based on the current selected training image 23. At step S13-21, the regression computation module 23f determines whether there is another estimated sub-shape to process and if so, returns to step S13-17 to select the next estimated sub-shape to be processed. Once all of the estimated sub-shapes have been processed based on the current selected training image 23 at the current cascade level, the regression computation module 23f determines at step S13-23 whether there is another training image 23 to process and if so, processing returns to step S13-15 where BRIEF features and offsets data collection process is repeated for the next training image at the current cascade level.

Once all, or a predetermined number, of the training images 25a have been processed in the above way for the current cascade level, the regression computation module 23f computes at step S13-25 a sub-shape regression coefficient matrix 47 for the current selected sub-shape, at the current cascade level, based on all of the determined BRIEF features and corresponding offsets. At step S13-27, the regression computation module 23f updates all of the estimated sub-shapes, by applying the offsets obtained from the respective trained functions defined by the current cascade level sub-shape regression coefficient matrix 47, to the sub-shape model 27. At step S13-29, the regression computation module 23f determines if there is another cascade level of the cascading sub-shape regression coefficient matrices 47 to be generated, and if so, returns to step S13-15 where the process is iteratively repeated for the remaining cascade levels.

After the regression computation module 23f determines at step S13-29 that the current selected sub-shape model 15b has been processed in the above manner for all of the predetermined cascade levels, then at step S13-16, the regression computation module 23f determines if there is another sub-shape model 15b to process and returns to step S13-13 to select the next sub-shape 15b, and to subsequently compute the cascading regression coefficient matrices 47 for the next selected sub-shape 15b and update the next sub-shape 15b, until all of the sub-shapes 29 have been processed and updated by the shape model training module 23 as described above.

Tracking Process

Figure 15:
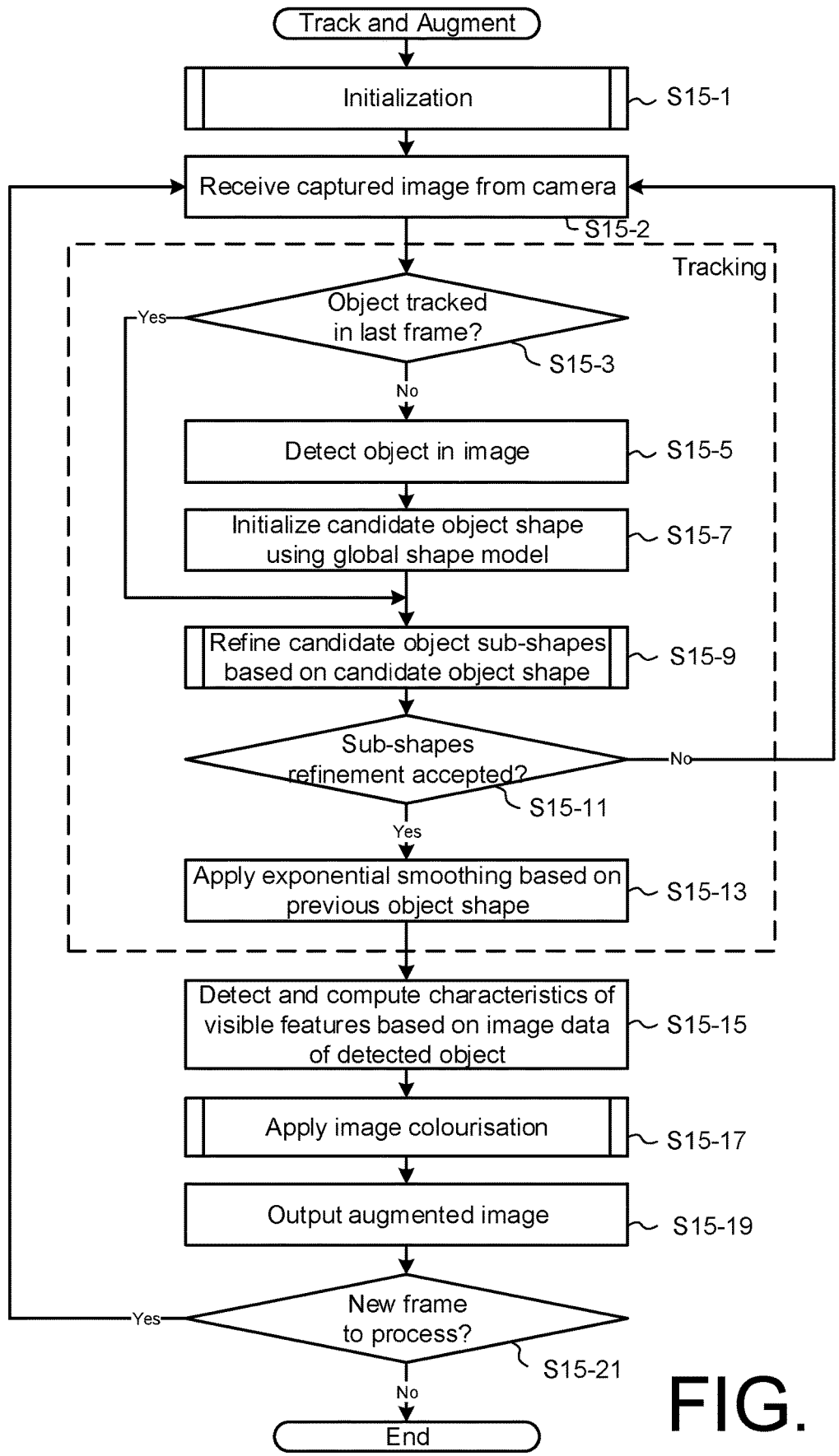
FIG. 15 is a flow diagram illustrating the main processing steps performed by the system of FIG. 1 to track and augment objects in a captured image according to an embodiment.
Figure 16:
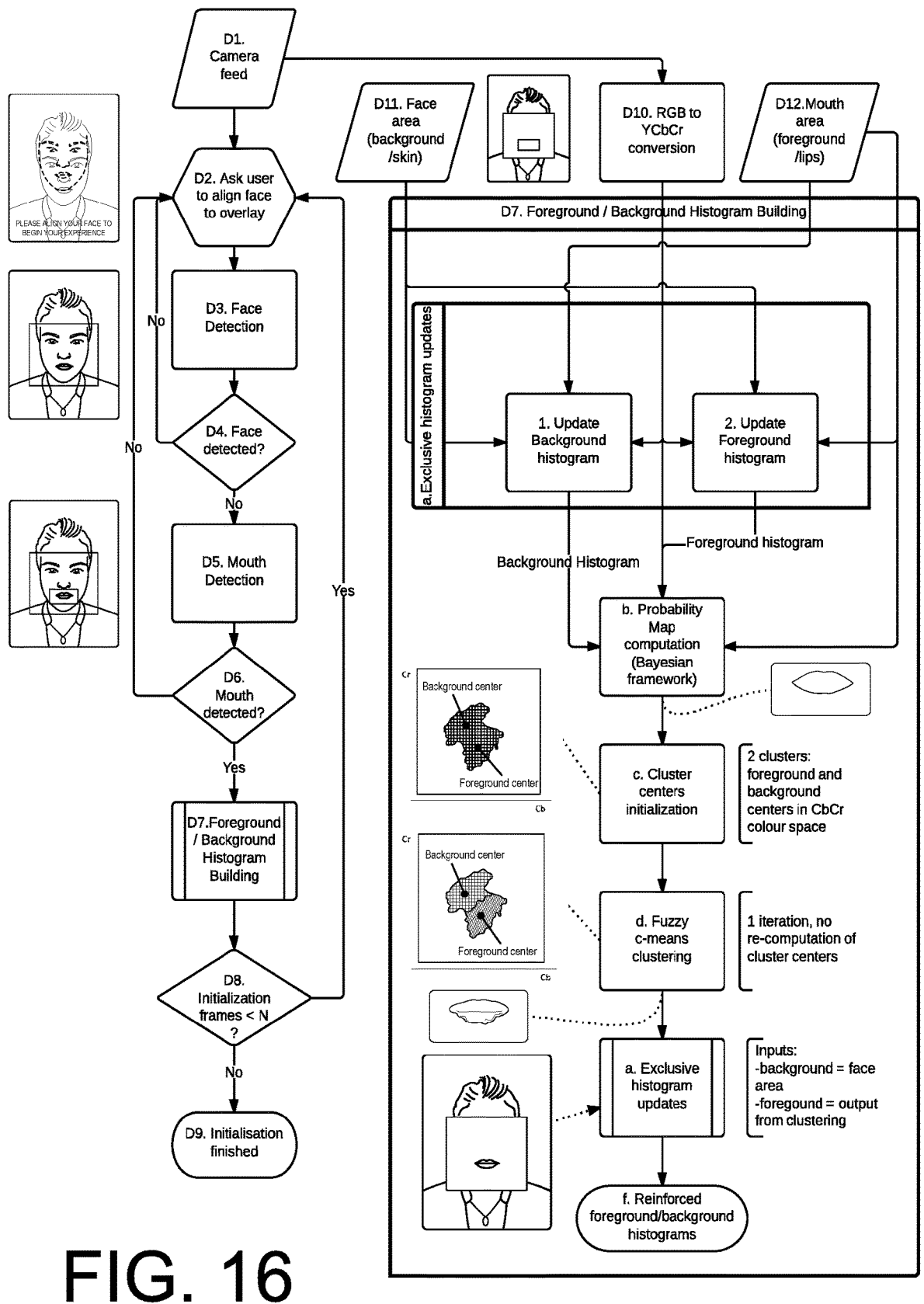
FIG. 16 is a flow diagram illustrating the processing steps of an initialization process performed by the tracking module.

The tracking process performed by the tracking module 3 in the system 1 will now be described in more detail with reference to FIG. 15, which shows the steps of an example computer-implemented tracking process in another embodiment of the present invention. Reference is also made to FIGS. 18A to 18E, illustrating an example sequence of user interface display screens during the tracking process. As shown in FIG. 15, at step S15-1, the tracking module 3 may perform an initialisation sub-process based on received data of an initial captured image from the camera. One example of this processing is described in more detail with reference to FIG. 16. As shown in FIG. 16, the process starts with the supply of a camera feed at a step D1. The camera captures a (video) image of the user, and displays this to the user, for example on a tablet computer which the user is holding. An overlay is also shown on screen, which might for example comprise an outline or silhouette of a person's face. The user is required to align the image of their face with the overlay at a step D2. An example of the displayed image overlay is shown in the representation provided to the left of the step D2.

At a step D3, a face detection step is carried out, which might for example use Haar-like features (discussed for example in "Zur Theorie der orthogonalen Funktionensysteme", Haar, Alfred (1910), 69(3): 316-371). These Haar-like features can be used to pick out the location and scale of the face in the image. An example of this, in which the location of the detected face is identified by a bounding rectangle, is shown in the representation provided to the left of the step D3. At a step D4 it is determined whether or not the face has been detected. If the face has not been detected, then processing cannot go any further, and the process returns to the step D2, for the user to realign their face with the overlay. If the face has been detected, then at a step D5 a mouth detection step is carried out, which might again for example use Haar-like features—this time to pick out the location of the mouth. In order to improve processing efficiency, the search for the mouth can be constrained to lower part of the bounding rectangle already found for the face. An example of a detected mouth area is shown in the representation provided to the left of the step D5. At a step D6, it is determined whether or not the mouth has been detected. If the mouth has not been detected, then processing cannot go any further, and the process returns to the step D2, for the user to realign their face with the overlay.

If the mouth has been detected, then at a step D7 a process of building foreground and background histograms is carried out. Foreground refers to the target area to be detected for example lip regions and background refers to the area to be excluded from the foreground for instance skin regions. The foreground and background histograms are populated with a frequency of colour values occurring in different regions of the image. These regions are defined, for example, by a mask created with the face as background and the mouth as the foreground, as discussed above. In some embodiments one or more histogram updates might be carried out using the same source image and the same mask. The foreground/background histogram building process uses as an input a version of the camera feed, which may be converted from the camera image data colour space (e.g. RGB/RGBA) to a working colour space (e.g. YCrCb), at a step D10. The input colour format depends on the camera installed in the device employed by the user. It is appreciated that the YCrCb colour space is useful, since the histogramming can be carried out in two dimensions by ignoring luminance (Y) and utilising only the colour difference values Cr and Cb.

The step D7 comprises a sub-step D7a of providing exclusive histogram updates based on a face area (background/skin) provided at a step D11 and a mouth area (foreground/lips) provided at a step D12. By exclusive it is meant that updates in the foreground histograms by foreground masks increases the frequency of the corresponding colour but updates the background histogram as well by decreasing the frequency of that same colour. In other words, if the colour belongs to the foreground it can not belong to the background. Therefore, the update of any colour coming from background or foreground produces effects in both histograms. The representation visible between the steps D10 and D11 illustrates the mouth area (white—foreground), and the face area (black—background) employed in the exclusive histogram updates step D7a. At a step D7a1, a background histogram is updated with the frequency of occurrence of each colour value within the face area (but outside of the mouth area). Similarly, at a step D7a2, a foreground histogram is updated with the frequency of occurrence of each colour value within the mouth area. The next steps which take place in the histogram building procedure D7 are meant to improve the quality of the generated histograms.

The background histogram, foreground histogram, and the converted image data are provided to a probability map computation step D7b, which for instance uses a Bayesian framework (or similar statistic technique) to determine the probability of a particular pixel belonging to the lips (foreground) by means of the foreground and background histograms. An example of such a probability map is shown to the right of the step D7b. The probability map computation can be calculated using Bayesian inference to obtain the posterior probability according to Bayes' rule, demonstrated below:

$$P(A|B) = \frac{P(B|A)P(A)}{P(B)} \propto P(B|A)P(A)$$

The probability of a pixel with colour (Cb,Cr) of belonging to the foreground (or being lip) can be computed as follows:

$$P(Cb, Cr) = \frac{P(\text{lip}|Cb, Cr)}{P(\text{lip}|Cb, Cr) + p(\text{nonlip}|Cb, Cr)}$$

where $P(\text{lip}|Cb,Cr) = P(Cb,Cr|\text{lip}) \cdot P(\text{lip})$ $P(\text{nonlip}|Cb,Cr) = P(Cb,Cr|\text{nonlip}) \cdot P(\text{nonlip})$ The conditional probabilities are calculated by means of the statistics stored in the histogram building procedure employed as follows:

$$P(Cb, Cr|\text{lip}) = \frac{foregroundHistogram(Cb, Cr)}{numLipPixels}$$

$$P(Cb, Cr|\text{nonlip}) = \frac{backgroundHistogram(Cb, Cr)}{numNonLipPixels}$$

$$P(\text{lip}) = \frac{numLipPixels}{numTotalPixels}$$

$$P(\text{nonlip}) = \frac{numNonLipPixels}{numTotalPixels}$$

Once the probability map of being lip has been computed around the mouth area, the result will be used in order to reinforce the histogram quality through a clustering process which will produce a finer segmentation of the lip area. At a step D7c, cluster centres for background and foreground are initialised in CbCr colour space. The background cluster centre is computed with colour values corresponding to pixels within the probability map (and thus constrained to the mouth area) which have an associated probability of less than a predetermined threshold value—for example a value of 0.5 in the case of a probability range of 0 to 1. The foreground cluster centre is calculated with colour values corresponding to pixels within the probability map (and thus constrained to the mouth area) which have an associated probability higher than the predetermined threshold value. The cluster centre for each of these is determined as the centre of gravity of all of the points belonging to foreground or background.

An example of the initialization of the clustering procedure, showing the two cluster centres, is visible in the representation to the left of and slightly above the step D7c. Here it can be observed colour values detected as background as light grey colour and foreground pixels as dark grey tone. This figure represents the probability map, shown in the representation on the right on the process D7c, expressed in the colour-space CbCr. It is noticeable that the amount of pixels belonging to the foreground is very spare and indeed difficult to appreciate in the figure; however good enough to give an accurate approximation of where the centre of the cluster might be. This proximity of the clusters is due to the high similarity between skin and lip colour. In the case of selecting skin as foreground and any other colour as background, the clusters will be much further apart and the situation will be easier to overcome. This is an extreme example which proves the success of the algorithm.

At a step D7d, a fuzzy c-means clustering algorithm is used to associate the colour values in the CbCr space observed in the mouth area with the closest cluster centre. This can be carried out by determining the degree of membership of each colour value to the foreground cluster centre. This would effectively shift certain colour values from belonging to one cluster to belonging to the other cluster. An example of the reordering provided by this process is visible in the representation provided to the left of and slightly above the step D7d. The output of this process generates an equivalent probability map to that generated from the original histogram data but it should show a much stronger lip structure, as visible in the representation provided beneath the cluster representations. It should be noted that only a single pass of the fuzzy c-means clustering algorithm is carried out (no iteration). There is no re-computation of the cluster centres. This is because the clusters are too close together and many/further iterations might cause misclassifications.

The fuzzy c-means clustering may be carried out by minimising the following objective function:

$$J_m = \sum_{i=1}^{N} \sum_{j=1}^{C} u_{ij}^m \|x_i - c_j\|^2,$$

where $1 \le m \le \infty$ and $u_{ij}$ is the degree of membership of $x_i$ (CbCr value) in the cluster j, $$u_{ij} = \frac{1}{\sum_{k=1}^{C} \left(\frac{\|x_i - c_j\|}{\|x_i - c_k\|}\right)^{\frac{2}{m-1}}},$$

where m (fuzziness)=2, and $$c_j = \frac{\sum_{i=1}^{N} u_{ij}^m \cdot x_i}{\sum_{i=1}^{N} u_{ij}^m}$$

After the computation of step D7d, an exclusive histogram update step D7a reinforce the content of the histograms based on the output of the clustering stages. In particular, the background histogram is populated with the frequency of occurrence of colour values in the background (face area)—i.e. associated with the background cluster, while the foreground histogram is populated with the frequency of occurrence of colour values in the foreground (lip area)—i.e. associated with the foreground cluster. The representation to the left and above the step D7f shows the regions employed for the histogram updates where the background is the face area and the new strongly defined lip area forms the foreground. Following the histogram building step, at a step D8 it is determined whether a sufficient number of initialisation frames have been processed for the completion of the histogram building process. If less than N frames were processed then the process returns to the step D2, where the user is required to maintain facial alignment with the overlay, and the process of face/mouth detection, histogramming and clustering starts again.

The histograms are accumulated in this way over several frames, improving the robustness of the foreground and background histograms. When at the step D8 it is determined that the threshold number of initialisation frames has been reached, the initialisation process finishes, and the initialised histograms are carried through into the next stage of real-time processing. At this stage the displayed overlay can be removed from the display. It should be understood that while the histogram does not need updating every frame during the tracking process, it is desirable to update the histogram periodically, for example to account for lighting changes. The reinforcement of the histograms can takes place after the initialization and during the tracking procedure in order to overcome situations in which the user experiences changes in the scene such as lighting which affects directly to colour features.

Returning to FIG. 15, at step S15-2, the initialised tracking module 3 receives captured image data from the camera 5, which can be an image in a sequence of images or video frames. At step S15-3, the tracking module determines if an object, a subject's face in this exemplary embodiment, was previously detected and located for tracking in a prior image or video frame. In subsequent iterations of the tracking process, the tracking module 3 may determine that the object was previously detected and located, for example from tracking data (not shown) stored by the system 1, the tracking data including a determined global object shape of the detected object, which can be used as the initialised global object shape for the current captured image. As this is the first time the tracking process is executed, processing proceeds to step S15-5 where the captured image data is processed by the object detector module 42 to detect an object in the image and to output a bounding box 51 of an approximate location for the detected object. At step S15-7, the tracking module 3 initialises the detected object shape using the trained global shape model 27, the statistics computed at step S8-11 above, and the corresponding global shape regression coefficient matrix 45 retrieved from the model database 21, based on the image data within the identified bounding box 51. FIG. 18A shows an example of an initialised object shape 71 within the bounding box 51, displayed over the captured image data 73. The trained shape model may be generated by the shape model training module 23 as described by the training process above. As shown, the candidate object shape at this stage is an initial approximation of the whole shape of the object within the bounding box 51, based on the global shape model 27. Accordingly, the location and shape of individual features of the object, such as the lips and chin in the example of FIG. 18A, are not accurate.

Figure 17:
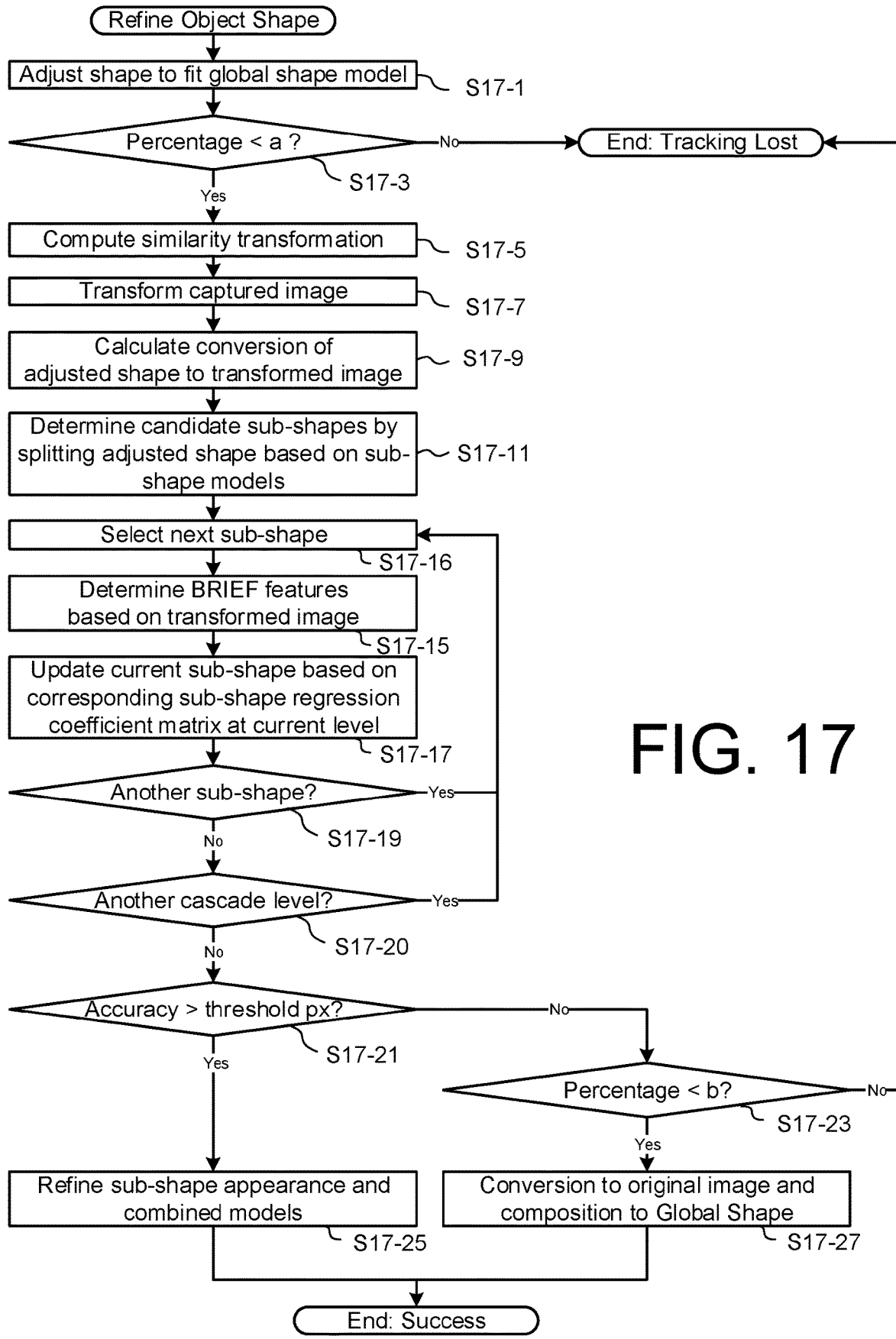
FIG. 17 is a flow diagram illustrating the processing steps performed by the tracking module to refine an object shape according to an embodiment.

At step S15-9, the tracking module 3 performs processing to refine the initialised global object shape using the trained sub-shape models 15b and its corresponding cascading regression coefficient matrices 47 for each sub-shape model 15b. This processing is described in more detail with reference to FIG. 17. As shown in FIG. 17, at step S17-1, the refinement process starts with the tracking module 3 computing and adjusting the nearest shape fitting the global shape model. The weighting of the eigenvectors or parameters of the model for the computed plausible shape should be contained in the scope of valid shapes. A valid shape is defined to have their parameters between some boundaries. Given the shape computed in the previous frame, it is checked if the output from the sub-shape regression coefficient matrices computed independently fits the global shape model definition before proceeding further. Accordingly, at step S17-3, it is determined if the percentage of parameters out of boundaries is greater than a predefined threshold a. In the positive case, tracking of the object is considered to be lost. If so, the refinement process is terminated and processing may return to step S15-1 where a new captured image is received from the camera for processing. Otherwise, the refinement module 19 proceeds to adjust the object shape to fit the global shape model 27, at step S17-3.

At step S17-5, the refinement module 19 computes a similarity transformation between the adjusted shape and the reference shape defined in S9-5. At step S17-7, the captured image is transformed based on the computed similarity transformation. At step S17-9, the refinement module 19 calculates a conversion of the adjusted shape to the transformed image. FIG. 18B shows an example of the refined, adjusted global object shape 71a displayed over the captured image data 73. At step S17-11, the refinement module 19 determines a plurality of candidate sub-shapes from the current adjusted global shape, based on the sub-shape models 15b as discussed above. The candidate sub-shapes are then updated by iteratively applying the corresponding cascading sub-shape regression coefficient matrices 47 to the sub-shape, starting with the highest, most generalised cascade level.

Accordingly, at step S17-13, the refinement module 19 selects a first of the candidate sub-shapes. The refinement module 19 then determines at step S17-15 a BRIEF descriptor for the candidate sub-shape, based on the transformed image at the current cascade level. At step S17-17, the refinement module 19 updates the current candidate sub-shape based on the corresponding sub-shape regression coefficient matrix 47 at the current cascade level, retrieved from the model database 21. As discussed above, this updating step will depend on the particular regression analysis technique implemented by the system 1 to apply the trained function defined by the sub-shape regression coefficient matrix 47 to the sub-shape data values. At step S17-19, the refinement module 19 determines if there is another candidate sub-shape to process and returns to step S17-13 to select the next sub-shape to be processed at the current cascade level. Once all of the candidate sub-shapes have been processed at the current cascade level, the refinement module 19 determines at step S17-20 if there is another cascade level to process, and processing returns to step S17-13 where the sub-shape refinement process is repeated for the next cascade level. FIGS. 18C and 18D show examples of respective sequences of refinement of the two object sub-shapes 75-1, 75-2, displayed over the captured image data 73.

When it is determined at step S17-20 that all of the sub-shapes have been processed for all of the cascade levels of the sub-shape regression coefficient matrices 47, then at step S17-21, the refinement module 19 checks if a pre-defined accuracy threshold needs to be met by the refined sub-model, for example a two pixel accuracy. It will be appreciated that applying an accuracy threshold is optional. If the accuracy is not within the pre-defined threshold, then processing proceeds to step S17-23 where the refinement module 19 determines if the percentage of eigenvector weights is under a second pre-defined limit b in sub-model parameters. If not, the refinement process is terminated and processing proceeds to step S15-11 discussed below. On the other hand, if it is determined at S17-21 that the pre-defined accuracy threshold needs to be met, then at step S17-25, the refinement module 19 performs processing to refine the corresponding sub-shape appearance and combined models 15c, 15d. For example, the sub-shape appearance model 15c can be refined using known AAM techniques. At step S17-27, the refinement module 19 converts the refined sub-shapes 29 back to the original image from the reference image coordinate frame, and brings together the respective separate data structures for the previously split candidate sub-shapes, back into a global shape framework. FIG. 18E shows an example of the further refined global object shape 71a displayed over the captured image data 73, as a result of the refinement of the object sub-shapes 75, which is more efficient and accurate than carrying out further refinement of the global object shape 71.

After the object refinement process is completed, processing proceeds to step S15-10 in FIG. 15, where the tracking module 3 determines whether refinement of the detected object sub-shapes within the acceptable parameters was successfully achieved at step S15-9. If not, for example if it was determined at step S17-3 or step S17-23 that tracking of the object was lost, then processing can return to step S15-1, where a new captured image is received from the camera for processing in a new iteration by the tracking module 3. Otherwise, if the tracking module 3 determines that acceptable sub-shape refinement was achieved by the processing at step S15-9, then at step S15-11, the tracking module 3 optionally applies an exponential smoothing process to the object shape, based on the object shape detected on the previous frame when available. Exponential smoothing can be carried out on the estimated object shape data in order to produce smoothed data for presentation purposes, based on the following exemplary equation:

$$s_t = \alpha x_t + (1-\alpha) s_{t-1}$$

where $s_{t-1}$ is the previous object shape determined from the previous frame, $s_t$ is the smoothed version of the current estimated object shape $x_t$, and $\alpha$ is a weighting value which is adapted automatically during runtime. It will be appreciated that this smoothing technique advantageously provides for improved visualisation of the estimated shape(s), therefore forecasts need not be obtained to make predictions of where the object might be in the next frame. The complex environments where the invention aims to operate includes unknown lighting conditions, movements of both the camera and the object to track occasioning very complicated motion models and no ground truth of the real position or measurement to be used in the update step in more complicated strategies for tracking such as Kalman filtering.

In this way, a robust, accurate and efficient technique for locating and tracking sub-aspects, such as facial features of a global detected object, such as a subject's face, is provided. A number of advantages will be understood from the above description of the embodiments of the present invention. In particular, the tracking technique is efficient and robust to more generalized shape models, by obtaining an initial rough estimate of a candidate global shape using the trained global shape model, and subsequently refining the respective candidate sub-shapes of the candidate global shape by applying the corresponding sub-shape regression coefficient matrices to obtain the displacements which leads to accurate positions of the object features to track. Therefore, the global shape model and corresponding regression coefficient matrix is applied only once to the image data, and each subsequent iteration of the refinement sub-process involves a significantly lesser amount of data, due to the provision of sub-shape models defined by subsets of feature points of the global shape and computation using the corresponding reduced size regression coefficient matrices, making the technique suitable to be used for real-time applications, particularly in computing devices with reduced hardware capabilities, such as limited memory and/or processor resources.

Visible Feature Detection Process

In this embodiment, once tracking of the detected face object is completed successfully after step S15-11 (and optionally step S15-13), then the visible feature detector 17 of the tracking module 3 proceeds to extract and process the face pixels of the captured image data to determine the presence of make-up that is already applied to predefined areas of the detected face in the captured image frame. A more detailed description of the operation of the visible feature detector 17 will now be given with reference to the flow diagrams of FIGS. 19 to 24 for an exemplary set of predefined visible features: regions of the detected face that have applied foundation, blush, eyeshadow and/or lipstick makeup. Reference is also made to FIGS. 25 to 30 schematically illustrating examples of the visible facial features that are processed by the visible feature detector 17 to compute characteristics of any identified applied makeup based on respective predefined regions of captured image data.

Figure 19:
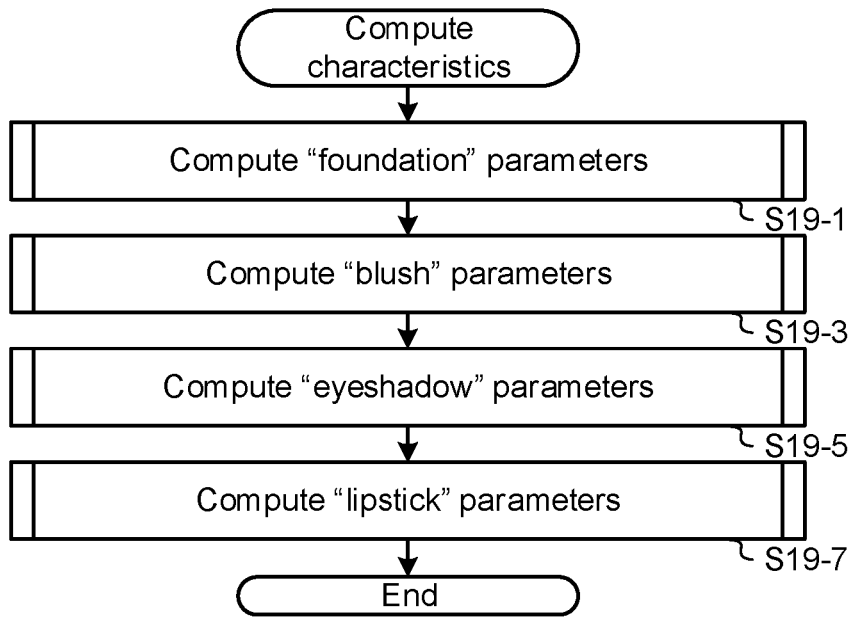
FIG. 19 is a flow diagram illustrating processing steps performed by the visible feature detector shown in FIG. 1 to compute characteristics of visible features, according to an exemplary embodiment.
Figure 21:
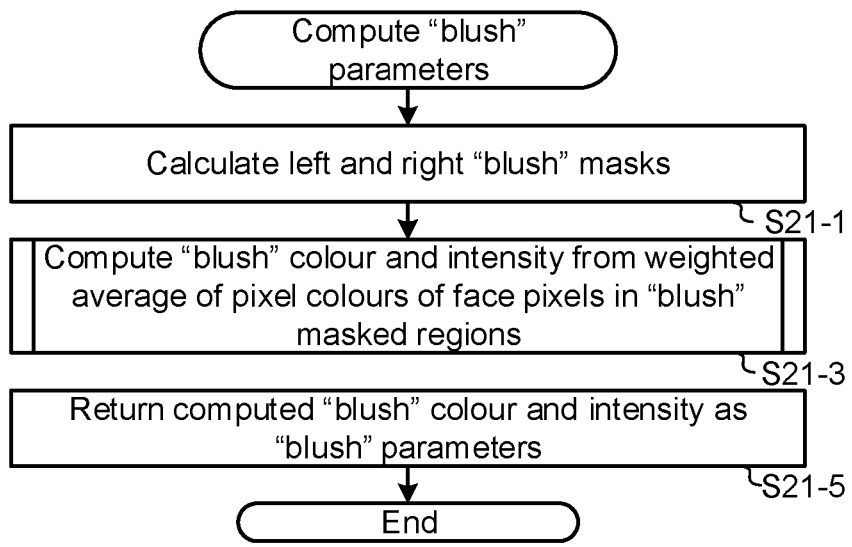
FIG. 21 is a flow diagram illustrating processing steps performed by the visible feature detector to compute parameters of an applied blush visible feature, according to the exemplary embodiment.
Figure 20:
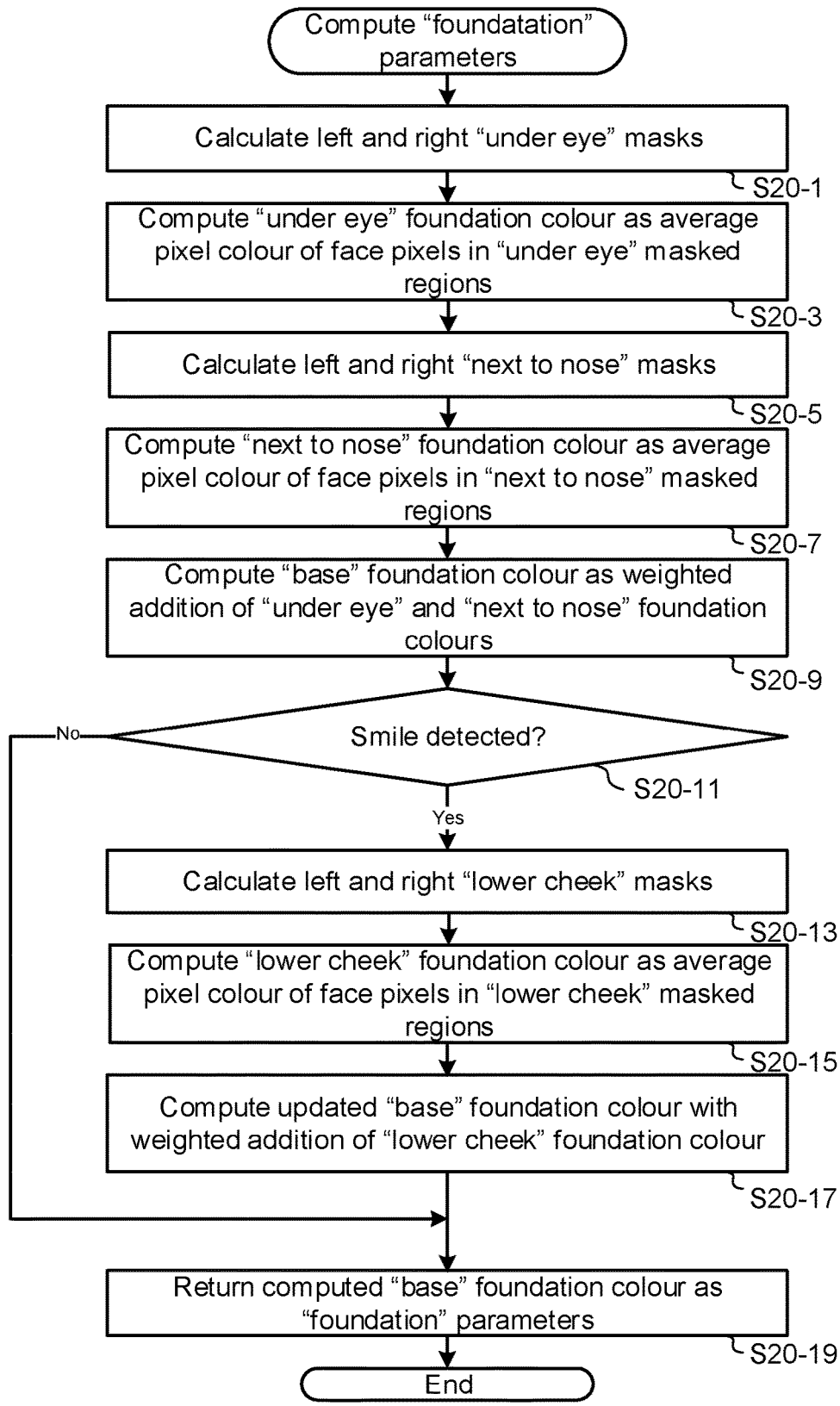
FIG. 20 is a flow diagram illustrating processing steps performed by the visible feature detector to compute parameters of an applied foundation visible feature, according to the exemplary embodiment.

Referring to FIG. 19, at step S19-1, the visible feature detector 17 computes one or more parameters for a first predefined visible feature representative of the characteristics of a layer of "foundation" makeup that has been applied generally to the skin areas of the detected face. It is appreciated that in the absence of any actual applied foundation makeup, the "foundation" parameters will instead be indicative of the base skin tone or colour of the detected face. As illustrated in greater detail in the flow diagram of FIG. 20, computation of the "foundation" parameters begins with the visible feature detector 17 calculating the location and dimensions of left and right "under eye" masks at step S20-1, relative to respective predefined vertices of the normalised face mesh 31' corresponding to a first region of the face below the eyes, this first region typically comprising pixels that are a lighter representative of accurate parameters of the applied foundation makeup, due to overexposure from common lighting effects when the subject person is facing the camera straight on.

Figure 25A:
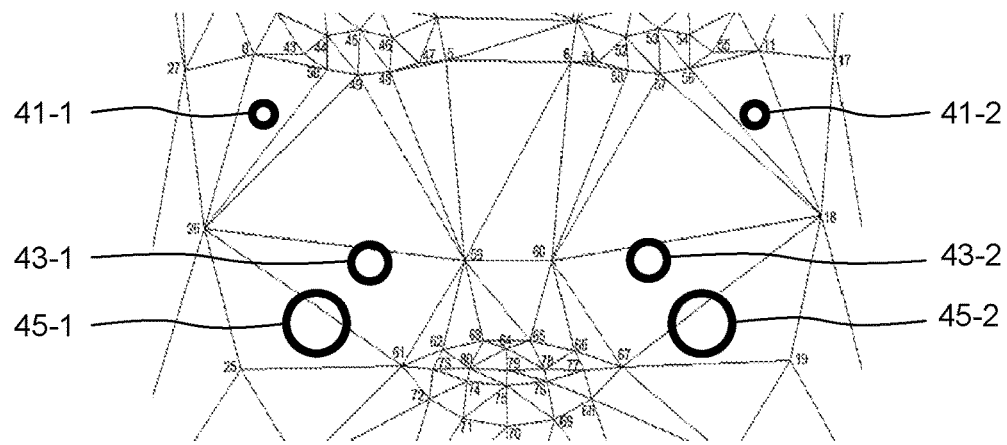
FIGS. 25A to 25C, are schematic illustrations of example masks that are used to compute foundation parameters.
Figure 25B:
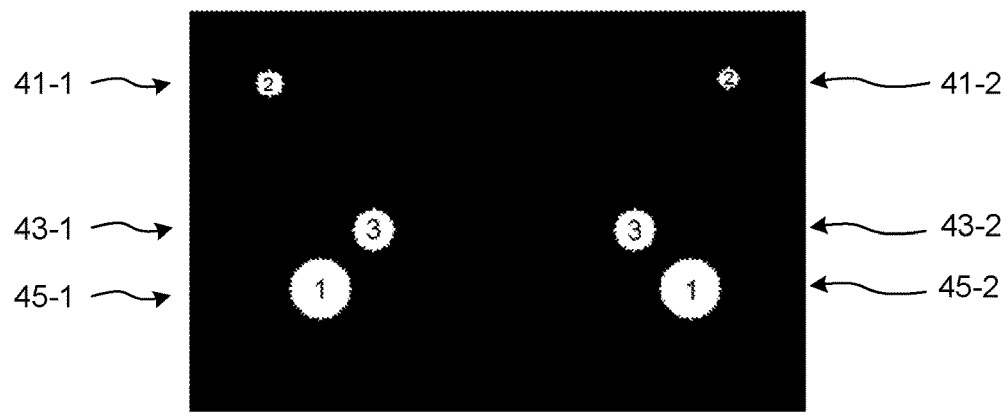

FIGS. 25A and 25B schematically illustrate an example of the left and right "under eye" masks 41 that are circles having respective centre locations and radius defined as:

underLeftEye·x=((mesh[0].X+2*mesh[50].X+mesh[26]X)/4)−offsetX;

underLeftEye·y=((mesh[0]Y+mesh[50]Y+1.5*mesh[26]Y)/3.5)−offsetY;

underRightEye·x=((2*mesh[56].X+mesh[11].X+mesh[18].X)/4)−offsetX;

underRightEye·y=((mesh[56]Y+mesh[11]Y+1.5*mesh[18]Y)/3.5)−offsetY;

where mesh[i]X/Y is the determined location of vertex i in the warped instance of the trained face mesh fitted to the detected face, and offsetX/Y is determined from the position of the extracted face pixels relative to the captured image data.

radiusUnderLeftEye=distanceBetweenPoints(50,49)/underEyeRadiusConst;

radiusUnderRightEye=distanceBetweenPoints(57,56)/underEyeRadiusConst;

where the calculated radius depends on the distance between identified vertex points of the warped instance of the trained face mesh fitted to the detected face, and underEyeRadiusConst is a predefined constant value 2.3, in this example. The radius may be set to a predefined minimum value 3 in this example, if the calculated radius is less than the predefined minimum value.

Figure 25C:
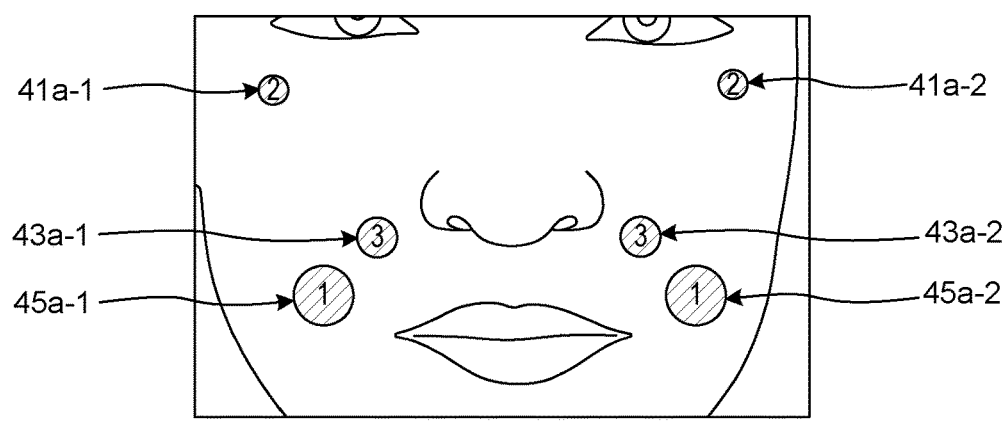

At step S20-3, the visible feature detector 17 computes a foundation colour of the "under eye" regions of the detected face, based on the average pixel colour of extracted face pixels in the left and right "under eye" masked regions 41a-1 and 41a-2, as schematically illustrated in FIG. 25C. The average pixel colour may be calculated from the average HSV values of pixels in the regions, excluding pixels having H, S and/or V values that are below predefined thresholds, for example to avoid shadow areas and known pixel values that are not representative of skin colour values. At step S20-5, the visible feature detector 17 calculates the location and dimensions of left and right "next to nose" masks, relative to respective predefined vertices of the normalised face mesh 31' corresponding to a second region of the face adjacent to the nose, this second region typically comprising pixels that are darker than the pixels in the first region of the face below the eyes, for example due to shadow effects from the adjacent nose.

FIGS. 25A and 25B schematically illustrate an example of the left and right "next to nose" masks 43 that are circles having respective centre locations and radius defined as:

nextNoseLeft·x=((2*mesh[60].X+mesh[18].X)/3)−offsetX;

nextNoseLeft·y=((2*mesh[60]Y+mesh[18]Y+mesh[67]Y)/4)−offsetY;

nextNoseRight·x=((2*mesh[59].X+mesh[26].X)/3)−offsetX;

nextNoseRight·y=((2*mesh[59]Y+mesh[26]Y+mesh[61]Y)/4)−offsetY;

radiusNextNoseLeft=distanceBetweenPoints(60,18)/nextNoseRadiusConst;

radiusNextNoseRight=distanceBetweenPoints(26,59)/nextNoseRadiusConst;

where mesh[i]X/Y, offsetX/Y and distanceBetweenPoints are as described above, and nextNoseRadiusConst is a predefined constant value 2.3, in this example. The radius may be set to a predefined minimum value 3 in this example, if the calculated radius is less than the predefined minimum value.

At step S20-7, the visible feature detector 17 computes a foundation colour of the "next to nose" regions of the detected face, as the average pixel colour of extracted face pixels in the left and right "next to nose" masked regions 43a-1 and 43a-2, also schematically illustrated in FIG. 25C. At step S20-9, the visible feature detector 17 computes a "base" foundation colour of the detected face, as the weighted addition of the "under eye" foundation colour computed at step S20-3 and the "next to nose" foundation colour computed at step S20-7. For example, the "under eye" foundation colour and the "next to nose" foundation colour may be predefined with equal weighting, thus each contributing 50% to the "base" foundation colour. Alternative weightings are envisaged for example to account for other types of objects, known environmental conditions that affect the captured image data, etc. In this way, the "base" foundation colour is representative of the average pixel brightness from the first and second foundation regions 41 and 43.

At step S20-11, the visible feature detector 17 determines if a smile is detected in the source image. For example, referring to the example illustrated in FIGS. 5E and 25A, presence of a smile may be detected if it is determined that teeth are showing or that the gap between upper and lower lip is wider than the size of the upper lip:

innerLipsDist>upperLipsDist where upperLipsDist is calculated as the distance in pixels between vertex points 64 and 79, and innerLipsDist is calculated as the distance in pixels between vertex points 79 and 75. Additionally or alternatively, presence of a smile may be detected if the mouth corners are determined to be higher than the middle to top lip:

mesh[64]$Y$>outerLipsAvg$Y$ where outerLipsAvgY is calculated as the average Y coordinate of the mouth corner points, mesh[61] and mesh [67]. It will be appreciated that other techniques for detecting presence of a smile are envisaged.

If presence of a smile is detected at step S20-11, then at step S20-13, the visible feature detector 17 calculates the location and dimensions of left and right "lower cheek" masks, relative to respective predefined vertices of the normalised face mesh 31' corresponding to a third region of the face, this third region typically comprising pixels having values that are darker than the pixels in the "under eye" regions and the "next to nose" regions of the face. A more accurate representation of the parameters of foundation makeup applied to the cheek area may be calculated from the average of pixel values in the first, second and third regions, in the absence of shadow effects that are introduced from dimples in the cheek area when the subject person is smiling.

FIGS. 25A and 25B schematically illustrate an example of the left and right "lower cheek" masks 45 that are circles having respective centre locations and radius defined as:

lowerCheekLeft·$x$=((mesh[26]$X$+3*mesh[61]$X$+mesh[25]$X$)/5)−offset$X$;

lowerCheekLeft·$y$=((mesh[26]$Y$+3*mesh[61]$Y$+mesh[25]$Y$)/5)−offset$Y$;

lowerCheekRight·$x$=((3*mesh[67]$X$+mesh[18]$X$+mesh[19]$X$)/5)−offset$X$;

lowerCheekRight·$y$=((3*mesh[67]$Y$+mesh[18]$Y$+mesh[19]$Y$)/5)−offset$Y$;

radiusLowerCheekLeft=distanceBetweenPoints(25, 61)/lowerCheekRadiusConst;

radiusLowerCheekRight=distanceBetweenPoints(67, 19)/lowerCheekRadiusConst;

where mesh[i]X/Y, offsetX/Y and distanceBetweenPoints are as described above, and lowerCheekRadiusConst is a predefined constant value 4.7, in this example. The radius may be set to a predefined minimum value 3 in this example, if the calculated radius is less than the predefined minimum value.

At step S20-15, the visible feature detector 17 computes a foundation colour of the "lower cheek" regions of the detected face, as the average pixel colour of extracted face pixels in the left and right lower cheek" masked regions 45*a*-1 and 45*a*-2, also schematically illustrated in FIG. 25C. At step S20-17, the visible feature detector 17 computes an updated "base" foundation colour of the detected face with the weighted addition of the "lower cheek" foundation colour computed at step S20-15. The updated "base" foundation colour computed at step S20-17 is returned at step S20-19 as a "foundation" parameter. On the other hand, if the visible feature detector 17 does not detect the presence of a smile at step S20-11, then the "base" foundation colour computed at step S20-9 is instead returned at step S20-19 as a "foundation" parameter.

Figure 26A:
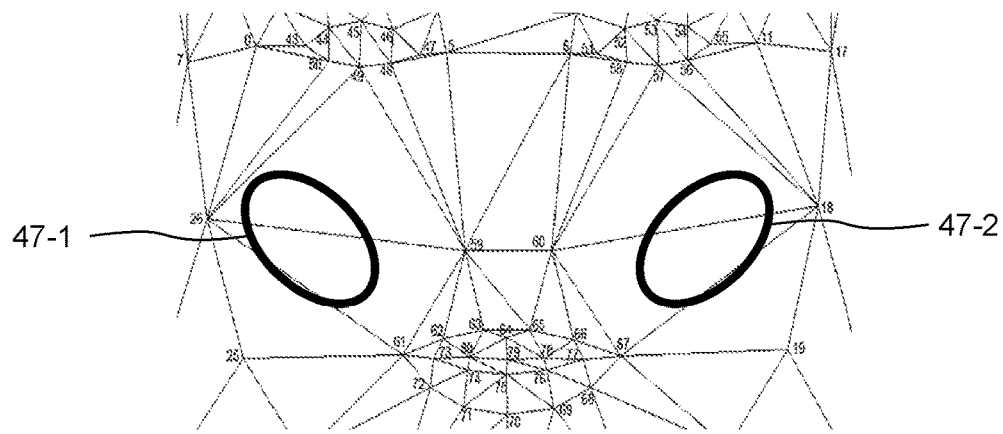
FIGS. 26A to 26C, are schematic illustrations of example masks that are used to compute blush parameters.
Figure 26B:

Returning to FIG. 19, at step S19-3, the visible feature detector 17 computes a set of parameters for a second predefined visible facial feature representative of the characteristics of an applied layer of "blush" makeup to predefined areas of the detected face. As illustrated in greater detail in the flow diagram of FIG. 21, computation of the "blush" parameters begins with the visible feature detector 17 calculating the location and dimensions of left and right "blush" masks at step S21-1, relative to respective predefined vertices of the normalised face mesh 31' corresponding to regions of the face where blusher makeup is typically applied. FIGS. 26A and 26B schematically illustrate an example of the left and right "blush" masks 47 that are ovals (ellipsoids) having respective centre locations and radii defined as:

ovalLeft·$x$=0.6*(mesh[26]$X$)+0.4*(mesh[59]$X$);

ovalLeft·$y$=0.4*mesh[26]$Y$+0.4*mesh[59]$Y$+0.2*mesh[64]$Y$;

ovalRight·$x$=0.6*(mesh[18]$X$)+0.4*(mesh[60]$X$);

ovalRight·$y$=0.4*mesh[18]$Y$+0.4*mesh[60]$Y$+0.2*mesh[64]$Y$;

where mesh[i]X/Y is as described above, and ovalWidthRadiusLeft=distanceBetweenPoints(59,26)/widthEllipseConst;

ovalHeightRadiusLeft=distanceBetweenPoints(59, 26)/heightEllipseConst;

ovalWidthRadiusRight=distanceBetweenPoints(60, 18)/widthEllipseConst;

ovalHeightRadiusRight=distanceBetweenPoints(60, 18)/heightEllipseConst;

where widthEllipseConst is a predefined constant value 1.8 and heightEllipseConst is a predefined constant value 3, and where the ovals are created at a predefined tilt angle of 45 degrees, in this example.

Figure 26C:
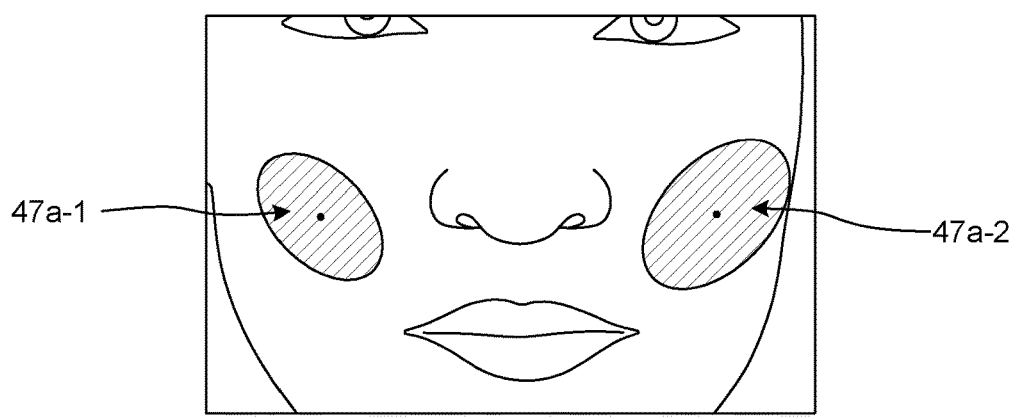

At step S21-3, the visible feature detector 17 computes colour and intensity parameters of the blush makeup applied to the "blush" regions of the detected face, based on the weighted average of the pixel colours of extracted face pixels in the left and right "blush" masked regions 47*a*-1 and 47*a*-2, as schematically illustrated in FIG. 26C. The process of computing the weighted average of extracted pixel colours is described in more detail with reference to FIG. 22. At step S22-1, the visible feature detector 17 determines if a user-configurable brightness threshold setting is to be used to discard darker face pixels from the colour calculations. If it is determined that a brightness threshold is to be used for example to exclude shadow and noise pixels in the region, then at step S22-3, the visible feature detector 17 calculates a low bound brightness threshold based on pixel colours of extracted face pixels in the "blush" masked regions 47*a*. For example, the visible feature detector 17 may sum all the pixel values within a masked region, identify the bottom N pixels within a predefined percentage, and return a value defining the low bound brightness threshold that is to be applied to subsequently exclude pixels from calculation of the weighted average. On the other hand, if it is determined that a brightness threshold is not to be used, then at step S22-5, the visible feature detector 17 sets the low bound brightness threshold to zero, or a null threshold value. At step S22-7, the visible feature detector 17 retrieves the pixel value of the next extracted face pixel in the masked "blush" region, this being the first pixel in the region the first time the step is performed.

At step S22-9, the visible feature detector 17 determines if the retrieved pixel brightness value is above the low bound brightness threshold and proceeds to discard the pixel from the colour calculation if it is determined that the brightness is not above the threshold. On the other hand, if it is determined that the pixel brightness is above the threshold, then at step S22-11, the visible feature detector 17 calculates a pixel weighting value as the Euclidean distance of the pixel value from the base foundation colour value of the "foundation" parameters computed at step S19-1. At step S22-13, the visible feature detector 17 determines if the calculated distance is above a predefined maximum threshold value, and proceeds to discard the pixel from the colour calculation if it is determined that the distance is above the threshold, thus indicative of shadow and/or noise pixels that will affect the accuracy of the resulting colour calculation. On the other hand, if it determined that the calculated distance is within the predefined maximum threshold, then the visible feature detector 17 adds the weighted pixel value to a running total of pixel values at step S22-15, and adds the calculated pixel weighting to a running total of differences at step S22-17.

At step S22-19, the visible feature detector 17 determines if there is another extracted face pixel in the masked "blush" region to be processed, and processing returns to step S22-7 for the next pixel. On the other hand, if it is determined at step S22-19 that all of the face pixels in the "blush" region have been processed, then at step S22-21, the visible feature detector 17 calculates the weighted average from the final total of weighted pixels values within the predefined thresholds, divided by the final total of differences (i.e. the calculated colour distances) from the base foundation colour. At step S22-23, the weighted average calculated at step S22-21 is returned, together with the total of differences from the base foundation colour, which is indicative of the intensity of the "blush" colour. In this way, the weighted average computation provides parameters of the visible feature, which is the colour and intensity of blush makeup applied to the cheek area in this instance, that accurately represent the detected feature taking into account any underlying applied foundation makeup product. Returning to FIG. 22, the "blush" colour and intensity computed at step S22-3 is returned at step S22-5 as the "blush" parameters.

Figure 27A:
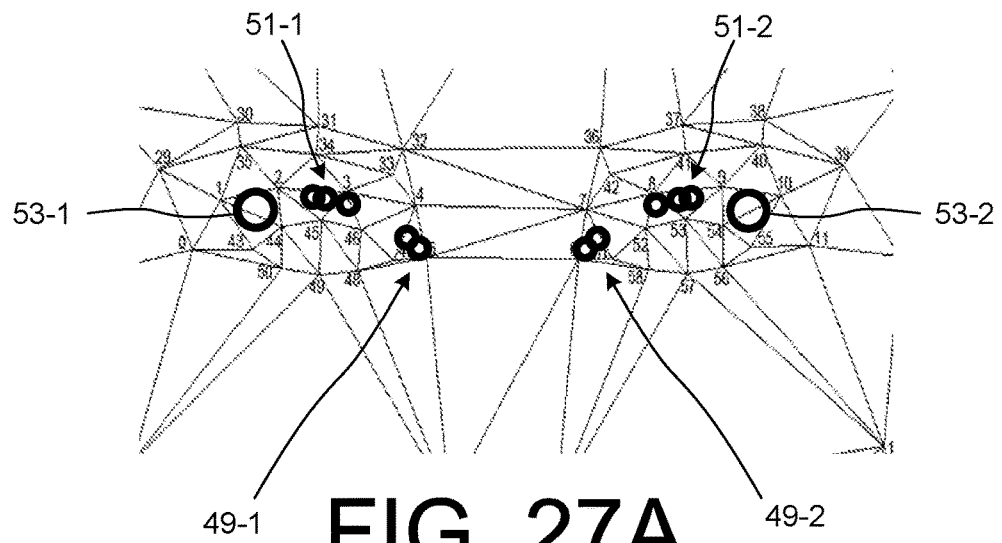
FIGS. 27A to 27C, are schematic illustrations of example masks that are used to compute eyeshadow parameters.
Figure 27B:
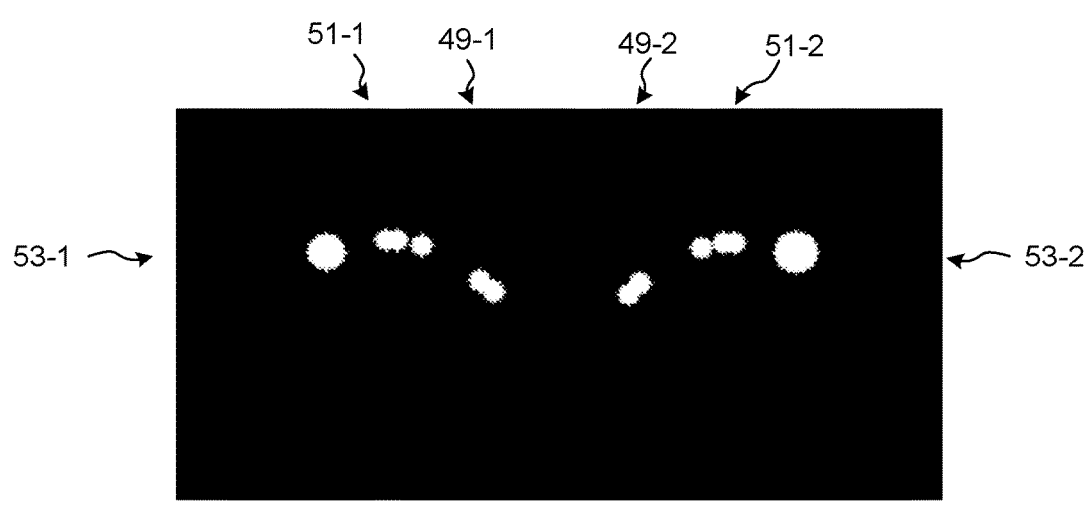

Returning to FIG. 19, at step S19-5, the visible feature detector 17 computes a set of parameters for a third predefined visible facial feature representative of the characteristics of an applied layer of "eyeshadow" makeup to predefined areas of the detected face. As illustrated in greater detail in the flow diagram of FIG. 23, computation of the "eyeshadow" parameters in this worked example begins with the visible feature detector 17 calculating the location and dimensions of left and right "inner eye" masks at step S23-1, relative to respective predefined vertices of the normalised face mesh 31' corresponding to a first region around the eyes where eyeshadow is typically applied, this first region typically comprising darker pixels due to shadow effects from the adjacent nose. FIGS. 27A and 27B schematically illustrate an example of the left and right "inner eye" masks 49, each consisting two circles that have respective centre locations and radii defined as:

$$innerLeftEye1 \cdot x=((mesh[4]X+mesh[47]X+2*mesh[5]X)/4)-offsetX;$$

$$innerLeftEye1 \cdot y=((mesh[4]Y+mesh[47]Y+2*mesh[5]Y)/4)-offsetY;$$

$$innerRightEye1 \cdot x=((2*mesh[6]X+mesh[7]X+mesh[51]X)/4)-offsetX;$$

$$innerRightEye1 \cdot y=((2*mesh[6]Y+mesh[7]Y+mesh[51]Y)/4)-offsetY;$$

$$innerLeftEye2 \cdot x=mesh[5]X-offsetX;$$

$$innerLeftEye2 \cdot y=mesh[5]Y-offsetY;$$

$$innerRightEye2 \cdot x=mesh[6]X-offsetX;$$

$$innerRightEye2 \cdot y=mesh[6]Y-offsetY;$$

$$radiusLeftEye=distanceBetweenPoints(47,5)*1.4;$$

$$radiusRightEye=distanceBetweenPoints(6,51)*1.4;$$

where mesh[i]X/Y, offsetX/Y and distanceBetweenPoints are as described above, and where the radius may be set to a predefined minimum value 2 in this example, if the calculated radius is less than the predefined minimum value.

At step S23-3, the visible feature detector 17 calculates the location and dimensions of left and right "main eye" masks, relative to respective predefined vertices of the normalised face mesh 31' corresponding to a second region above the eyes where eyeshadow is typically applied, this second region typically comprising pixels having values that are good representatives of accurate eyeshadow parameters. FIGS. 27A and 27B also schematically illustrate an example of the left and right "main eye" masks 51, each consisting three circles that have respective centre locations and radii defined as:

$$radiusMainLeftEye=distanceBetweenPoints(34,45)/mainEyeRadiusConst);$$

$$radiusMainRightEye=distanceBetweenPoints(41,53)/mainEyeRadiusConst);$$

$$mainLeftEye1 \cdot x=((2*mesh[2]X+mesh[3]X+2*mesh[45]X)/5)-offsetX;$$

$$mainLeftEye1 \cdot y=((mesh[2]Y+mesh[3]Y+mesh[45]Y)/3)-offsetY;$$

$$mainLeftEye2 \cdot x=((mesh[2]X+2*mesh[3]X+2*mesh[45]X)/5)-offsetX;$$

$$mainLeftEye2 \cdot y=((mesh[2]Y+mesh[3]Y+mesh[45]Y)/3)-offsetY;$$

$$mainLeftEye3 \cdot x=((mesh[3]X+mesh[4]X+2*mesh[45]X)/4)-offsetX;$$

$$mainLeftEye3 \cdot y=((mesh[3]Y+mesh[4]Y+1.5*mesh[45]Y)/3.5)-offsetY;$$

$$mainRightEye1 \cdot x=((2*mesh[8]X+mesh[9]X+2*mesh[53]X)/5)-offsetX;$$

$$mainRightEye1 \cdot y=((mesh[8]Y+mesh[9]Y+mesh[53]Y)/3)-offsetY;$$

$$mainRightEye2 \cdot x=((mesh[8]X+2*mesh[9]X+2*mesh[53]X)/5)-offsetX;$$

$$mainRightEye2 \cdot y=((mesh[8]Y+mesh[9]Y+mesh[53]Y)/3)-offsetY;$$

$$mainRightEye3 \cdot x=((mesh[7]X+mesh[8]X+2*mesh[53]X)/4)-offsetX;$$

$$mainRightEye3 \cdot y=((mesh[7]Y+mesh[8]Y+1.5*mesh[53]Y)/3.5)-offsetY;$$

where mesh[i]X/Y, offsetX/Y and distanceBetweenPoints are as described above, mainEyeRadiusConst is a predefined constant 4.9 in this example, and where the radius may be set to a predefined minimum value 3 in this example, if the calculated radius is less than the predefined minimum value.

At step S23-5, the visible feature detector 17 calculates the location and dimensions of left and right "outer eye" masks, relative to respective predefined vertices of the normalised face mesh 31' corresponding to a third region around the eyes where eyeshadow is typically applied, this third region typically comprising darker pixels than the first and second regions, for example due to shadow effects from the nose and brow.

FIGS. 27A and 27B also schematically illustrate an example of the left and right "outer eye" masks 53, each consisting two circles that have respective centre locations and radii defined as:

outerLeftEye·x=((mesh[0]+4*mesh[1]+mesh[2]+mesh[43]+mesh[44])/8)−offsetX;

outerLeftEye·y=((mesh[0]+7*mesh[1]+mesh[2]+mesh[43]+mesh[44])/11)−offsetY;

outerRightEye·x=((mesh[9]X+4*mesh[10]X+mesh[11]X+mesh[54]X+mesh[55]X)/8)−offsetX;

outerRightEye·y=((mesh[9]Y+7*mesh[10]Y+mesh[11]Y+mesh[54]Y+mesh[55]Y)/11)−offsetY;

innerLeftEye2·x=mesh[5]X−offsetX;

innerLeftEye2·y=mesh[5]Y−offsetY;

innerRightEye2·x=mesh[6]X−offsetX;

innerRightEye2·y=mesh[6]Y−offsetY;

radiusLeftEye=distanceBetweenPoints(43,1)/radiusConst);

radiusRightEye=distanceBetweenPoints(55,10)/radiusConst);

where mesh[i]X/Y, offsetX/Y and distanceBetweenPoints are as described above, outerEyeRadiusConst is a predefined constant 2.3 in this example, and where the radius may be set to a predefined constant value 4 in this example, if the calculated radius is less than the minimum defined by the constant value.

Figure 27C:
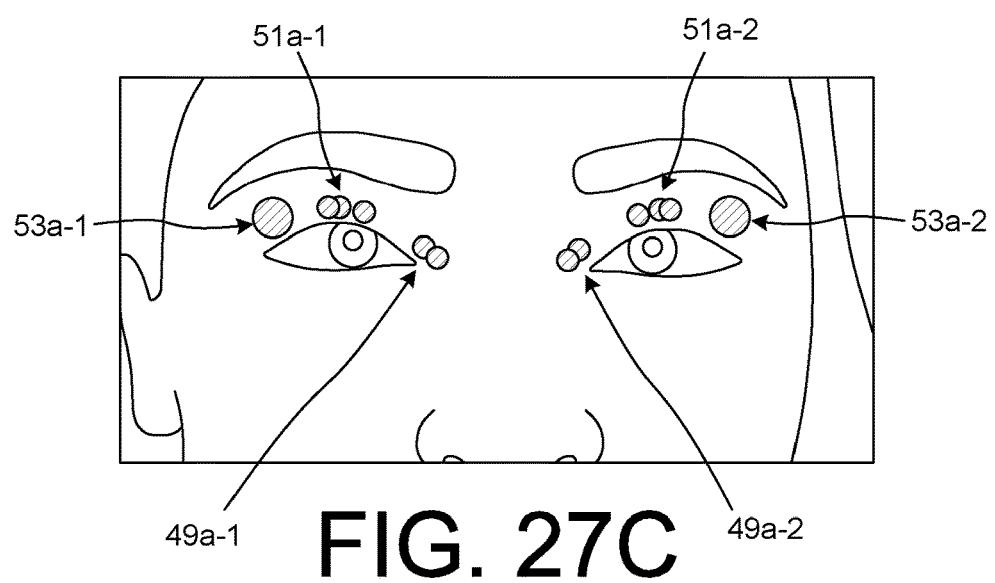

At step S23-7, the visible feature detector 17 computes colour and intensity parameters of the eyeshadow makeup applied to the "eyeshadow" regions of the detected face, based on the weighted average of the pixel colours of extracted face pixels in the left and right "inner eye" masked regions 49a-1 and 49a-2, the left and right "main eye" masked regions 51a-1 and 51a-2, and the left and right "outer eye" masked regions 53a-1 and 53a-2, as schematically illustrated in FIG. 27C. The brightness value of the face pixels in the "main eye" masked regions 51a may be modified by a predefined constant value, such as 0.07, to account for the expected shadow effects in the region and improve the colour characteristics calculated for the overall "eyeshadow" regions. Computation of the weighted average of the face pixels in the "eyeshadow" regions is similar to the process described above with reference to FIG. 21 for the face pixels in the "blush" regions.

Figure 28A:
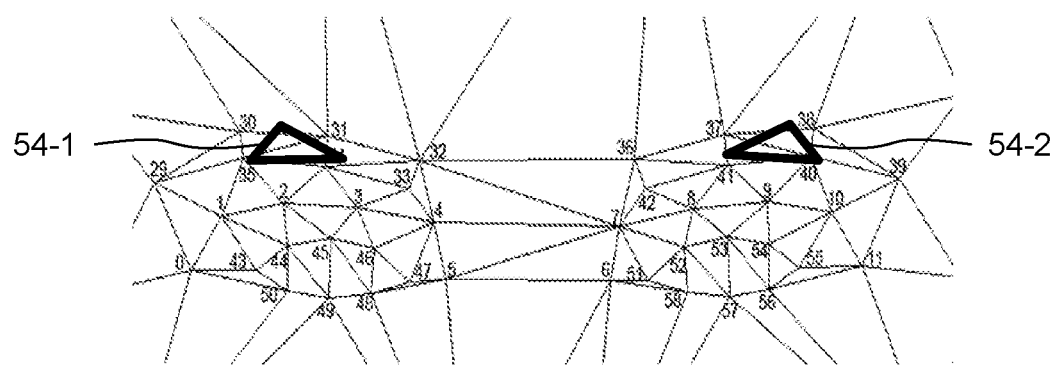
FIGS. 28A and 28B, are schematic illustrations of example masks that may be used to compute a base skin colour for the eyeshadow parameters, in an alternative embodiment.
Figure 28B:
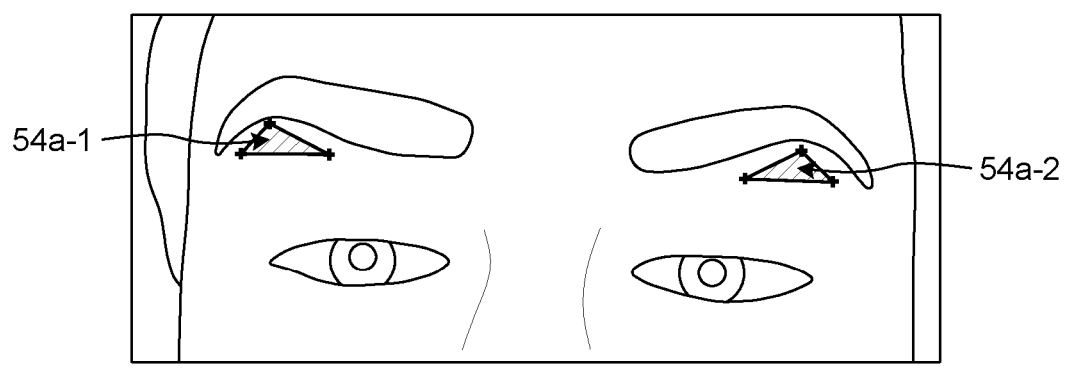

As an alternative, the weighted average of the pixel colours in the "eyeshadow" regions may be computed relative to the computed skin colour from extracted face pixels in a defined "underbrow" region below the left/right eye brow, instead of the base foundation colour as described above with reference to FIG. 21. The weighted average may be computed relative to the base foundation colour if the "underbrow" skin colour is determined to be substantially darker than the base foundation colour, indicative of face pixels that are filled with eyeshadow makeup or in shadow. FIG. 28A schematically illustrates an example of the left and right "underbrow" masks 54, each consisting a triangle having vertex points defined as:

browLeftPts[0]=Point((mesh[29]X+mesh[35]X+mesh[1]X)/3.0,(mesh[29]Y+mesh[35]Y+mesh[1]Y)/3.0)

browLeftPts[1]=Point(mesh[35]X,mesh[35]Y)

browLeftPts[2]=Point((mesh[34]X+mesh[2]X)/2.0,(mesh[34]Y+mesh[2]Y)/2.0)

eyesRightVertsPts[0][0]=Point((mesh[41]X+mesh[9]X)/2.0,(mesh[41]+mesh[9])/2.0);

eyesRightVertsPts[0][1]=Point(mesh[40]X,mesh[40]Y);

eyesRightVertsPts[0][2]=Point((mesh[39]X+mesh[40]X+mesh[10]X)/3.0, (mesh[39]Y+mesh[40]Y+mesh[10]Y)/3.0);

where mesh[i]X/Y points are as described above. FIG. 28B schematically illustrates an example of the respective regions of face pixels extracted from the left and right "eyebrow" masked regions 54a-1 and 54a-2. At step S23-9, the visible feature detector 17 determines pixels of left and right "eye glitter" masks corresponding to extracted face pixels in "eye glitter" regions above the eye that are representative of accurate parameters of the glitter intensity of the applied eyeshadow product.

Figures 29A, 29B, 29C:
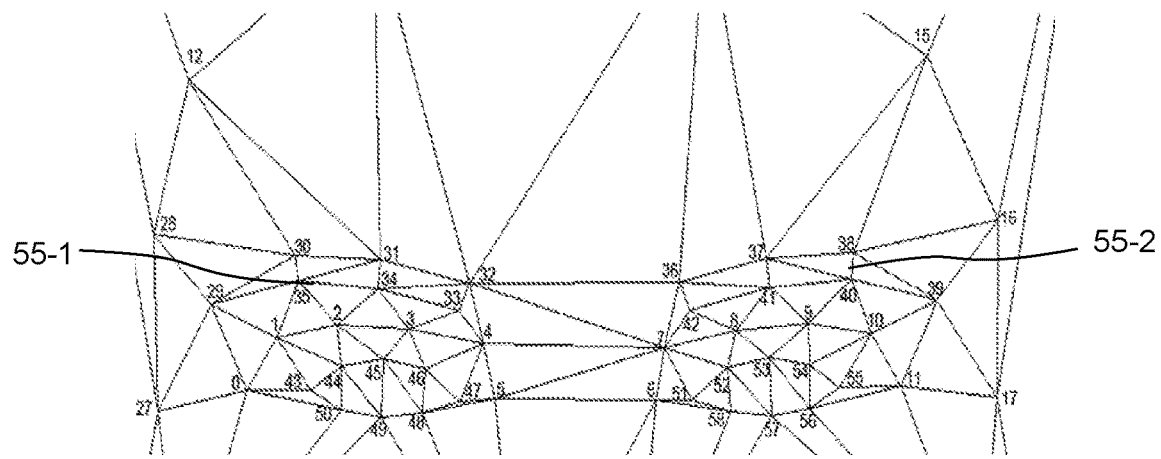
FIGS. 29A to 29C, are schematic illustrations of example masks that are used to compute eye glitter parameters.

FIG. 29A schematically illustrates an example of the left and right "eye glitter" masks 55 that are defined relative to respective predefined vertex points of the trained face mesh 31'. In this example, computation of the left "eye glitter" mask 55-1 starts from a defined region of pixels above the left eye, bounded by vertex points 2 to 4 and 30 to 32, and the right "eye glitter" mask 55-2 starts from a defined region of pixels above the right eye, bounded by vertex points 7 to 9 and 36 to 38. An "eye glitter" mask refinement operation may apply a gradient operator, such as the Scharr algorithm, to identify and exclude edges in the respective regions of pixels, typically indicative of applied eyeliner and/or eyelid crease, etc. The "eye glitter" mask refinement operation also identified pixels within the "eye glitter" regions that are representative of glitter pixels, by determining pixels having brightness values (or grayscale colour values) greater than the average brightness (or grayscale colour values) of the neighbouring eight pixels. Pixels that do not meet the brightness requirement are not considered to be glitter pixels and filtered out of the "eye glitter" masks 55, resulting in the example "eye glitter" masks 55 as shown in FIG. 29B.

At step S23-11, the visible feature detector 17 computes an "eye glitter" intensity value, for example as the proportion of face pixels in the "eye glitter" masked region 55a that are identified as glitter pixels, as schematically illustrated in FIG. 29C. In an alternative, the visible feature detector 17 may also compute an "eye glitter" colour value from a weighted average of face pixels in the "eye glitter" masked region 55a that are identified as glitter pixels. The "eyeshadow" colour may be modified by a defined proportion of the "eye glitter" colour to further improve the accuracy of the computed parameters. At step S23-13, the "eyeshadow" colour and intensity values computed at step S23-7 and the "eye glitter" intensity value computed at step S23-11 are returned as "eyeshadow" parameters.

Figure 30A:
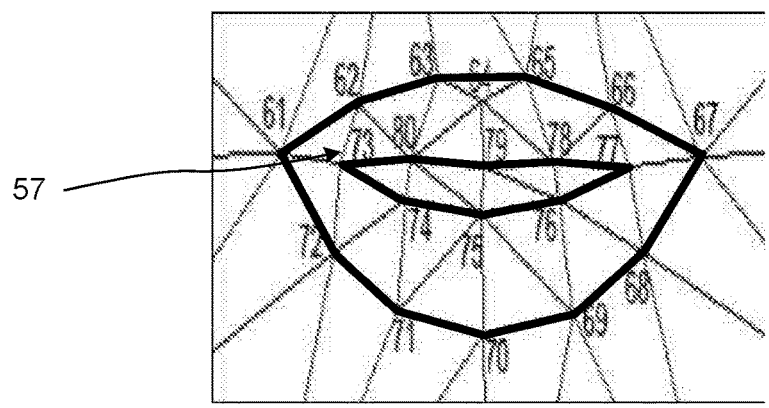
FIGS. 30A to 30C, are schematic illustrations of an example mask that is used to compute base lipstick parameters.
Figure 30B:
Figure 30C:
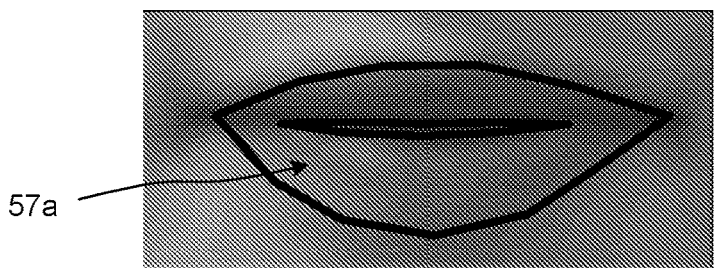

Returning to FIG. 19, at step S19-7, the visible feature detector 17 computes a set of parameters for a fourth predefined visible facial feature representative of the characteristics of an applied layer of "lipstick" makeup to predefined areas of the detected face. As illustrated in greater detail in the flow diagram of FIG. 24, computation of the "lipstick" parameters begins with the visible feature detector 17 calculating the location and dimensions of a "full lips" mask at step S24-1, relative to respective predefined vertices of the normalised face mesh 31' corresponding to the lip region where lipstick is typically applied. FIGS. 30A and 30B schematically illustrate an example of the "full lips" mask 57 that is defined relative to predefined vertex points of the trained face mesh 31'. In this example, the "full lips" mask 57 defines a region of pixels within the outer area of the mouth, bounded by vertex points 61 to 72, minus pixels in the inner area of the mouth, bounded by vertex points 73 to 80. At step S24-3, the visible feature detector 17 computes a "base lipstick" average colour parameter of the lipstick makeup applied to the "full lips" region 57a of the detected face, based on the weighted average of the pixel colours of extracted face pixels in the "full lips" masked region 57a. Computation of the weighted average of the face pixels in the "full lips" region 57a is also similar to the process described above with reference to FIG. 21 for the face pixels in the "blush" regions.

Figure 31A:
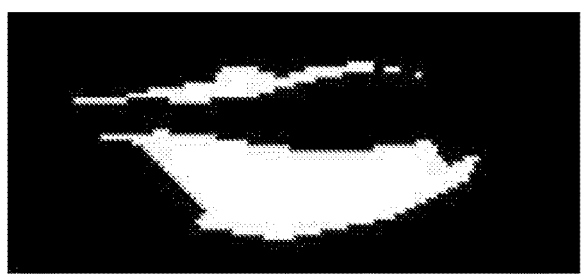
FIGS. 31A and 31B, are schematic illustrations of an example refined version of the lip mask of FIG. 29.
Figure 31B:
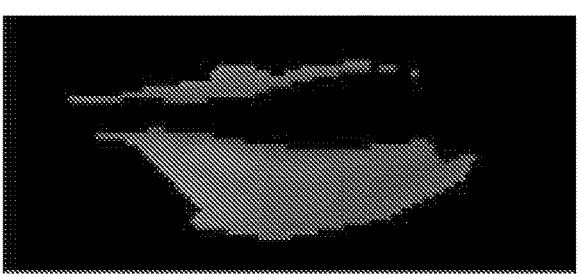

At step S24-5, the visible feature detector 17 determines pixels of a "base lipstick" mask corresponding to extracted face pixels in the lip region that are representative of accurate parameters of the applied lipstick product. FIG. 31A schematically illustrates an example of the "base lipstick" mask 59 that is defined by performing a mask refinement operation on the "full lips" mask 57, omitting pixels of the "full lips" mask 57 where the colour values of the corresponding extracted face pixels are greater than predefined threshold values, thus indicative of outlier gloss and glitter effects. In this illustrated example, the thresholds are defined by:

$$\min((abs(facePixel[H]-avgColour[H])-360)*-1, abs(facePixel[H]-avgColour[H])) > cap[H]$$

$$facePixel[S]+cap[S] < avgColour[S]$$

$$facePixel[V]+cap[V] < avgColour[V]$$

where avgColour is the "base lipstick" colour computed at step S24-3, cap[H] is a constant value 32.235, cap[S] is a constant value 0.08 and cap[V] is a constant value 0.07. FIG. 31B illustrates an example of the respective region of face pixels extracted from the "base lipstick" masked region 59a, where the mask refinement operation results in omission of face pixels where the difference in HSV values exceeds the respective predefined constant values.

At step S24-7, the visible feature detector 17 computes colour and intensity parameters of the lipstick makeup applied to the "base lipstick" region of the detected face, based on the weighted average of the pixel colours of extracted face pixels in the "base lipstick" masked region 59a, as schematically illustrated in FIG. 31B. Computation of the weighted average of the face pixels in the "base lipstick" region is similar to the process described above with reference to FIG. 21 for the face pixels in the "blush" regions.

Figure 32A:
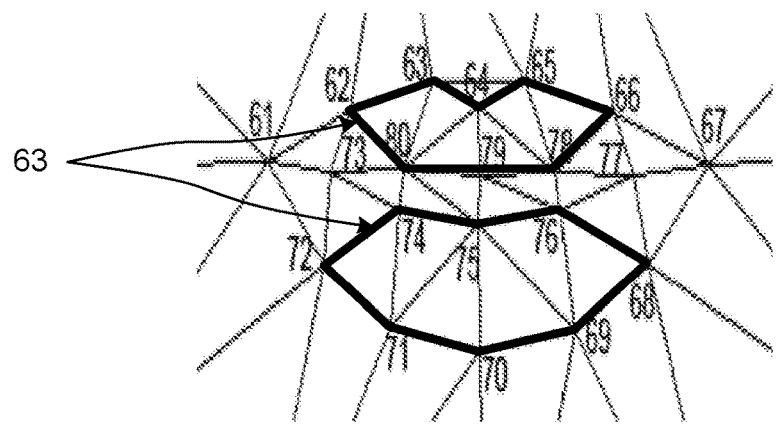
FIGS. 32A to 32C, are schematic illustrations of an example mask that is used to compute lipstick gloss parameters.
Figure 32B:
Figure 32C:
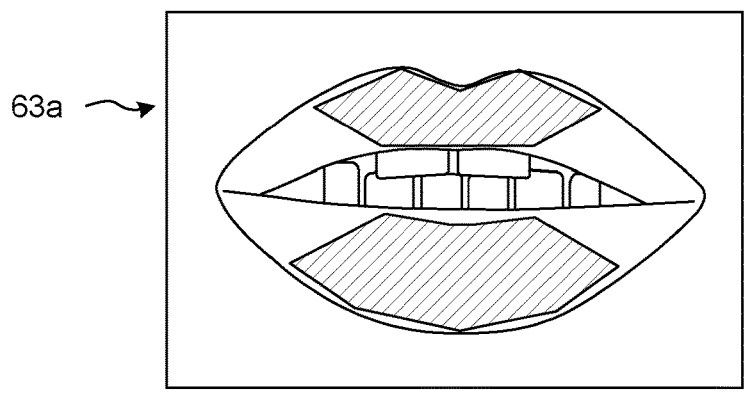

At step S24-9, the visible feature detector 17 calculates the location and dimensions of a "lip glitter/gloss" mask 63, relative to respective predefined vertices of the normalised face mesh 31' corresponding to a central portion of the lip region for optimal determination of lipstick gloss and glitter parameters. FIGS. 32A and 32B schematically illustrate an example of the "lip glitter/gloss" mask 63 consisting two polygons having respective vertices defined relative to predefined vertex points of the trained face mesh 31':

lipG1BottomVertsPts[0]=Point(mesh[62]X,mesh[62]Y);

lipG1BottomVertsPts[1]=Point(mesh[63]X,mesh[63]Y);

lipG1BottomVertsPts[2]=Point(mesh[64]X,mesh[64]Y);

lipG1BottomVertsPts[3]=Point(mesh[65]X,mesh[65]Y);

lipG1BottomVertsPts[4]=Point(mesh[66]X,mesh[66]Y);

lipG1BottomVertsPts[5]=Point(mesh[78]X,mesh[78]Y);

lipG1BottomVertsPts[6]=Point(mesh[79]X,mesh[79]Y);

lipG1BottomVertsPts[7]=Point(mesh[80]X,mesh[80]Y);

lipG1TopVertsPts[0]=Point(mesh[68]X,mesh[68]Y);

lipG1TopVertsPts[1]=Point(mesh[69]X,mesh[69]Y;

lipG1TopVertsPts[2]=Point(mesh[70]X,mesh[70]Y);

lipG1TopVertsPts[3]=Point(mesh[71]X,mesh[71]Y);

lipG1TopVertsPts[4]=Point(mesh[72]X,mesh[72]Y);

lipG1TopVertsPts[5]=Point(mesh[74]X,mesh[74]Y);

lipG1TopVertsPts[6]=Point(mesh[75]X,mesh[75]Y);

lipG1TopVertsPts[7]=Point(mesh[76]X,mesh[76]Y)

where mesh[i]X/Y points are as described above. In this way, pixels from the corners of the mouth region, which are typically darker due to shadow effects and therefore not representative of accurate lip gloss parameters, are omitted from the "lip glitter/gloss" mask 63. Pixels that are not in the "base lipstick" mask may also be omitted from the "lip glitter/gloss" mask 63. FIG. 32C schematically illustrates an example of the face pixels extracted from the "lip glitter/gloss" masked region 64a.

At step S24-11, the visible feature detector 17 computes a "lip glitter" intensity value representative of accurate parameters of the glitter intensity of the applied lipstick product, based on extracted face pixels in the masked "lip glitter/gloss" region 63a in a similar process as described above with reference to step S23-9 for computing the glitter intensity of the applied eyeshadow makeup product. At step S24-13, the visible feature detector 17 computes a "lip gloss" intensity value representative of accurate parameters of the gloss intensity of the applied lipstick product, as the weighted sum of face pixels in a "lip gloss" masked region 63a that meet predefined criteria. For example, pixels may be identified as gloss pixels if:

pixel[S_value]<saturationComp; and pixel[V_value]>valueComp where pixel[S_value] is the Saturation component of the pixel's HSV value, and pixel[V_value] is the Value component of the pixel's HSV value. In this example, saturationComp is the weighted Saturation component of the computed "lipstick" colour and valueComp is the weighted Value component of the computed "lipstick" colour, defined by:

primeLipsColour$_{HSV}$·saturation−
   (primeLipsColour$_{HSV}$·saturation*saturationMaxDist)

primeLipsColour$_{HSV}$·value+
   (primeLipsColour$_{HSV}$·value*valueMaxDist);

where saturationMaxDist is a predefined constant value 0.17 and saturationMaxDist is a predefined constant value 0.10. At step S24-13, the "lipstick" colour and intensity values computed at step S24-7, the "lip glitter" intensity value computed at step S24-9 and the "lip gloss" intensity value computed at step S24-11 are returned as "lipstick" parameters.

Advantageously, the visible feature detector 17 may calculate an average of the computed characteristics from each of a plurality of previously captured images of the scene, to provide more accurate parameters that account for variations in the capture environment, such as lighting effects that vary from image frame to frame.

Colourisation and Augmentation

Referring back to FIG. 15, at step S15-17, the colourisation module 7 applies the image colourisation to the captured image data by modifies pixel values of the image data of the detected object based on colourisation parameters 9 corresponding to one or more virtual try-on products, retrieved from a database 9a for example, and modified based on the characteristics of corresponding visible features computed at step S15-5. The colourisation process performed by the colourisation module 7 in the system 1 will now be described in more detail with reference to FIG. 33, which shows the steps of an example computer-implemented colourisation process in another embodiment of the present invention. Reference is also made to FIG. 34, showing examples of data that is processed by, and processing steps performed by the colourisation module during the colourisation process.

Figure 33:
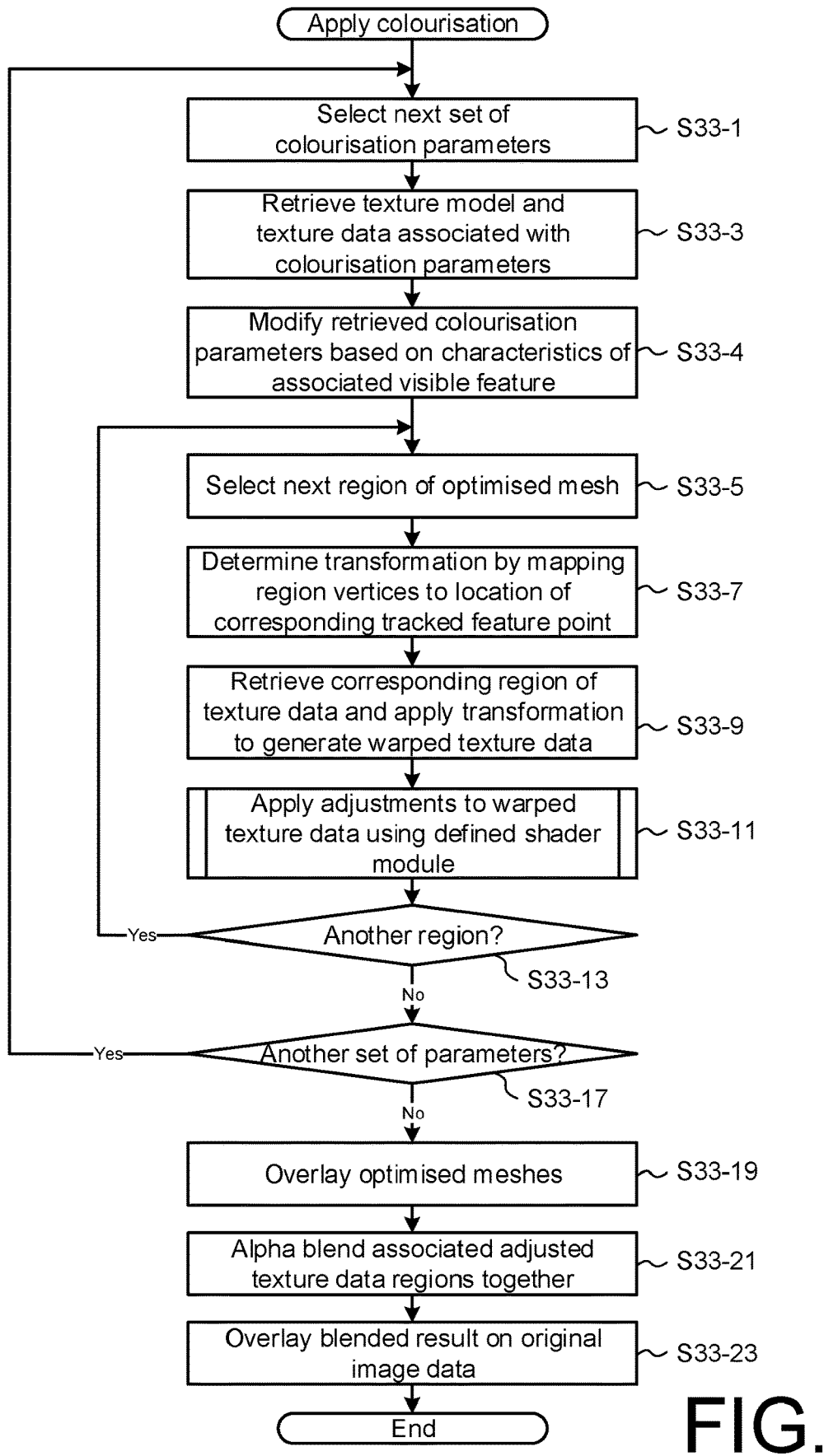
FIG. 33 is a flow diagram illustrating the main processing steps performed by the colourisation module of FIGS. 1 and 4 to apply colourisation to image data according to an embodiment.
Figure 34:
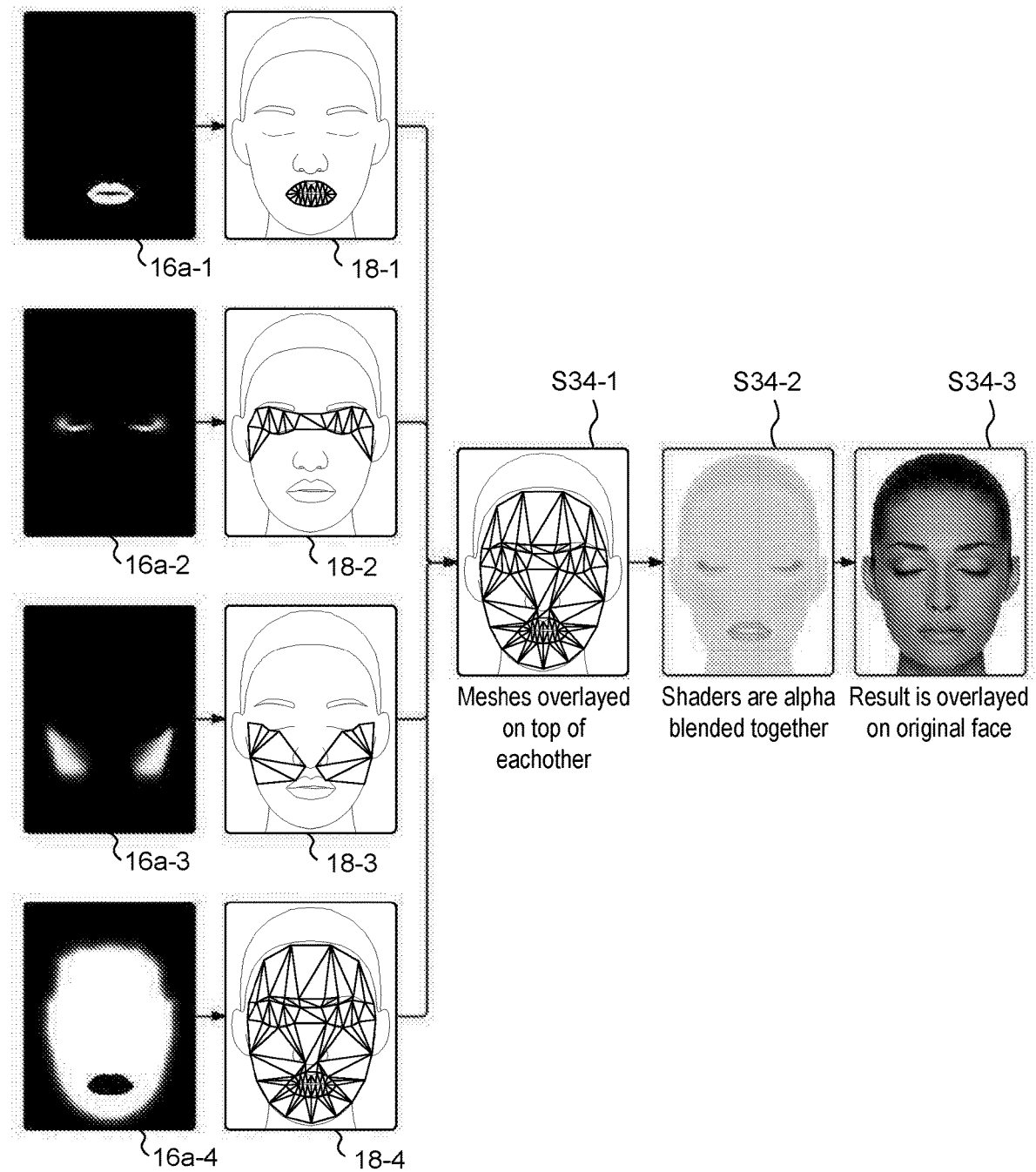
FIG. 34 shows examples of data that is processed by, and processing steps performed by the colourisation module during the colourisation process of FIG. 19.

As shown in FIG. 33, at step S33-1, the colourisation module 7 selects a first set of colourisation parameters 9 from the colourisation parameters database 9a. At step S33-3, the colourisation module 7 retrieves the texture model 16 and the texture data file 20 associated with the selected set of colourisation parameters 9. At step S33-4, the parameter modifier 7d of the colourisation module 7 modifies the retrieved colourisation parameters 9 based on values of the respective characteristics computed by the visible feature detector 17 at step S15-15. For example, the parameter modifier 7d may modify the retrieved shader value parameters 9-3 of each makeup product, such as colour and intensity values, to derive modified shader value parameter 9-3' that more accurately represent the virtual application of that makeup product over the existing makeup products present on the face in the captured image.

In the illustrated example of FIG. 34, four texture models 16 are retrieved from the model database 21, each with a respective different mask 16a and mesh subset 16b. Each retrieved texture model 16 is selected based on a corresponding set of colourisation parameters 9. A first mask 16a-1 defines a masked lip region of the reference image 25c and is associated with a first mesh subset 16b-1 defining polygonal areas around the masked lip region. A second mask 16a-1 defines two masked eye regions of the reference image and is associated with a second optimised mesh 31a-2 defining polygonal areas around the masked eye regions. A third mask 14c-1 defines two masked cheek regions of the reference image 25c and is associated with a third mesh subset 16b-3 defining polygonal areas around the cheek regions. A fourth mask 16a-4 defines a masked skin region of the reference image and is associated with a fourth optimised mesh 31a-4 defining polygonal areas of the masked skin region.

At step S33-5, the colourisation module 7 selects a first region of the mesh subset 16b from the retrieved texture model 16. At step S33-7, the transform module 7c determines a set of transformation values by mapping the coordinates of the vertices of the selected region to the location of the corresponding tracked feature point determined by the tracking module 3. At step S33-9, the transform module 7c retrieves the corresponding region of texture data 33, again as referenced by the vertices of the selected region, and applies the transformation to the retrieved region of texture data to generate a corresponding warped texture data region. Optionally, the transform module 7c may also retrieve the corresponding region of mask data 16a, as defined by the vertices of the selected region, and apply the transformation to the retrieved masked data to generate corresponding warped masked data for the selected region. At step S33-11, the colourisation module 7 applies the one or more modified image colourisation adjustments to the warped texture data region using the one or more shader modules 7a, for example as defined by the modified shader value parameter 9-3' computed at step S33-4. As will be described below, the shader modules 7a may optionally take into account the warped mask data region, depending on the particular shader sub-modules that are used.

At step S33-13, the colourisation module 7 determines if there is another region of the optimised mesh 15' to be processed, and if so, processing returns to step S33-5 where the next region is selected for processing as discussed above, until all of the regions of the mesh subset 16b have been processed in this way. At step S33-17, the colourisation module 7 then determines if there is another set of colourisation parameters 9 to be processed for the current captured image frame. If so, processing returns to step S33-1 where the next set of colourisation parameters 9 is selected and processed as discussed above, until all of the sets of colourisation parameters 9 have been processed in this way.

At step S33-19, the renderer 7b retrieves and overlays all of the optimised meshes 18 as a sequence of layered data to be applied to the captured image data. This is schematically illustrated at S34-1 in FIG. 34. At step S33-21, the renderer 7b performs an alpha blend of the adjusted texture data regions associated with each of the layered optimised meshes 18, as output by the respective shader modules 7a. FIG. 34 shows an example of the blended result at S34-2. The renderer 7b then overlays the blended results on the original captured image data for output to the display 11, at step S33-23. FIG. 34 shows an example of the resulting augmented image data at S34-3.

Figure 35:
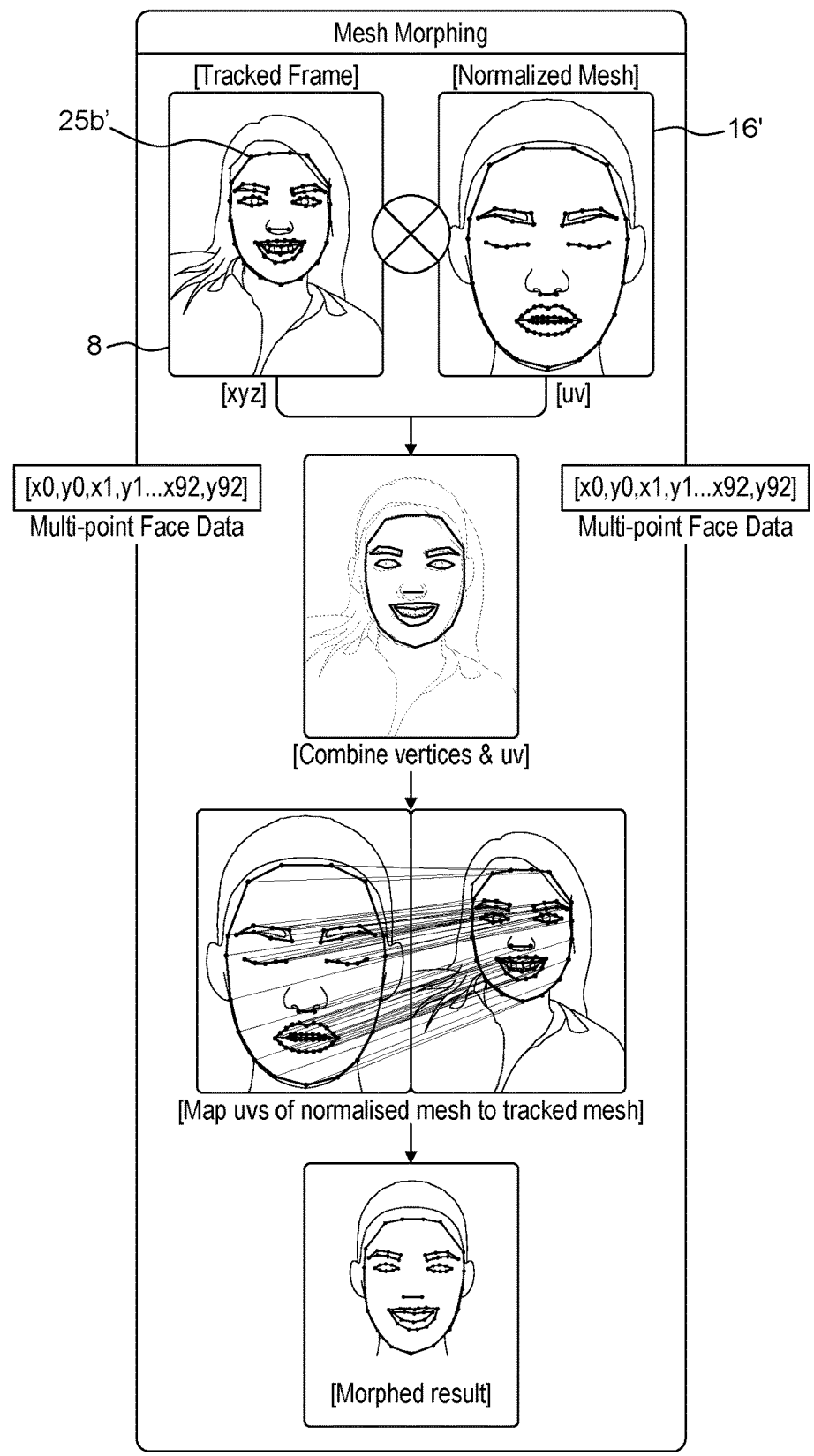
FIG. 35 schematically illustrates an exemplary sequence of data that may be processed by, and processing steps performed by, the transform module to determine transformation of mesh data.

It will be appreciated that this is just one exemplary sequence of processing steps to retrieve the respective regions of texture data 33 defined by image coordinates corresponding to the vertices of the masked regions defined by the mesh subset 16b. As one alternative, the colourisation module 7 may be configured to determine a set of transformation values by mapping all of the vertices of the normalised mesh 31' as a whole to the respective corresponding labelled feature points of the tracking data, whereby the determined transformation values can be modified by the parameter modifier 7d before being applied to each region of texture data and mask data as discussed above. FIG. 35 schematically illustrates an exemplary sequence of data that may be processed by, and processing steps performed by, the transform module 7c to determine transformation of mesh data. In the illustrated example, the captured image 8 and associated detected tracking feature point data 25b' can be combined with the normalised mesh 31', to produce a single mesh including the coordinates of the vertices from the tracked data 25b' and the coordinates of the vertices from the normalised mesh 31'. The vertices from the normalised mesh 31' are mapped to the vertices of the tracked data 25b', to determine respective transformation values based on the respective coordinates for each corresponding pair of vertices, for example in terms of translation in the two-dimensional plane. The resulting transformation values can be illustrated as a morphed result, which can be subsequently modified by the parameter modifier 7d before being applied to at least a portion of a mask data 16a and texture data 33, as described above.

The resulting augmented image with the applied modified texture and colourisation is output at step S15-19 for example on display 11. At step S15-21, the tracking module 3 determines if there is a new captured image frame to process and processing returns to step S15-2 where image data of the next captured frame is received from the camera 5.

Second Embodiment

Figure 36:
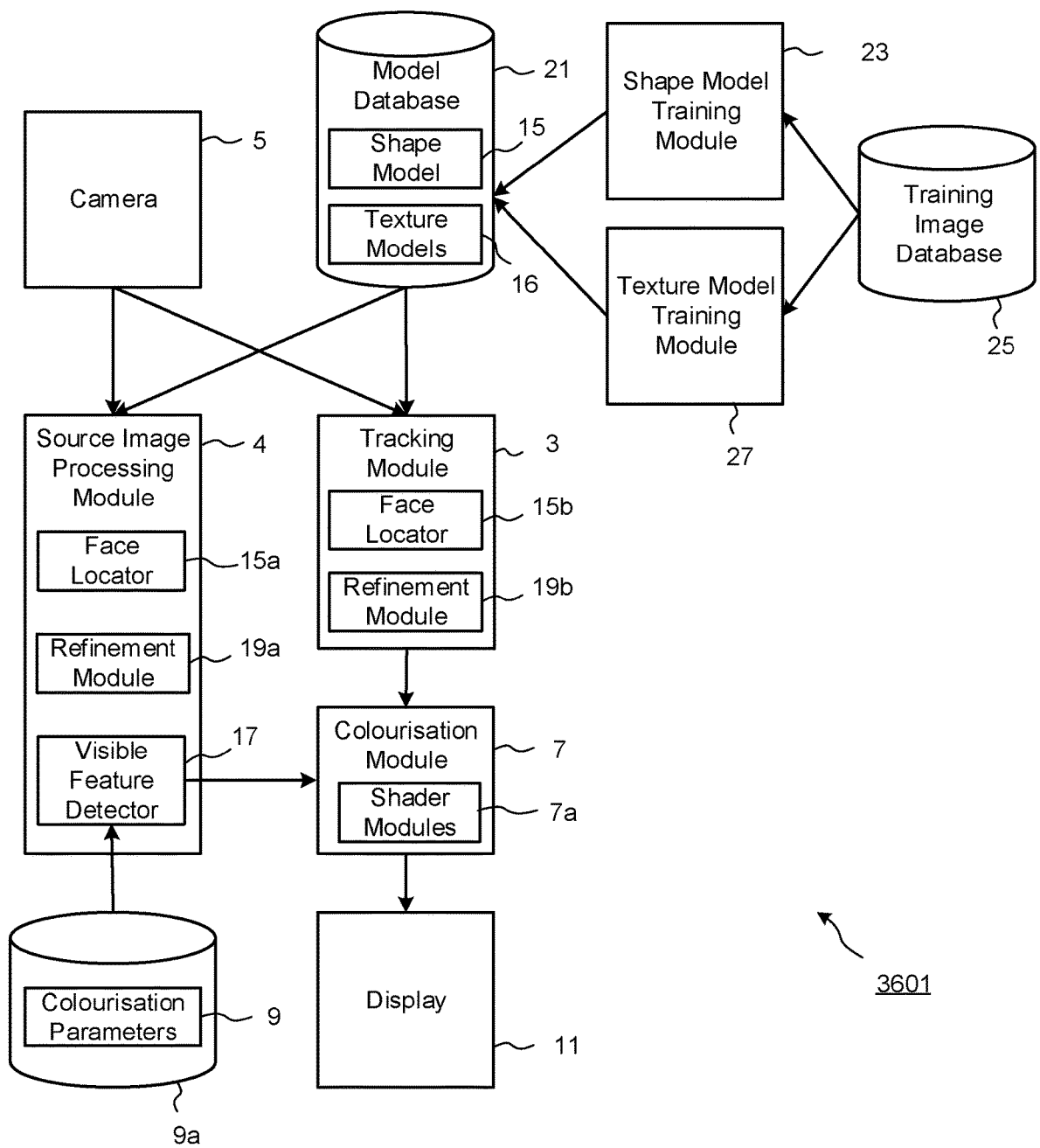
FIG. 36 is a block diagram showing the main components of an augmented reality system according to a second embodiment of the invention.

A further embodiment will now be described using corresponding reference numerals to those of preceding figures where appropriate for corresponding elements. Referring to FIG. 36, a second embodiment of an augmented reality system 3601 is schematically illustrated. In this embodiment, the augmented reality system 3601 replicates the visible appearance of facial features that have respective applied makeup products, as detected from a source face of one person, to image data of a target face of another person in each of a sequence of subsequent target image frames. The augmented reality system 3601 comprises a source image processing module 4 that automatically processes image data captured by a camera 5 to detect characteristics of one or more visible features of a source face in the source scene, and a colourisation module 7 that modifies image data of subsequently captured image frames containing a target face in a target scene, based on colourisation parameters 9 corresponding to the detected characteristics of visible features of the source face. The colourisation parameters 9 may be stored in a database 9a. The colourisation parameters database 9a may be a database of beauty product details, each product or group of products associated with a respective set of colourisation parameters 9. Alternatively, the database 9a may include colourisation parameters 9 derived from product details retrieved from such a product database.

The source scene may contain a person facing the camera or a physical photograph of the source face, captured by the camera 5 as the source image data. The target face is detected and located in each subsequent image frame by a tracking module 3 that automatically processes the subsequent image data captured by the camera 5. The augmented image data is then output to a display 13. Alternatively or additionally, the face locator 15a may be configured to output the original captured target image frames to the display 11, with the colourisation module 7 configured to output the regions of modified pixels to the display 11, for display over the captured pixels of respective regions in the captured image frame. Preferably the operations are conducted in real time, or near real time.

The source image processing module 4 includes a face locator 15a that automatically determines the location of a source face in the captured source image data, for example using a trained face shape model 15 and texture model 16 stored in a model database 21, and a refinement module 19a to perform processing to refine an initial approximation of the location of the detected source face in the captured source image. The source image processing module 4 also includes a visible feature detector 17 that automatically identifies regions of pixels in the source image associated with one or more visible features of the source face, such as predefined cheek, eye and lip regions of the source face that have applied makeup products. Typical makeup products comprise foundation, blush, eyeshadow, eyeliner, mascara, lipstick, lip gloss, lip liner, or the like.

The visible feature detector 17 computes characteristics of the visible features based on pixel values in the respective identified regions of the source image, based for example on the trained face texture model 16 that defines feature points of a trained mesh representation of the face. The visible feature detector 17 also determines corresponding colourisation parameters 9 for each detected visible feature. The colourisation parameters 9 may be retrieved from a database of virtual makeup products defining respective one or more colourisation parameters 9 for each of a plurality of virtual makeup products. For example, the visible feature detector 17 may be configured to find the closest matching virtual makeup product for each category of makeup on the respective characteristics of the detected applied makeup products in the source image. The colourisation parameters 9 may define property data values that are passed to the colourisation module 7 to control augmentation of the pixel values of the captured image data to apply a representation of an associated virtual makeup product. Alternatively or additionally, the colourisation parameters 9 may include one or more texture files defining image data of respective associated image augmentation that can be transformed to fit respective regions of the detected face in the target image, and applied by the colourisation module 7 to augment the captured target image data.

The tracking module 3 also includes a face locator 15b that automatically detects and determines the location of the person's face in the captured target image, for example based on the trained face models 15, 16, and a refinement module 19b to perform processing to refine an initial approximation of the location of the detected target face in the captured target image frame. The face locator 15b passes the captured image frame data together with the determined location of the target face in that frame to the colourisation module 7. The colourisation module 7 includes one or more shader modules 7a to modify the pixel values of each identified region based on the colourisation parameters 9 retrieved from the database 9a by the visible feature detector 17. For example, the colourisation module 7 may include a plurality of shader modules 23 each configured to determine and apply image colourisation to respective identified regions of each target image frame, to replicate the appearance of applying a virtual foundation, blusher, eyeshadow or lipstick makeup product to the target face, based on respective received sets of colourisation parameters 9 for a specific virtual makeup product determined to have characteristics matching a corresponding visible makeup feature in the source image.

The augmented reality system 3601 may further include a shape model training module 23 for processing training images in a training image database 25 to generate and store trained shape models 15 for use during real-time processing of input image data from the camera 5 by the face locator 15a. A texture model training module 27 may also be provided to generate and store trained texture models 16, for example based on a representative image in the training image database 25 as will be described below. The processing of image data by the shape model training module 23 and texture model training module 27 may be referred to as "offline" pre-processing, as the training processes are typically carried out in advance of the "real-time" image processing by the face locator 15a.

Colourisation Module

Figure 37:
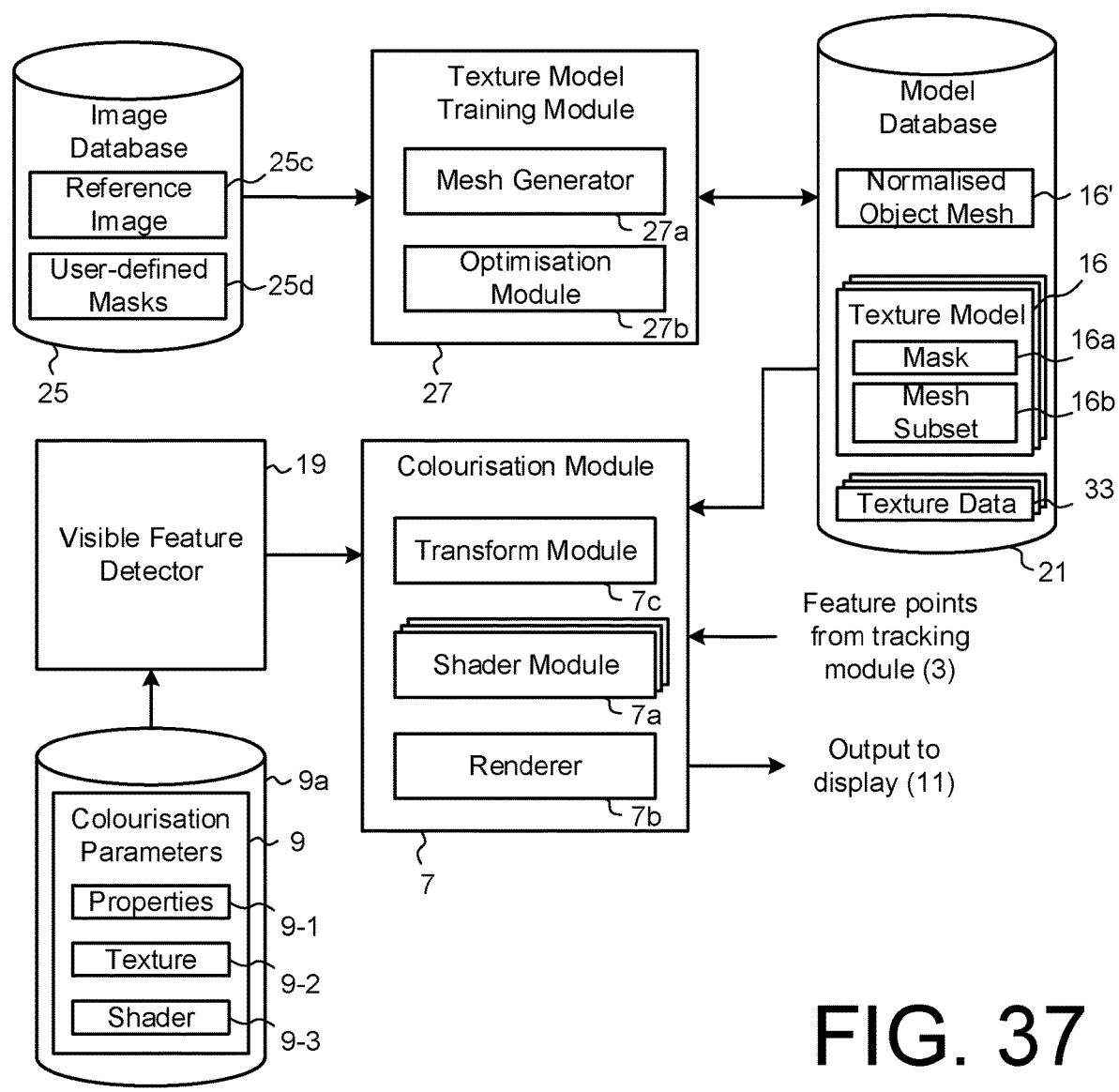
FIG. 37 is a block diagram showing the main components of an exemplary training module and colourisation module in the system of FIG. 36.

An exemplary embodiment of a colourisation module 7 in the augmented reality system 3601 will now be described in more detail, with reference to FIG. 37 showing the main elements of the colourisation module 7 as well as the data elements that are processed by the colourisation module 7 to generate augmented image data that is output to the display 11, similar to the embodiment described above with reference to FIG. 4. As shown in FIG. 37, in this embodiment, predefined sets of colourisation parameters 9 are retrieved from the colourisation parameters database 9a by the visible feature detector 19 of the source image processing module 4, and passed to the colourisation module 7 for processing. Each set of colourisation parameters 9 may include one or more predefined property values 9-1, predefined texture values 9-2 such as respective identifiers of a stored texture model 16 and a stored texture data file 33, and a predefined shader type 9-3 such as an identifier of one or more shader modules 7a implemented by the colourisation module 7 that are to be used to augment associated regions of captured image data based on the property values 9-1 and/or texture values 9-2.

The colourisation module 7 may include a transform module 7c that receives data defining the location of labelled features points in the common reference plane, determined by the face locator 15b of the tracking module 3 for a captured image. The determined coordinates from the camera image data define the positions of the polygonal regions of a normalised mesh 31' that matches the detected object, the user's face in this embodiment. The transform module 7c determines a mapping from the vertices of a selected region of a trained mesh 31' to vertices of the corresponding tracked labelled feature points. The transform module 7c uses the determined mapping to transform the associated regions of mask data 16a and texture data 33 retrieved from the model database 21 for the particular set of colourisation parameters 9, into respective "warped" versions that can be processed by the shader modules 7a.

After all of the regions and colourisation parameters are processed by the transform module 7c and the respective defined shader module(s) 7a, the renderer 7b overlays the respective mesh subsets 16b of each texture model 16 according to the common reference plane, and in conjunction with an alpha blended shader sub-module (not shown), performs an alpha blend of the respective layers of associated regions of warped texture data. The blended result is an optimized view of what will get augmented on the user's face, taking into account characteristics of visible makeup product(s) already present on corresponding regions of the face. The final result is obtained by the renderer 7b applying the blended result back onto the user's face represented by the captured image data from the camera 5, and output to the display 11.

Augmentation Process

Figure 38A:
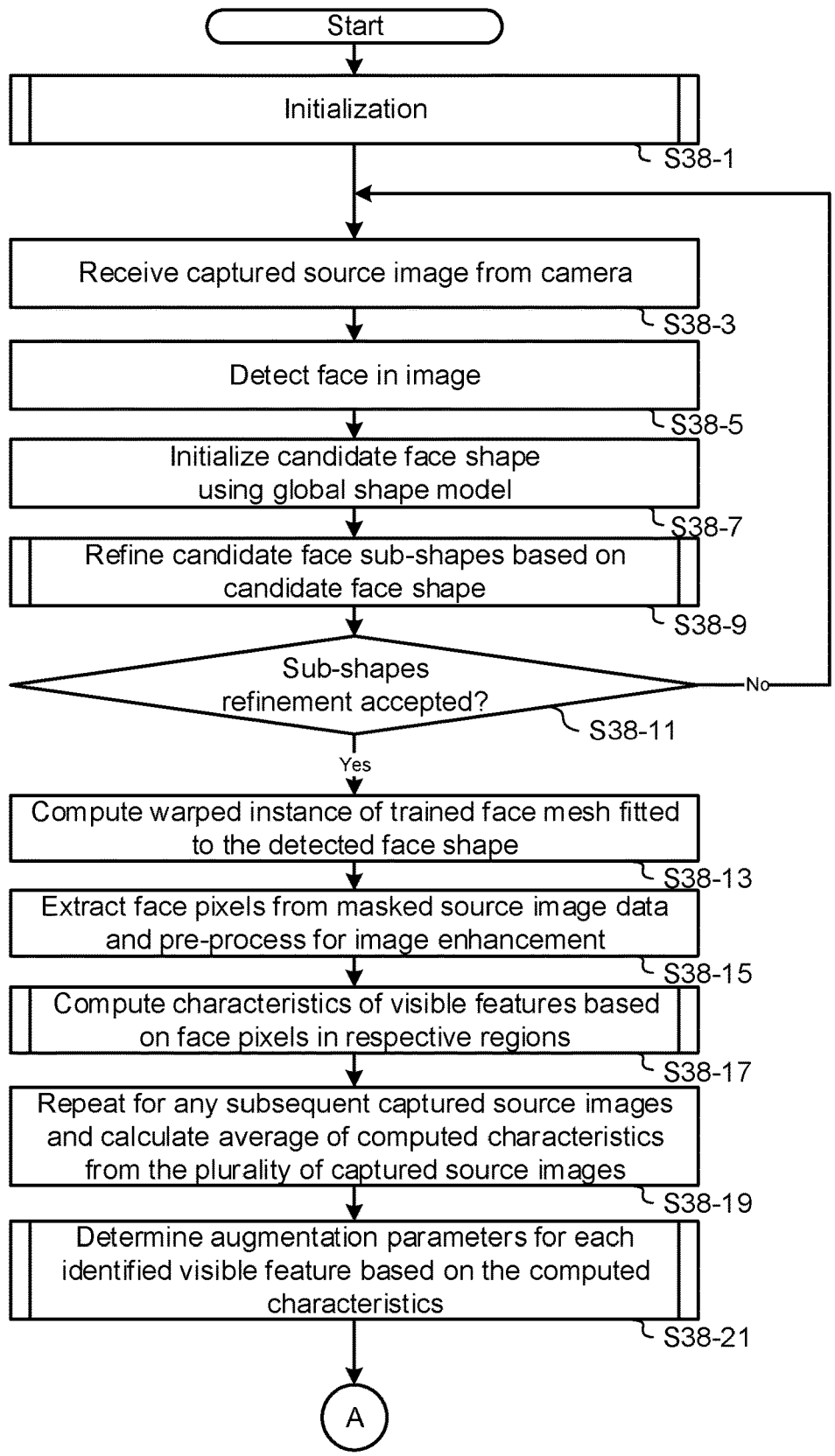
FIGS. 38A and 38B, is a flow diagram illustrating the main processing steps performed by the system of FIG. 36 to track and augment a face in a target image based on computed characteristics of visible features of a face in a source image, according to an embodiment.
Figure 38B:
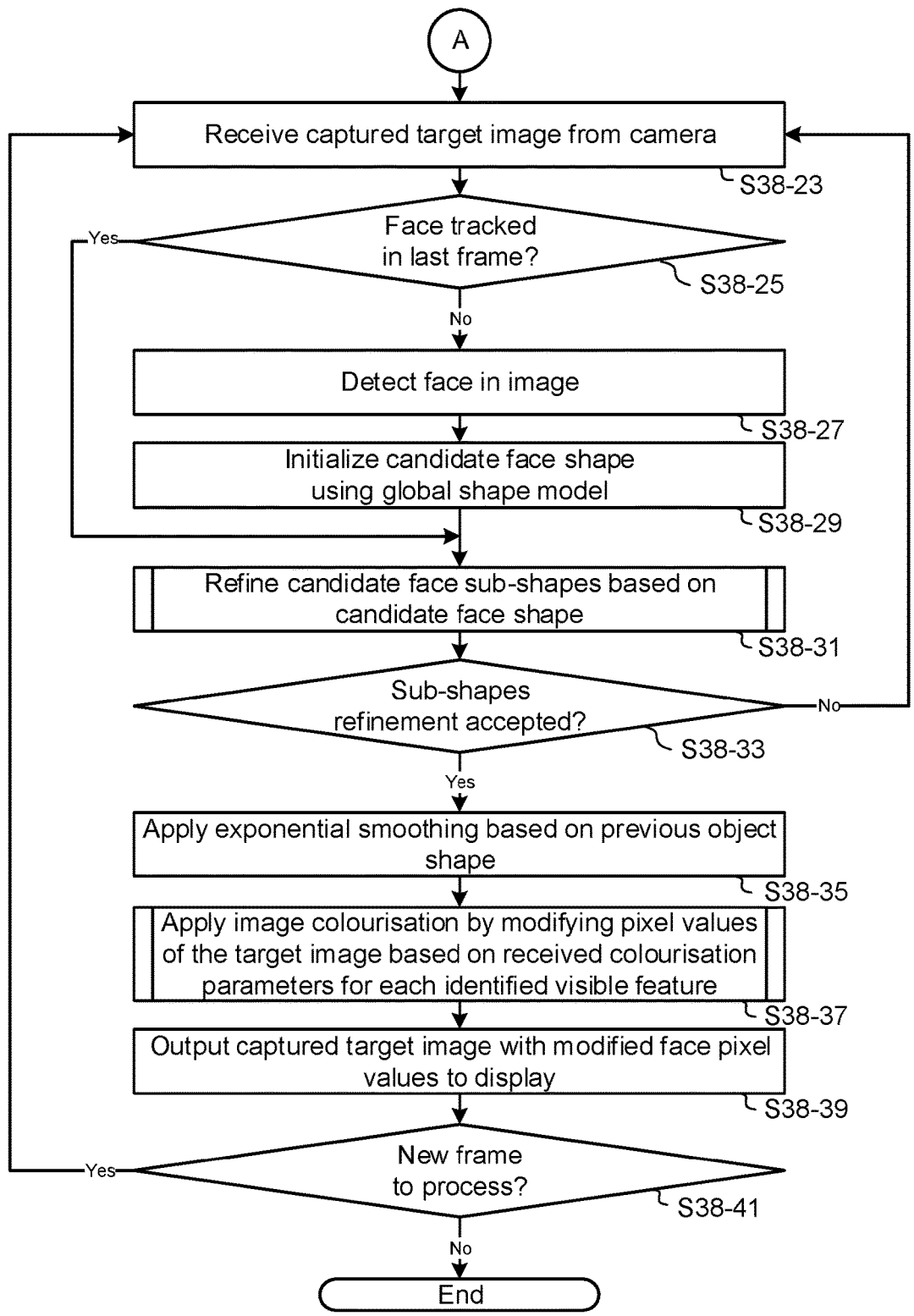

The augmentation process performed by the augmented reality system 3601 will now be described in more detail with reference to FIGS. 38A and 38B, which show the steps of a computer-implemented image augmentation process according to another exemplary embodiment of the present invention. Reference is also made back to the example sequence of user interface display screens in FIGS. 18A to 18E. As shown in FIG. 38, at step S38-1, the face locator 15a may perform an initialisation sub-process based on received data of an initial captured image from the camera. One example of this processing was described above with reference to FIG. 16. At step S38-3, the source image processing module 4 receives data of a captured source image from the camera 5. In the present exemplary embodiment, processing of image data is described with reference to the HSV colour space (hue, saturation and value). It is appreciated that any other colour space may be used, such as HSL, RGB (as received from the camera 5, for example) or YCbCr. Accordingly, the augmentation system 3601 may be configured to perform conversion of the captured image data from the camera 5 where necessary, from the camera colour space (e.g. RGB) to the working colour space (e.g. HSV).

At step S38-5, the face locator 15a of the source image processing module 4 determines the location of the source face in the captured source image, and outputs a bounding box 51 of an approximate location for the detected source face. At step S38-7, the face locator 15a initialises the detected face shape using the trained global shape model 27, the statistics computed at step S8-11 above, and the corresponding global shape regression coefficient matrix 45 retrieved from the model database 21, based on the image data within the identified bounding box 51. FIG. 18A shows an example of an initialised face shape 71 within the bounding box 51, displayed over the captured image data 73. The trained shape model may be generated by the shape model training module 23 as described by the training process above. As shown, the candidate face shape at this stage is an initial approximation of the whole shape of the object within the bounding box 51, based on the global shape model 27. Accordingly, the location and shape of individual features of the object, such as the lips and chin in the example of FIG. 18A, are not accurate.

At step S38-9, the face locator 15a performs processing to refine the initialised global face shape using the trained sub-shape models 15b and its corresponding cascading regression coefficient matrices 47 for each sub-shape model 15b. This processing may be as described above with reference to FIG. 17. After the face refinement process is completed, processing proceeds to step S38-11, where the face locator 15a determines whether refinement of the detected object sub-shapes within the acceptable parameters was successfully achieved at step S38-9. If not, for example if it was determined at step S17-3 or step S17-23 that tracking of the object was lost, then processing can return to step S38-3, where a new captured image is received from the camera for processing in a new iteration by the face locator 15a. Otherwise, if the face locator 15a determines that acceptable sub-shape refinement was achieved by the processing at step S38-9, then at step S38-13, the face locator 15a computes a warped instance of the trained face mesh 31' to fit the detected face in the captured source image, for example as illustrated in FIG. 5F. The determined coordinates from the captured image data define the positions of the vertices of the polygonal regions of the face mesh 31' to match the detected face shape.

Figure 39:
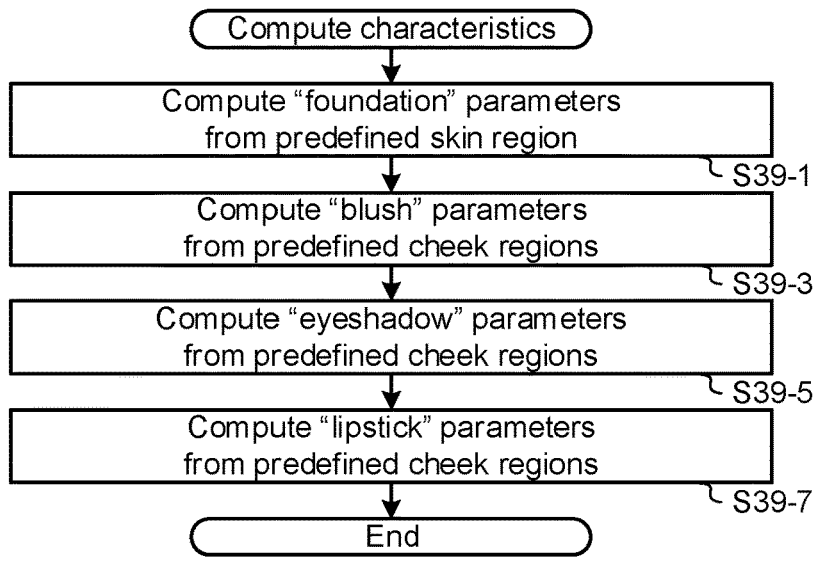
FIG. 39 is a flow diagram illustrating processing steps performed by the visible feature detector shown in FIG. 36 to compute characteristics of visible features, according to an exemplary embodiment.

At step S38-15, the face locator 15a extracts the pixel data of the source image corresponding to face pixels of the located source face, for example defined by a mask of the warped instance of the face mesh 31' from step S38-13. Optionally, the face locator 15a can perform pre-processing of the extracted face pixels for image enhancement, such as automatic correction of white balance, levels and/or gamma. At step S38-17, the visible feature detector 17 of the source image processing module 4 computes characteristics of visible makeup products present in the source face, based on the pixel values of extracted face pixels from respective predefined regions of the source face defined relative to vertices of the warped face object model 17. For example, referring to the flow diagram of FIG. 39, at step S39-1, the visible feature detector 17 computes one or more parameters for a first predefined visible feature representative of the characteristics, such as colour and brightness/intensity, of a layer of "foundation" makeup that has been applied generally to the skin areas of the detected face. The characteristics may be computed from the average value of extracted face pixels in predefined skin regions of the target face. It is appreciated that in the absence of any actual applied foundation makeup, the "foundation" parameters will instead be indicative of the base skin tone or colour of the detected face.

At step S39-3, the visible feature detector 17 computes a set of parameters for a second predefined visible facial feature representative of the characteristics of an applied layer of "blush" makeup to predefined areas of the detected face. The characteristics may be computed from the average value of extracted face pixels in cheek regions of the target face. At step S39-5, the visible feature detector 17 computes a set of parameters for a third predefined visible facial feature representative of the characteristics of an applied layer of "eyeshadow" makeup to predefined areas of the detected face. The characteristics may be computed from the average value of extracted face pixels in predefined regions around the eyes of the target face. At step S39-7, the visible feature detector 17 computes a set of parameters for a fourth predefined visible facial feature representative of the characteristics of an applied layer of "lipstick" makeup to predefined areas of the detected face. The characteristics may be computed from the average value of extracted face pixels in predefined lip regions of the target face. The skin, cheek, eye and lip regions of the target face may be defined relative to respective labelled feature points of the warped instance of the face mesh 31'.

Referring back to FIG. 38A, optionally, the visible feature detector 17 may repeat the processing of steps S38-3 to S38-17 to compute respective characteristics of visible features based on image data of one or more subsequent captured source images of the source face, at step S38-19. The visible feature detector 17 may calculate an average of the computed characteristics from each of a plurality of captured source images, to provide more accurate parameters that account for variations in the capture environment, such as lighting effects that vary from image frame to frame.

At step S38-21, the visible feature detector 17 determines colourisation parameters 9 for each identified visible makeup product detected in the source face, based on the characteristics of each visible feature computed at step S38-17. An example of the processing by the visible feature detector 17 to retrieve colourisation parameters 9 from a makeup product database 9a, is described with reference to the flow diagram of FIG. 40, for the present exemplary worked example of predefined set of makeup products. Each virtual product in the database 9a may be defined as a data structure including a unique identifier and one or more properties that may be passed to the shader modules 23 of the colourisation module 7 to replicate the appearance of the associated virtual product on image data of a target face. Examples of virtual products and corresponding properties are provided below. It will be appreciated that depending on the property types and values, conversion of the retrieved properties may be required into types and formats that are accepted by the corresponding shader modules 23.

Foundation Example

| | |
|---|---|
| "name" | "Foundation 103 True Ivory" |
| "alpha" | 0.37 |
| "color1" | {r: 219, g: 175, b: 144, a: 0.81} |
| "effect1" | "categories": ["light application"], |
| | "glitterTex": "noise_0.png", |
| | "applicationMaskTex": "maskFoundation_0.png", |
| | "ambientOcclusionTex": "ambientOcclusion_0.png", |
| | "ambientOcclusionCoef": 0, |
| | "glitterObjectSpaceCoef": 0, |
| | "glitterScreenSpaceCoef": 0, |
| | "glitterMaxIntensityCoef": 0, |
| | "glitterIntensity": 0, |
| | "rednessSmoothing": 0.6, |
| | "smoothing": 0.3, |
| | "intensity": 0.75 |
| "articleCode" | "3607342360082" |
| "type" | "foundation" |

Blush Example

| | |
|---|---|
| "name" | "Blush 010 Santa Rose" |
| "alpha" | 1 |
| "color1" | {r: 255, g: 171, b: 138, a: 0.55} |
| "effect1" | "categories": ["glitter", "Light Application"], |
| | "intensity": 1.95, |
| | "glitterTex": "noise_0.png", |
| | "applicationMaskTex": "maskBlusher_0.png", |
| | "ambientOcclusionTex": "ambientOcclusion_0.png", |
| | "ambientOcclusionCoef": 0, |
| | "glitterObjectSpaceCoef": 0.7, |
| | "glitterScreenSpaceCoef": 0.9, |
| | "glitterMaxIntensityCoef": 1, |
| | "glitterIntensity": 4.8, |
| "articleCode" | "3607342559998" |
| "type" | "blusher" |

Eyeshadow Example

| | |
|---|---|
| "name" | "Shadow Sticks 100 Rose Gold" |
| "alpha" | 0.97 |
| "color1" | {r: 153, g: 86, b: 41, a: 1} |
| "color2" | {r: 153, g: 86, b: 41, a: 1} |
| "color3" | {r: 153, g: 86, b: 41, a: 1} |
| "effect1" | "categories": ["light glitter"], |
| | "detailTex": "detail_0.png", |
| | "glitterTex": "noise_0.png", |
| | "applicationMaskTex": "maskEyeshadow_0.png", |
| | "ambientOcclusionTex": "ambientOcclusion_0.png", |
| | "ambientOcclusionCoef": 0, |
| | "glitterObjectSpaceCoef": 0.7, |
| | "glitterScreenSpaceCoef": 0.9, |

-continued

| | |
|---|---|
| | "glitterMaxIntensityCoef": 1, |
| | "glitterIntensity": 0, |
| | "detailCoef": 0, |
| | "imageGammaCoef": 0, |
| | "imageExposureCoef": 0, |
| | "intensity": 0.9 |
| "effect2" | "categories": ["light glitter"], |
| | "detailTex": "detail_0.png", |
| | "glitterTex": "noise_0.png", |
| | "applicationMaskTex": "maskEyeshadow_0.png", |
| | "ambientOcclusionTex": "ambientOcclusion_0.png", |
| | "ambientOcclusionCoef": 0, |
| | "glitterObjectSpaceCoef": 0.7, |
| | "glitterScreenSpaceCoef": 0.9, |
| | "glitterMaxIntensityCoef": 1, |
| | "glitterIntensity": 0, |
| | "detailCoef": 0, |
| | "imageGammaCoef": 0, |
| | "imageExposureCoef": 0, |
| | "intensity": 0.7 |
| "effect3" | "categories": ["light glitter"], |
| | "detailTex": "detail_0.png", |
| | "glitterTex": "noise_0.png", |
| | "applicationMaskTex": "maskEyeshadow_0.png", |
| | "ambientOcclusionTex": "ambientOcclusion_0.png", |
| | "ambientOcclusionCoef": 0, |
| | "glitterObjectSpaceCoef": 0.7, |
| | "glitterScreenSpaceCoef": 0.9, |
| | "glitterMaxIntensityCoef": 1, |
| | "glitterIntensity": 0, |
| | "detailCoef": 0, |
| | "imageGammaCoef": 0, |
| | "imageExposureCoef": 0, |
| | "intensity": 1.6 |
| "articleCode" | "3607344508390" |
| "type" | "eyeshadow" |

Lipstick Example

| | |
|---|---|
| "name" | "Lip Colour 200" |
| "alpha" | 0.51 |
| "color1" | {r: 166, g: 70, b: 97, a: 1} |
| "color2" | {r: 255, g: 255, b: 255, a: 1} |
| "effect1" | "categories": ["matte", "heavy shine"], |
| | "glitterTex": "noise_0.png", |
| | "applicationMaskTex": "maskLipstick_0.png", |
| | "ambientOcclusionTex": "ambientOcclusion_0.png", |
| | "fakeRGBTex": "diffuse_0.png", |
| | "realToFakeCoef": 0.5, |
| | "exposureMaskCoef": 0.5, |
| | "smoothing": 0.6, |
| | "shineAlpha": 0.73, |
| | "shineIntensity": 1.33, |
| | "greyscale": 1, |
| | "ambientOcclusionCoef": 0, |
| | "glitterExposureMaskCoef": 1, |
| | "glitterObjectSpaceCoef": 0.7, |
| | "glitterScreenSpaceCoef": 0.9, |
| | "glitterMaxIntensityCoef": 1, |
| | "glitterIntensity": 0 |
| "articleCode" | "10987" |
| "type" | "lipstick" |

Figure 40:
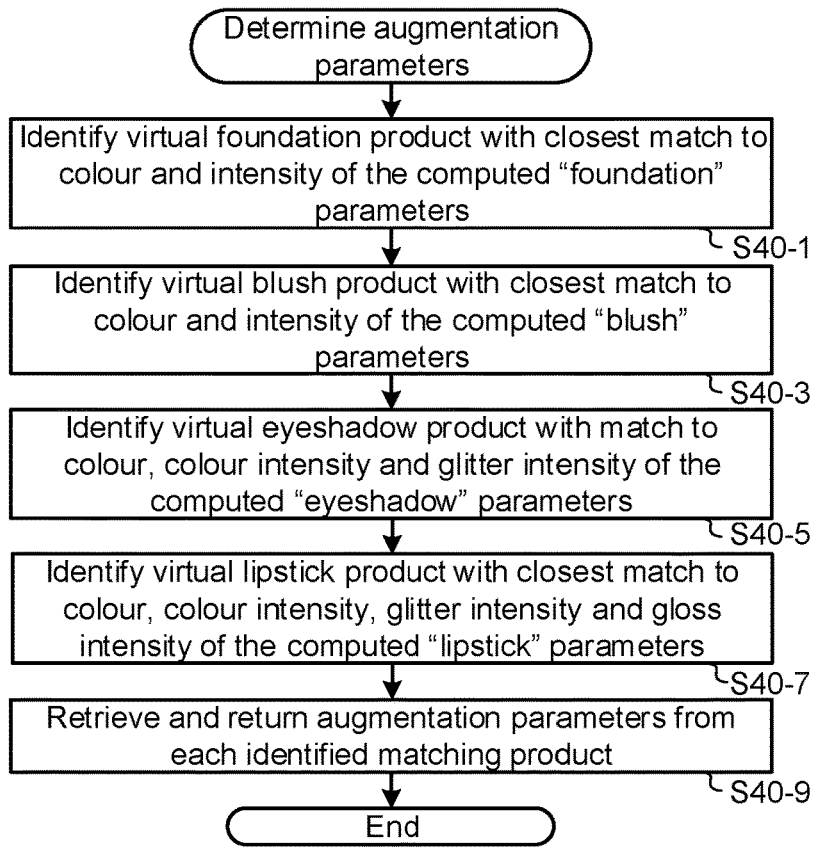
FIG. 40 is a flow diagram illustrating processing steps performed by the visible feature detector to compute augmentation parameters of an applied makeup products in the source face.

For example, as shown in FIG. 40, at step S40-1, the visible feature detector 17 identifies a virtual foundation product in the product database 9a having colour and intensity values that are a closest numerical match to colour and intensity values of the "foundation" parameters computed in step S39-1. At step S40-3, the visible feature detector 17 identifies a virtual blush product in the product database 9a having colour and intensity values that are a closest match to the colour and intensity of the "blush" parameters computed in step S39-3. At step S40-5, the visible feature detector 17 identifies a virtual eyeshadow product in the product database 9a having characteristics and values that are a closest match to the corresponding colour and intensity, and glitter intensity of the "eyeshadow" parameters computed in step S39-5. At step S40-7, the visible feature detector 17 identifies a virtual lipstick product in the product database 9a having characteristics and values that are a closest match to the corresponding colour and intensity, glitter intensity and gloss intensity of the "lipstick" parameters computed in step S39-7. Determination of a closest match may be weighted, for example giving preference to closer (or identical) matching colour values over intensity values, glitter intensity, gloss intensity, etc. At step S40-9, the visible feature detector 17 retrieves the associated characteristics and values from each identified virtual product in the product database 9a and returns the characteristics and values as colourisation parameters 9 for each virtual product to be passed to the colourisation module 7.

Referring back to FIG. 38B, at step S38-23, the tracking module 3 receives captured image data of a target image from the camera 5, which can be an image in a sequence of images or video frames. Optionally, the tracking module 3 may be configured to perform another initialisation process as discussed above with reference to step S38-1, prior to capturing the first target image frame. At step S38-25, the tracking module 3 determines if a target face was previously detected and located for tracking in a prior target image or video frame. In subsequent iterations of the tracking process, the face locator 15b of the tracking module 3 may determine that the target face was previously detected and located, for example from tracking data (not shown) stored by the system 3601, the tracking data including a determined global face shape of the detected face, which can be used as the initialised global face shape for the current captured target image. As this is the first time the tracking process is executed, processing proceeds to step S38-27 where the face locator 15b of the tracking module 3 determines the location of the target face in the captured target image, in the same way as described above at step S38-5. The face locator 15b initialises the detected target face shape at step S38-29 and performs processing to refine the initialised global face shape at step S38-31, in the same way as described above with reference to steps S38-7 and S38-9.

At step S38-33, the face locator 15b determines whether refinement of the detected object sub-shapes within the acceptable parameters was successfully achieved at step S38-31. If not, then processing returns to step S38-23, where a new captured target image is received from the camera 5 for processing in a new iteration by the face locator 15b. Otherwise, if the face locator 15b determines that acceptable sub-shape refinement was achieved by the processing at step S38-29, then at step S38-35, the face locator 15b optionally applies an exponential smoothing process to the face shape, based on the face shape detected in the previous frame when available, as described above.

Figure 41:
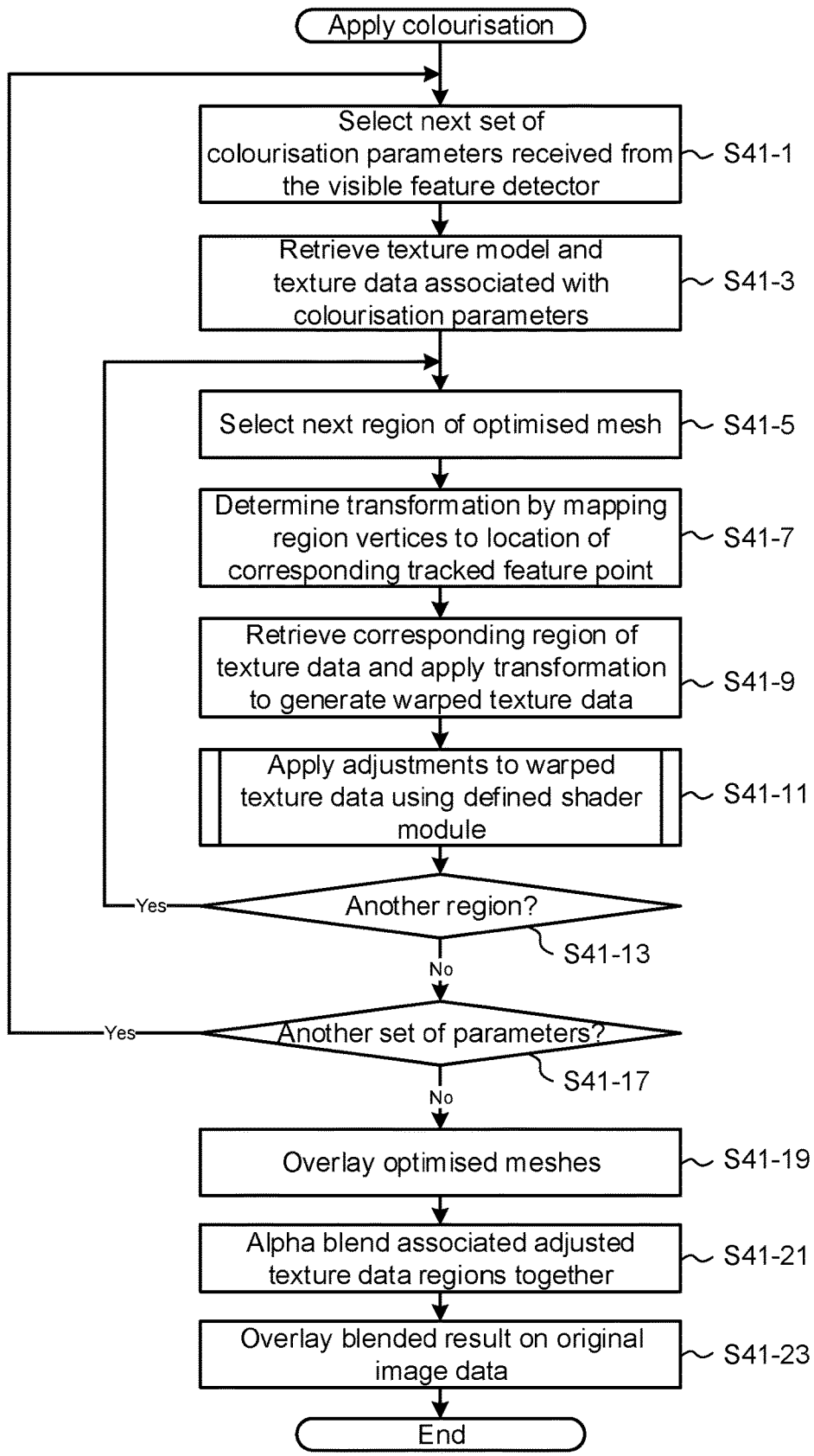
FIG. 41 is a flow diagram illustrating the main processing steps performed by the colourisation module of FIGS. 36 and 37 to apply colourisation to image data according to an embodiment.

At step S38-37, the colourisation module 7 applies image colourisation to the captured target image data by modifying pixel values of the detected target face in the captured target image, based on the received colourisation parameters 9 corresponding to one or more virtual try-on products. The colourisation process performed by the colourisation module 7 in the system 3601 will now be described in more detail with reference to FIG. 41. Reference is also made back to the examples shown in FIG. 34 as described above. As shown in FIG. 41, at step S41-1, the colourisation module 7 selects a first set of the colourisation parameters 9 received from the visible feature detector 17 of the source image processing module 4. At step S41-3, the colourisation module 7 retrieves the texture model 16 and the texture data file 20 associated with the selected set of colourisation parameters 9. FIG. 34 showed an example of four texture models 16 retrieved from the model database 41, each with a respective different mask 16a and mesh subset 16b, and each retrieved texture model 16a-1 to 16a-4 selected based on a corresponding set of colourisation parameters 9 associated with detected visible applied lipstick, eyeshadow, blush and foundation, respectively.

At step S41-5, the colourisation module 7 selects a first region of the mesh subset 16b from the retrieved texture model 16. At step S41-7, the transform module 7c determines a set of transformation values by mapping the coordinates of the vertices of the selected region to the location of the corresponding tracked feature point determined by the face locator 15a. At step S41-9, the transform module 7c retrieves the corresponding region of texture data 33, again as referenced by the vertices of the selected region, and applies the transformation to the retrieved region of texture data to generate a corresponding warped texture data region. Optionally, the transform module 7c may also retrieve the corresponding region of mask data 16a, as defined by the vertices of the selected region, and apply the transformation to the retrieved masked data to generate corresponding warped masked data for the selected region. At step S41-11, the colourisation module 7 applies the one or more image colourisation adjustments to the warped texture data region using the one or more shader modules 7a as defined by the shader value parameter 9-3. As will be described below, the shader modules 7a may optionally take into account the warped mask data region, depending on the particular shader sub-modules that are used.

At step S41-13, the colourisation module 7 determines if there is another region of the optimised mesh 15' to be processed, and if so, processing returns to step S41-5 where the next region is selected for processing as discussed above, until all of the regions of the mesh subset 16b have been processed in this way. At step S41-17, the colourisation module 7 then determines if there is another set of colourisation parameters 9 to be processed for the current captured image frame. If so, processing returns to step S41-1 where the next set of colourisation parameters 9 is selected and processed as discussed above, until all of the sets of colourisation parameters 9 have been processed in this way.

Figure 22:
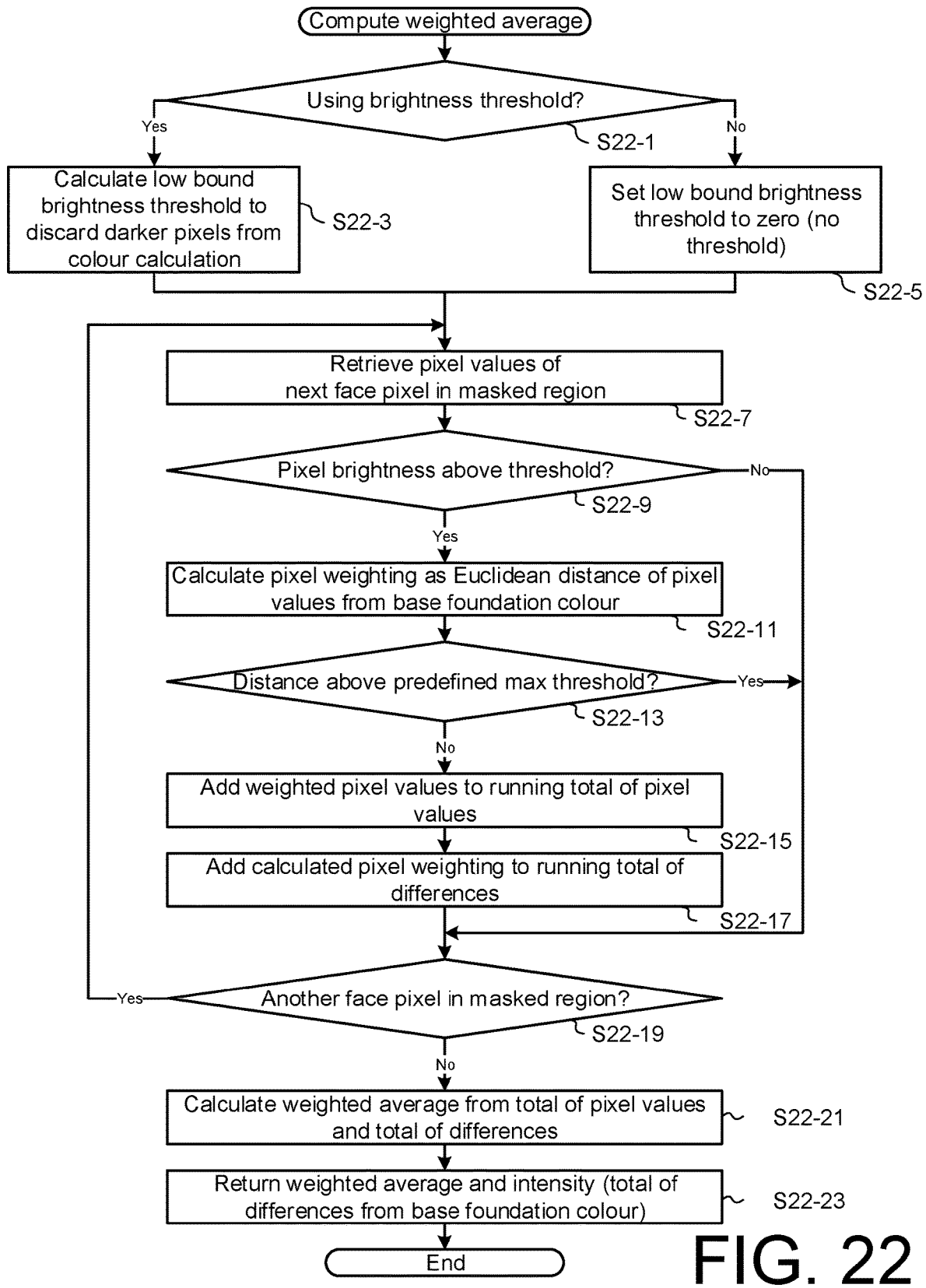
FIG. 22 is a flow diagram illustrating processing steps performed by the visible feature detector to compute the weighted average of pixel values within a masked region of image data.
Figure 23:
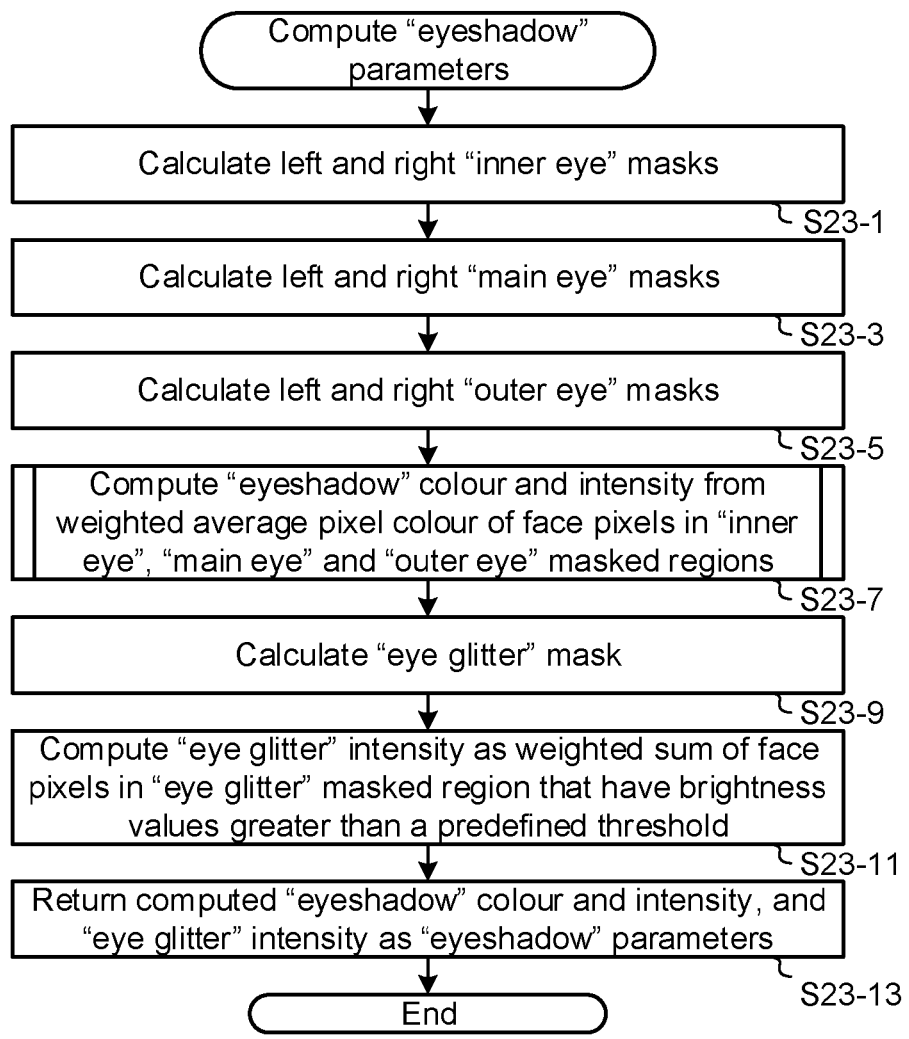
FIG. 23 is a flow diagram illustrating processing steps performed by the visible feature detector to compute parameters of an applied eyeshadow visible feature, according to the exemplary embodiment.
Figure 24:
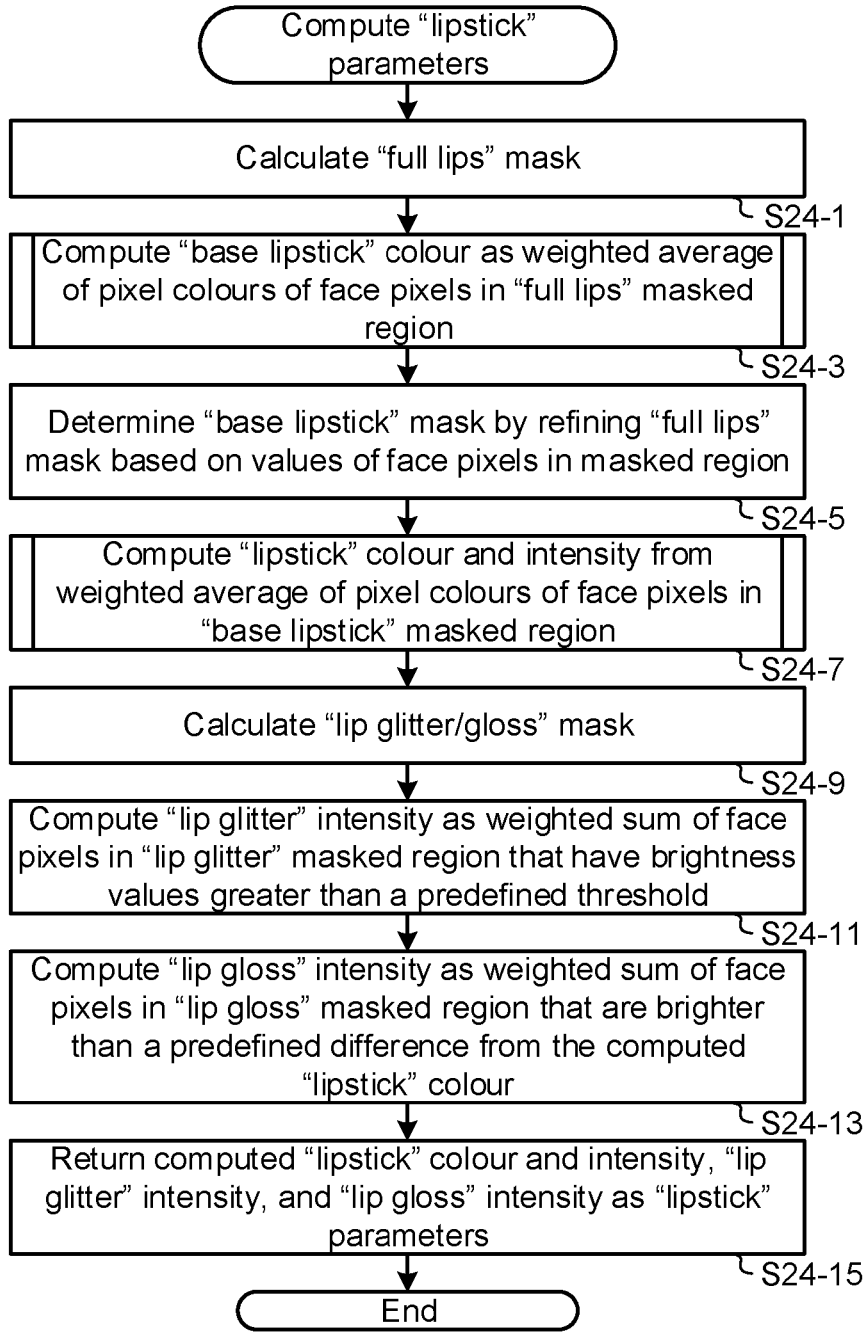
FIG. 24 is a flow diagram illustrating processing steps performed by the visible feature detector to compute parameters of an applied lipstick visible feature, according to the exemplary embodiment.

At step S41-19, the renderer 7b retrieves and overlays all of the optimised meshes 18 as a sequence of layered data to be applied to the captured image data. This is schematically illustrated at S22-1 in FIG. 22. At step S41-21, the renderer 7b performs an alpha blend of the adjusted texture data regions associated with each of the layered optimised meshes 18, as output by the respective shader modules 7a. FIG. 22 shows an example of the blended result at S22-2. The renderer 7b then overlays the blended results on the original captured image data for output to the display 11, at step S41-23. FIG. 34 showed an example of the resulting augmented image data at S22-3.

Referring back to FIG. 38B, the resulting augmented target image with the applied texture and colourisation is output at step S38-39 on display 11. At step S38-41, the tracking module 3 determines if there is a new captured image frame to process and processing returns to step S38-2 where image data of the next captured target frame is received from the camera 5.

Third Embodiment

Figure 42:
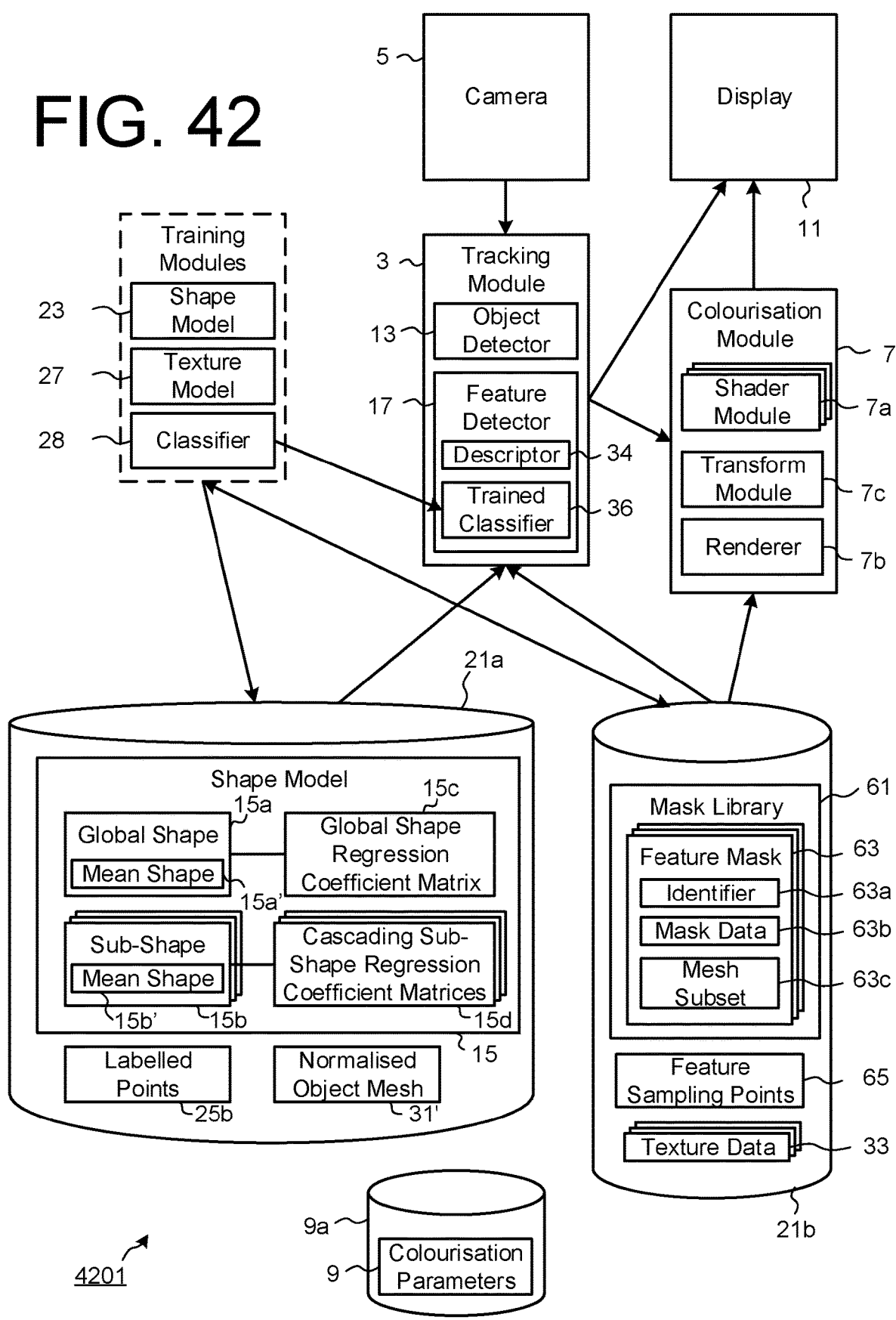
FIG. 42 is a block diagram showing the main components of an augmented reality system according to a third embodiment of the invention.

A further embodiment will now be described using corresponding reference numerals to those of preceding figures where appropriate for corresponding elements. Referring to FIG. 42, an augmented reality system 4201 is schematically illustrated. The augmented reality system 4201 comprises a tracking module 3 that automatically processes image data of a scene captured by a camera 5 to detect and determine the location of an object in the captured scene. A colourisation module 7 of the system 4201 modifies captured image data of the detected object, based on colourisation parameters 9 corresponding to one or more virtual wearable products, for example retrieved from a data store 9a, which may be remote from the system 4201. A user interface (not shown) may be provided to receive user input selection of the one or more virtual wearable products to try-on. The augmented image data is then output to a display 11. Alternatively or additionally, the tracking module 3 may be configured to output image frames as captured to the display 11, where the colourisation module 7 is configured to output the regions of modified pixels to the display 11, over the captured pixels of respective regions in the captured image frame. Preferably the operations are conducted in real time, or near real time.

The tracking module 3 includes an object detector 13 that automatically detects and determines the location of a predefined object in the captured image data based on a trained shape model 15. A plurality of object detectors may be provided, each configured to detect the presence of a respective different type of object in the captured image data. Instead or alternatively, the object detector 13 may be configured to identify the presence of one or more types of objects in the captured image data. In this embodiment, the trained shape model 15 includes a global shape model 15a and a plurality of sub-shape models 15b for a trained object shape, for example as described above. The trained shape model 15 may be stored in the data store 17a of the system 4201. It is appreciated that the object detector 13 can implement any known shape model based algorithm.

In this exemplary embodiment, the augmented reality system 4201 simulates the visible appearance of one or more virtual wearable products applied to respective predefined features or feature areas of a detected object in the captured image frame. In the virtual try-on context, the object feature(s) may be facial features of a person's face, hairstyle of a person's head, clothing or footwear items on a person's body, style or pattern of clothing, etc. It will be appreciated that aspects of the invention may be applicable to image augmentation in other contexts involving any type of object with visible features, such as medical imaging to detect, track and augment the display of internal body organs.

Figure 43A:
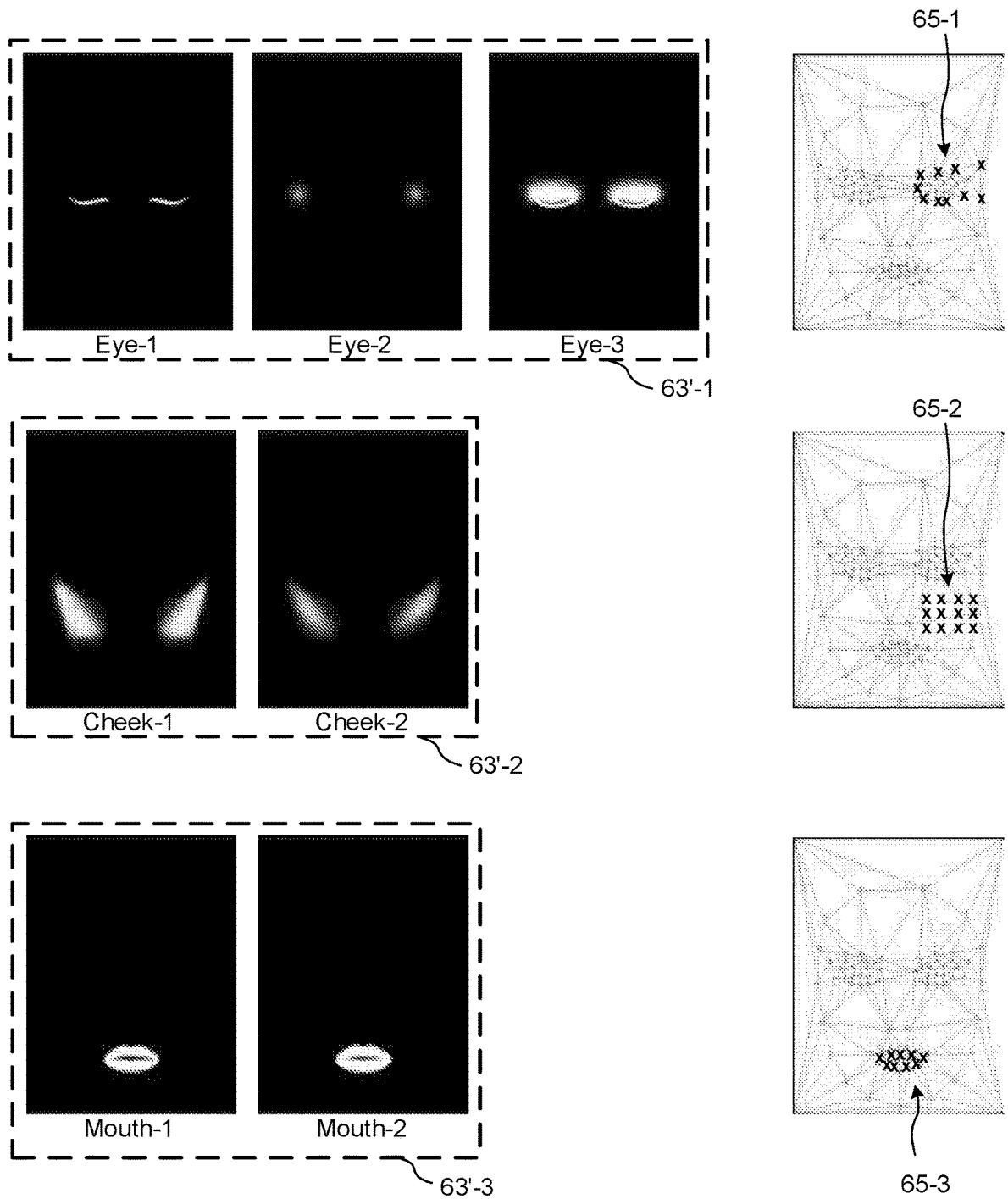
FIG. 43, which comprises FIGS. 43A and 43B, schematically illustrate further examples of data processed and generated by the texture model training module during the training process.
Figure 43B:
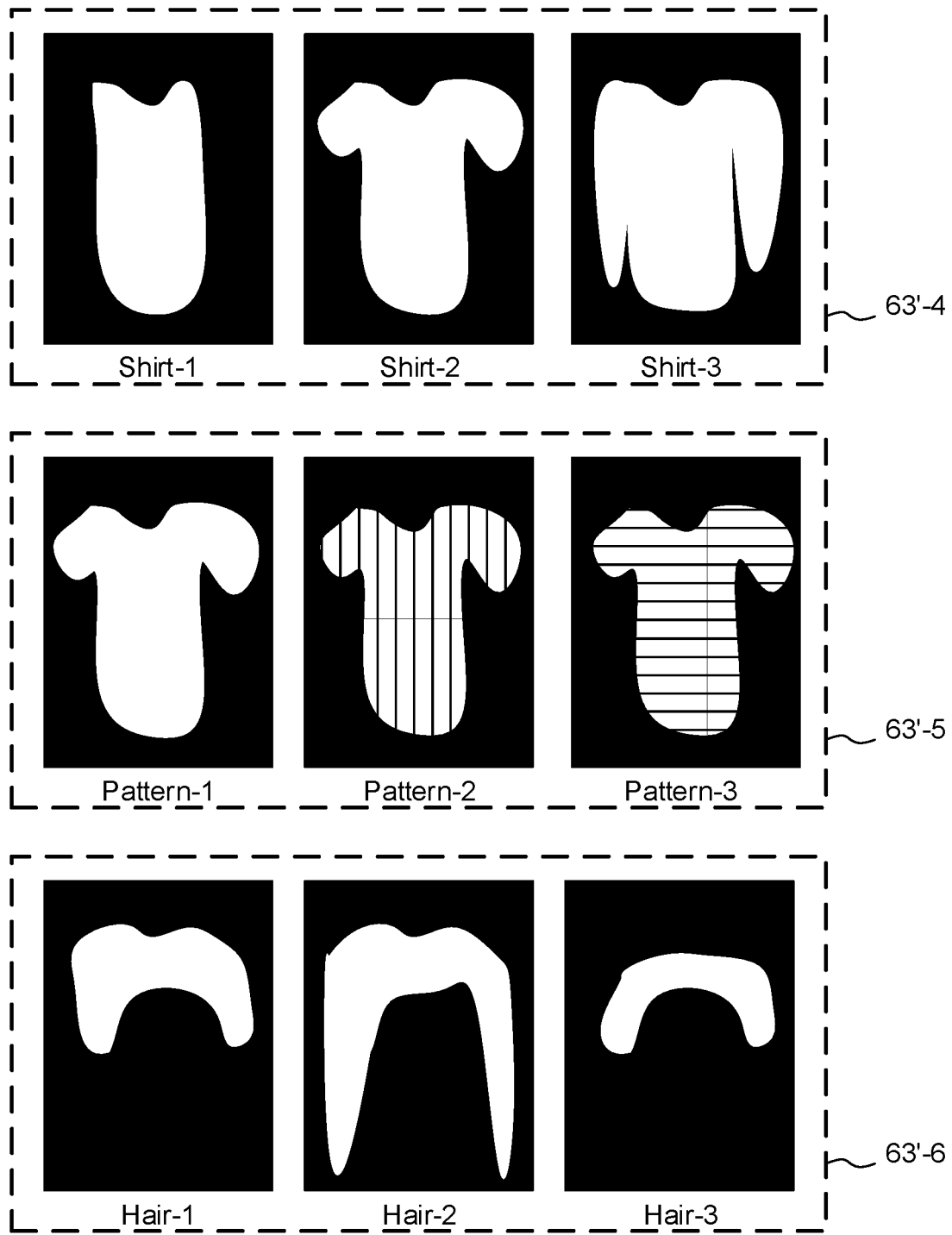

Improved processing efficiency and enhanced realism is achieved by defining and providing a mask library 61 storing a plurality of user-defined feature masks 63, which are used by the colourisation module 7 to determine the specific region or regions of pixels of the captured image data to be processed for colourisation. The mask library 61 may be stored in a texture data store 21a of the system 4201. The stored feature masks 63 are arranged into groups, each group 63' associated with a particular visible feature or aspect of a visible feature in an image, and each individual feature mask 63 is associated with a variation of the associated visible feature or aspect. The variation may include one or more of shape, pattern, colour, size, density, intensity, brightness, etc. FIGS. 43A and 43B schematically illustrates a plurality of exemplary groups 63' of feature masks stored in a mask library 61. A first exemplary group of feature masks 63'-1 is associated with variations of applied makeup around the eyes of a person's face. A second exemplary group of feature masks 63'-2 is associated with variations of applied makeup in respective cheek areas of a person's face. A third exemplary group of feature masks 63'-3 is associated with variations of a person's lips and/or variations of applied makeup to the lips of a person's face. A fourth exemplary group of feature masks 63'-4 is associated with variations of an item of clothing worn on the upper torso of a person's body, in particular the sleeve length. A fifth exemplary group of feature masks 63'-5 is associated with variations of patterns of an item of clothing worn by a person. A sixth exemplary group of feature masks 63'-5 is associated with variations of hairstyle of a person's head. Each mask 63 may define a contiguous region of pixels or a plurality of discontinuous regions of pixels.

Many masks can be compounded together to produce a particular desired virtual look or appearance, which consists of multiple layers of virtually applied products, in multiple application styles. The masks 63 may include black and white pixel data. Preferably, the masks 63 are grey-scale image data, for example including black pixels defining portions of a corresponding texture data file 33 that are not to be included in the colourisation process, white pixels defining portions of the corresponding texture data file 33 that are to be included at 100% intensity, and grey pixels defining portions of the corresponding texture data file 20 that are to be included at an intensity defined by the associated grey value. The white and grey pixels are referred to as the masked data regions. In this way, different masks 63 can be provided for various blurring effects.

The tracking module 3 includes a visible feature detector 17 that automatically identifies the presence or absence of one or more predefined visible features of the detected object in the captured image. The feature detector 17 processes captured image data of the detected object and selects a matching feature mask 63 for each visible feature detected in the capture image, based on pixel values sampled from locations of the captured image data that are predefined for each feature. A corresponding plurality of feature sampling points 65 are user-defined for each group of feature masks 63'. The feature sampling points 65 may be a selected subset of the labelled points 25b of the trained global shape model 15a, or may be defined relative to the labelled points 25b. FIG. 43A schematically illustrates exemplary sets of feature sampling points 65-1 to 65-3 defined for respective groups of feature masks 63'. The feature detector 17 generates a feature descriptor 32 of the detected visible feature from the sampled pixel values, and uses a trained classifier 36 to identify the feature mask 27 that matches the detected visible feature, based on the generated descriptor 32. A classifier training module 28 may be provided to train the classifier 36 based on training image data. The training image data may include synthetic images that are generated by the colourisation module 7 from a reference image, where the renderer 7c outputs image data that is augmented using a respective one of the feature masks 63. Suitable feature descriptors such as HOG, SIFT, SURF, FAST, BRIEF, ORB, BRISK, FREAK, or the like, and image classifiers based on PCA (Principal Component Analysis), LDA (Linear Discriminant Analysis), SVM (Support Vector Machines), neural networks, etc., are of a type that is known per se, and need not be described further.

The tracking module 3 passes the captured image data to the colourisation module 15, together with the determined location of the target object in that image frame and data identifying the selected feature mask 63 for each detected visible feature. Each individual feature mask 63 may include a unique identifier 63a that can be output by the trained classifier 36 and used by the colourisation module 7 to retrieve the associated mask data 63b during the colourisation process. Each feature mask 63 may also include data 63c defining a subset of the normalised object mesh 16' that is determined based on the associated feature mask 27, such that the colourisation module 7 performs efficient and accurate modification of the pixel values within the masked regions of the captured image data. The mesh subset data 27c may be generated in a texture training process by a texture training module 27. In this way, the colourisation module 7 determines a subset of polygonal faces of the normalised object mesh 16' corresponding to an identified feature mask 27 from the mesh subset data 27c included in the feature mask 27.

The colourisation module 7 modifies the pixel values of the or each selected masked region of the captured image data to augment the associated visible feature with the appearance of the virtual wearable product, based on colourisation parameters 9 such as pixel value adjustment properties and/or identification of texture data 33 that is representative of the appearance of a virtual wearable product. The texture data 33 may include image data or a mathematical model that can be used to generate an array of augmentation values to be applied by the colourisation module 7 to the selected masked regions of the captured image data.

The colourisation module 7 may include a plurality of shader modules 7a that determine and apply image colourisation to selected regions of captured image data and/or texture data files 33. The output of a shader module 7a is sent to a renderer 7b that augments the underlying object in the captured image from the camera 5 with the specified virtual wearable product. As will be described in more detail below, each shader module 7a can be based on predefined sets of sub-shader modules to be applied in sequence, for example based on selected sets of colourisation parameters 9. The colourisation module 7 may also include a transform module 7c that receives data defining the location of labelled features points in the common reference plane, determined by the tracking module 3 for a captured image. The determined coordinates from the camera image data define the positions of the polygonal regions of a normalised object mesh 16' that matches the detected object.

The transform module 7c determines a mapping from the vertices of a selected region of a trained mesh 16' to vertices of the corresponding tracked labelled points. The transform module 7c uses the determined mapping to transform the selected mask data 16a (and/or texture data 33) for the particular feature, into respective "warped" versions that can be processed by the shader modules 7a. The renderer 7b may be configured to overlay the respective augmented masked image data of each feature according to the common reference plane, and in conjunction with an alpha blended shader sub-module (not shown), performs an alpha blend of the respective regions of augmented image data. The final result is obtained by the renderer 7b applying the blended result back onto the object represented by the captured image data from the camera 5, and output to the display 11.

In this way, the colourisation module 7 uses the image data coordinates from the detected object, referenced by the mesh subsets 27c, as texture coordinates to the mask data 27b and texture data files 33, for each feature mask 27 associated with a respective set of colourisation parameters 9 for one or more selected virtual wearable products, transformed according to the tracked labelled point locations, and rendered over the captured image data, resulting in the visual effect of morphing the selected product(s) to the object in a real-time augmented reality display. It will be appreciated that the processing modules of the colourisation module 7 may include calls to a set of predefined functions provided by a Graphics Processing Unit (GPU) of the system 4201. Advantageously, the present embodiment provides for more efficient GPU usage, as only the masked portions of the respective texture data files and captured image data are transmitted to the GPU for processing.

The processing of data by the training modules 23,27,28 may be referred to as "offline" pre-processing, as the training processes are typically carried out in advance of the real-time image processing by the tracking module 3.

Figure 44:
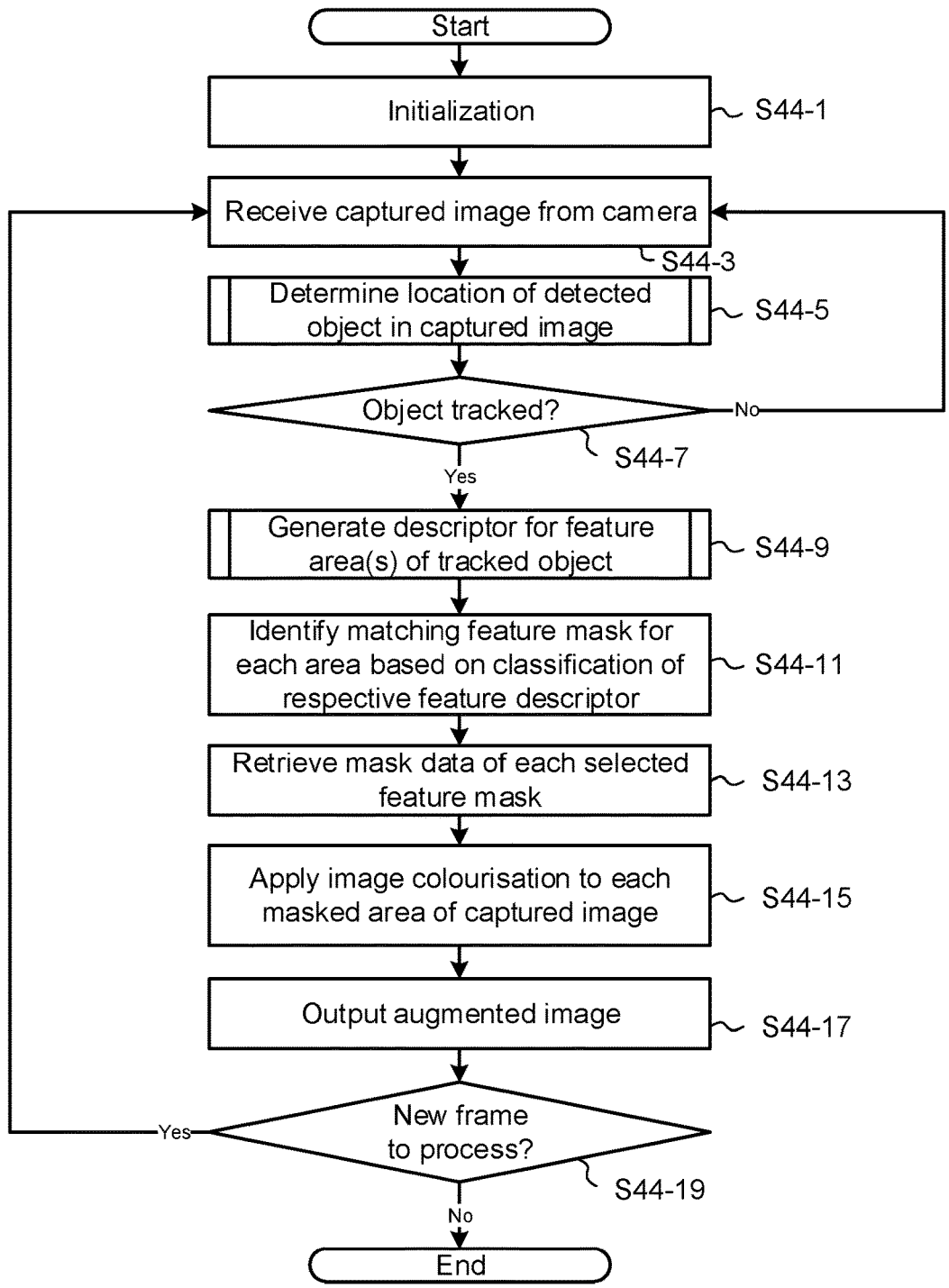
FIG. 44 is a flow diagram illustrating the main processing steps performed by the system of FIG. 42 to track and augment an object in a captured image according to an embodiment.

The tracking process performed by the tracking module 3 in the system 4201 will now be described in more detail with reference to FIG. 44, which shows the steps of an example computer-implemented tracking and augmentation process in an embodiment of the present invention. As shown in FIG. 5, at step S44-1, the tracking module 3 may perform an initialisation sub-process based on received data of an initial captured image from the camera, for example as described in the applicant's above-referenced application GB2518589. At step S44-3, the initialised tracking module 3 receives captured image data from the camera 5, which can be an image in a sequence of images or video frames.

Figure 45:
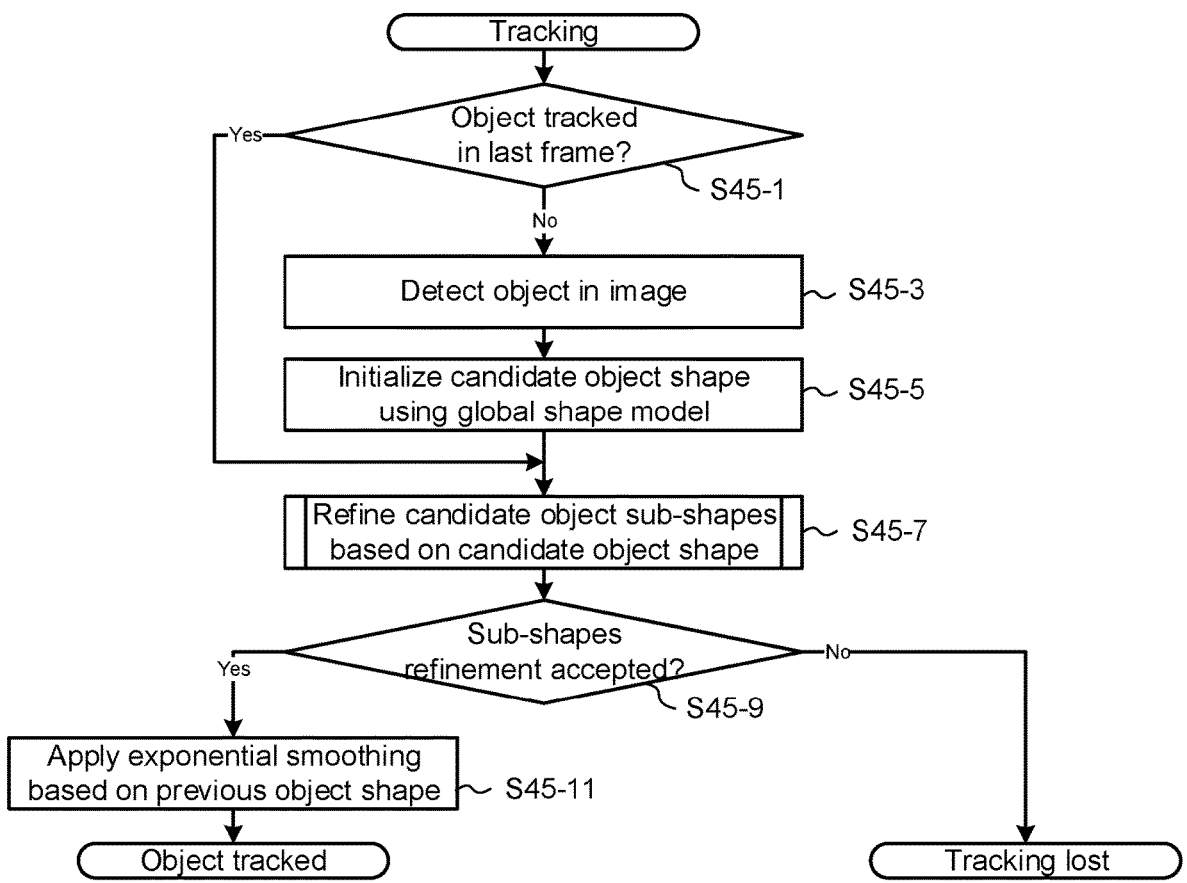
FIG. 45 is a flow diagram illustrating exemplary processing steps performed by the tracking module of FIG. 42 to determine and track the location of the object in the captured image.

At step S44-5, the tracking module 3 determines the location of a detected object in the captured image. An exemplary object tracking sub-process is described with reference to FIG. 45, for the shape model 15 illustrated in FIG. 42. Referring to FIG. 45, at step S45-1, the tracking module 3 determines if an object, was previously detected and located for tracking in a prior image or video frame. In subsequent iterations of the tracking process, the tracking module 3 may determine that the object was previously detected and located, for example from tracking data (not shown) stored by the system 4201, the tracking data including a determined global object shape of the detected object, which can be used as the initialised global object shape for the current captured image. As this is the first time the tracking process is executed, processing proceeds to step S45-3 where the captured image data is processed by the object detector 13 to detect an object in the image and to output a bounding box of an approximate location for the detected object. At step S45-5, the tracking module 3 initialises the detected object shape using the trained global shape model 15a and the corresponding global shape regression coefficient matrix 15c retrieved from the model data store 17a, based on the image data within the identified bounding box.

At step S45-7, the tracking module 3 performs processing to refine the initialised global object shape using the trained sub-shape models 15b and its corresponding cascading regression coefficient matrices 15d for each sub-shape model 15b. This processing is described above with reference to FIG. 17. The tracking module 3 determines at step S45-9 whether refinement of the detected object sub-shapes within the acceptable parameters was successfully achieved at step S45-7. If not, for example if it was determined that tracking of the object was lost, then processing can return to step S44-3, where a new captured image is received from the camera for processing in a new iteration by the tracking module 3. Otherwise, if the tracking module 11 determines that acceptable sub-shape refinement was achieved by the processing at step S45-7, then at step S45-11, the tracking module 11 optionally applies an exponential smoothing process to the object shape, based on the object shape detected on the previous frame when available, as described above.

Figure 46:
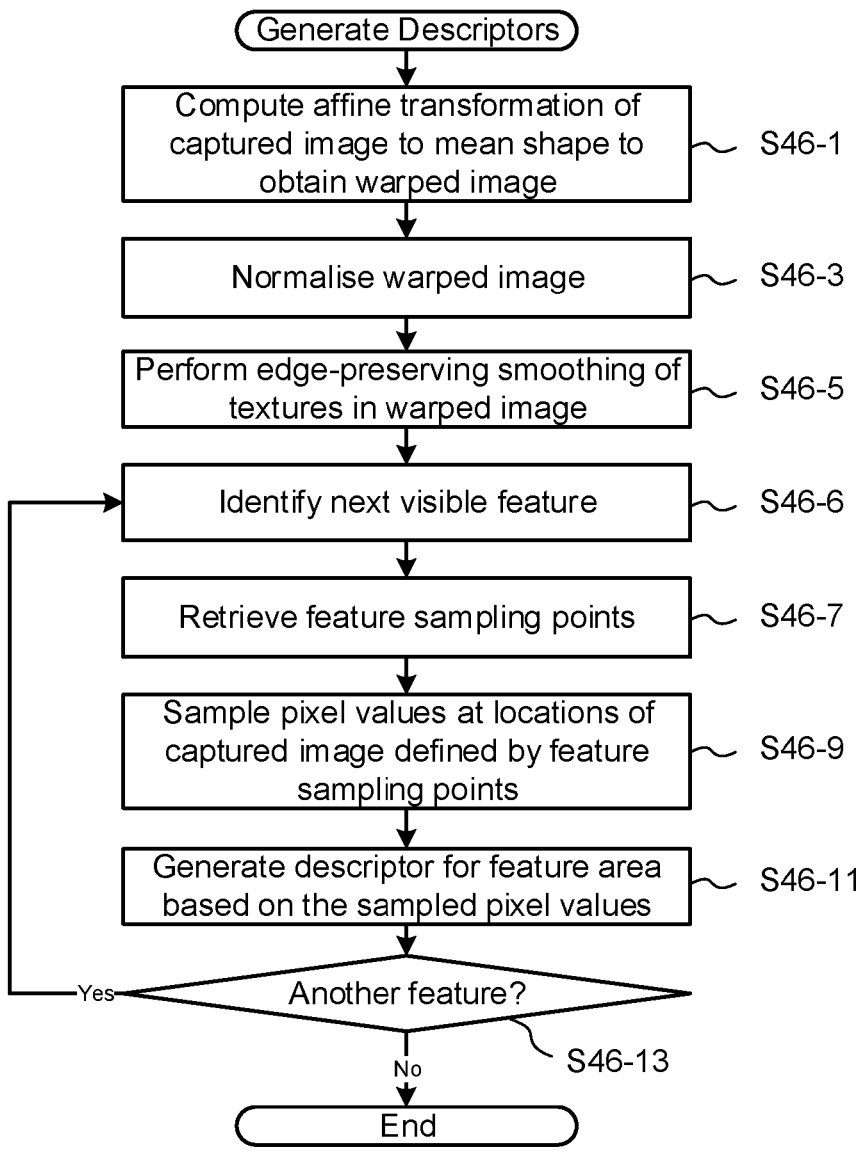
FIG. 46 is a flow diagram illustrating processing steps performed by a feature detector of the tracking module of FIG. 42 to generate feature descriptors.

After the tracking module 3 has determined at step S44-7 that the object detector 13 has successfully tracked the location of a detected object in the captured image and generated or updated an instance of the object shape model 15' with the refined locations of the labelled points 25b, then at step S44-9, the feature detector 17 generates one or more feature descriptors 34 for respective predefined feature areas of the tracked object. This processing is described in more detail with reference to FIG. 46. As shown in FIG. 46, at step S46-1, the feature detector 17 computes an affine transformation of the captured image to the global mean shape 15a' to obtain a warped instance of the captured image. At step S46-3, the feature detector 17 may normalise the warped image by applying photometric normalization to compensate for different lighting conditions, for example. The result of these steps is a uniformly distorted instance of the captured image to the trained, and thus static, model estimation. At step S46-5, the feature detector 17 may perform edge-preserving smoothing of the warped image data, for example based on the Bilateral filter, the Guided filter, anisotropic diffusion, or the like, to smooth away textures whilst retaining sharp edges.

At step S46-6, the feature detector 17 identifies the next visible feature (or aspect) of the tracked object to be processed, this being a first feature the first time the sub-process is executed. For example, each selected virtual wearable product may be associated with one or more visible features or aspects to be detected. Alternatively or additionally, the feature detector 17 may be configured to automatically determine the presence or absence of a visible feature or aspect in the captured image. At step S46-7, the feature detector 17 retrieves the stored plurality of feature sampling points 65 defined for the current visible feature, for example from the data store 17b. At step S46-9, the feature detector 17 samples pixel values from the captured image at the locations defined by the retrieved feature sampling points 65. For example, a selection of ten labelled points 25b around the eye region of a face object may be defined as feature sampling points 65-1 associated with the first exemplary group of feature masks 63'-1 illustrated in FIG. 4A. As another example, For example, a grid of twelve sampling points may be defined relative to labelled points 25b around a cheek area of a face object may be defined for the second exemplary group of feature masks 63'-2. The corresponding locations of each feature sampling point 31 can be determined from the stored instance of the object shape model 15'. At step S46-11, the feature detector 17 generates a feature descriptor 34 for the current feature area, based on the sampled pixel values. It will be appreciated that the precise data structure and composition of the feature descriptor 34 will depend on the particular type of descriptor that is implemented by the feature detector 17. At step S46-13, the feature detector 17 determines if there is another predefined feature area to process, and if so, processing returns to step S46-6 to identify the next visible feature (or aspect) to be processed.

Referring back to FIG. 44, the feature detector 17 identifies at step S44-11 a matching feature mask 27 for each predefined feature area, by passing each respective feature descriptor through the trained classifier 36. For example, the trained classifier 36 may output an identifier 28a of the selected feature mask 27 determined to be the closest match to the particular visible feature or aspect of the visible feature in the captured image. The tracking module 3 may pass the captured image data and the identifiers 27a of the selected feature masks to the colourisation module 7 to complete the tracking process.

At step S44-13, the colourisation module 7 retrieves the mask data 27b of each selected feature mask 27 from the data store 17b. The colourisation module 7 may then process each polygonal region of the mesh subset 27c from the or each retrieved feature mask 27, to determine a set of transformation values by mapping the coordinates of the vertices of the selected mask mash subset to the location of the corresponding tracked labelled point determined by the tracking module 3, and apply the transformation to the masked data to generate corresponding warped masked data for the selected masked region. At step S44-15, the colourisation module 7 applies the image colourisation to the captured image data by modifying pixel values in the respective selected masked regions of the captured image data, based on colourisation parameters 9 for example corresponding to one or more virtual try-on products, retrieved from the data store 9a. The colourisation module 7 may also retrieve one or more texture data files 33 as identified by the selected set of colourisation parameters 9. Optionally, the colourisation module 7 may also apply the determined transformation values to the retrieved region of texture data to generate a corresponding warped texture data region. The colourisation module 7 applies the one or more image colourisation adjustments to the warped masked image data region using the one or more shader modules 7a. The renderer 7b may receive and overlay all of the modified regions of image data as a sequence of layered data to be applied to the captured image data, and perform an alpha blend of the modified image data regions. The renderer 7b overlays the blended results on the original captured image data for output to the display 11, at step S44-17. At step S44-19, the tracking module 3 determines that there is another captured image frame to process, and processing returns to step S44-3 to repeat the tracking and colourisation processes for the next frame.

Shader Modules

FIG. 47, which comprises FIGS. 47A to 47D, schematically illustrate exemplary shader modules 7a and respective processes for applying colourising adjustments to identified portion(s) of associated texture data and/or captured image data, as described in the embodiments above. Each shader module 7a is defined by a predetermined set of shader sub-modules 32 for performing respective adjustments to the texture image data and/or captured image data, optionally taking into account properties 9-1 of the present set of colourisation parameters 9.

Figure 47A:
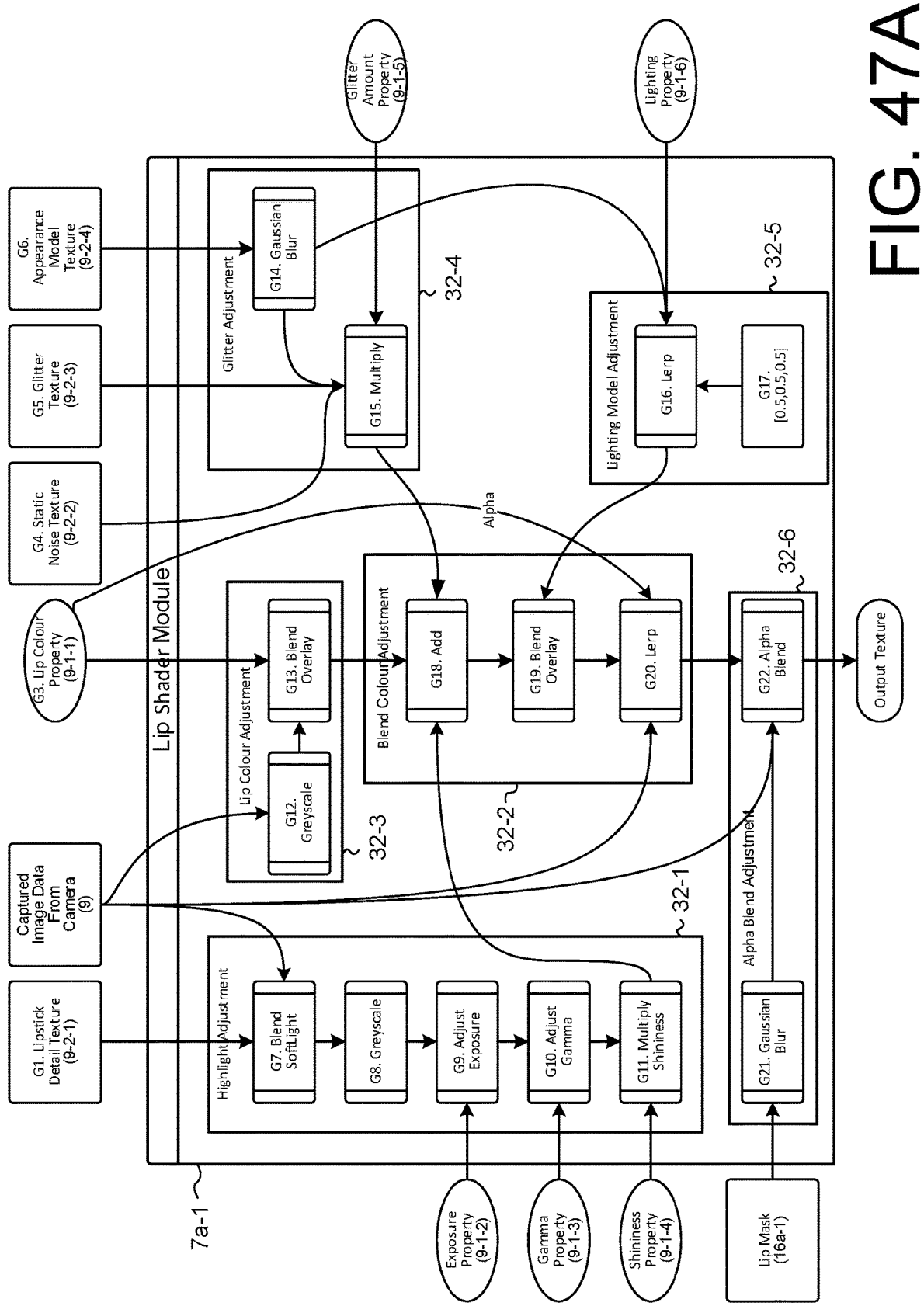
FIGS. 47A to 47D, are schematic block flow diagrams illustrating the main components and processing flows for exemplary shader shader modules in the colourisation module.

FIG. 47A illustrates a first example of a lip shader module 7a-1 for applying colourisation to a portion of the captured image data based on a corresponding portion of a lipstick detail texture 9-2-1. In this example, a lip mask 16a-1 defines the masked portion as the lips of a face in the captured image data, for example as shown in FIGS. 7D and 34. At a step G1, the warped region of the lipstick detail texture data file 9-2-1 is provided. This is a predetermined lip image 9-2-1 warped into the shape of the detected object in the captured image frame, and carrying a texture such as glossy or matte. At step G2, the captured image data from the camera 5 is provided, in which the user's face will typically be visible. At step G7, a highlight adjustment shader sub-module 32-1 uses the lipstick detail texture 9-2-1 and captured image data to perform a blend operation in a highlight adjustment stage. This blend operation serves to average (per pixel) the luminance of the lipstick detail texture and captured image data. This adds additional detail to the captured image data which may in some cases show quite featureless lips. For example, the operation can be applied on a per channel basis for the input pixels a, b, across the red, blue and green channels, as follows:

$$a \in [r, g, b], b \in [r, g, b]$$

$$f_{softlight}(a, b) = \begin{cases} 2ab + a^2(1 - 2b), & \text{if } b < 0.5 \\ 2a(1 - b) + \sqrt{a(2b - 1)}, & \text{otherwise} \end{cases}$$

This is followed by a greyscale conversion step G8 to convert the combined output of the captured image data and lipstick detail texture 9-2-1 (output of step G7) into greyscale. For example, this can be calculated as a weighted sum of the colour channels, with weights set to best match the human perception of colour, as follows:

$$f_{greyscale}(r,g,b) = 0.2125 \cdot r + 0.7154 \cdot g + 0.0721 \cdot b$$

Then, the exposure of the output of the step G8 is adjusted at a step G9, based on an exposure property 9-1-2, to influence the brightness level at which highlight features would be added to the lip texture, and has the effect of nonlinearly increasing or decreasing the input value. For example, exposure can be computed as:

$$f_{exposure}(x,n) = x \cdot 2^n$$

As discussed above, the various properties taken into account by the shader sub-modules in this process can be defined by the present selected set of colourisation parameters 9.

Similarly, at a step G10 the gamma of the greyscale image is adjusted, using a gamma property 9-1-3, for the same reasons as the step G9. The result of G9 and G10 may be a pixel value which has either been emphasised (brightened) or diminished (reduced in brightness). G10 has the effect of nonlinearly adjusting the greys of an image either boosting or diminishing their output value without adjusting either complete white or complete black as follows:

$$f_{gamma}(x, g) = x^{\frac{1}{g}}$$

A multiply shininess step G11 then modifies the shininess of the greyscale image/texture based on a shininess property 9-1-4. In other words, the step G11 linearly modulates the pixel value to inhibit harsh lighting effects. The resulting output of the highlight adjustment stage is passed to a first step of a blend colour adjustments stage. The purpose of the steps G9 to G11 is to emphasise existing areas of brightness in the final augmented lip texture. The resulting output of the highlight adjustment sub-module 32-1 is passed to a first processing step of a blend colour adjustment shader sub-module 32-2.

At a step G12, a lip colour adjustment shader sub-module 32-3 performs a greyscale operation on the captured image data as a first step to convert incoming pixel colour values into greyscale. Then, at a step G13 the greyscale image is blended with a lip colour property 9-1-1 (selected lip colour property—from a step G3) to form an overlay. The resulting output of the lip colour adjustment sub-module 32-3 is also passed to the blend colour adjustment shader sub-module 32-2.

$$a \in [r, g, b], b \in [r, g, b]$$

$$f_{overlay}(a, b) = \begin{cases} 2ab, & \text{if } a < 0.5 \\ 1 - 2(1 - a(1 - b), & \text{otherwise} \end{cases}$$

Meanwhile, at a step G4 a static noise texture, such as a simple Gaussian noise, is provided as a 2D image. A glitter texture is provided at a step G5 (Gaussian noise, and again a 2D image, but in this case warped to the shape of the lips/model). Optionally, an appearance model texture may be provided as input for further colour adjustment, for example to a Gaussian blur at a first step G14 of a glitter adjustment shader sub-module 32-4 to soften the edges of the lip model texture. The blurred model, and the static and warped textures may be passed to a multiply step G15 in combination with a glitter amount property 9-1-5. The textures are multiplied together (weighted by the glitter amount property 9-1-5) so that the pixel values (greyscale) of spatially correlated pixels with the respective 2D images are multiplied together. When the lips (and the model) move, the warped texture will move with respect to the static texture, causing a sparkling effect on the lips. The resulting output of the glitter adjustment sub-module 32-4 is also passed to the blend colour adjustment shader sub-module 32-3.

At a step G18, the outputs of the steps G11, G13 and G15 are added together in the first step of the blend colour adjustment shader sub-module 32-2. At a step G16, a lighting model adjustment sub-module computes a lighting model adjustment by linearly interpolating the blurred appearance model texture based on a 50% grey level set at a step G17 and a lighting property 9-1-6 (which controls how much influence is provided by the output of the appearance model, and how much influence is provided by the fixed grey level). The overlay generated at the step G18 is then blended with the lighting model by the blend colour adjustment sub-module 32-2, at a step G19. The purpose of the lighting model adjustment is to emphasise the detail taken from the appearance model texture, while controlling the level of influence this has (using the lighting property 9-1-6 and G17 grey level) so as not to produce harsh, dominating effects. The output of the step G19 is then further linearly interpolated based on alpha value of the lip colour property 9-1-1 (to control the balance between the original input image and the augmented overlay) and the captured image at a step G20.

$$f_{lerp}(a,b,w) = a + w(b-a)$$

At a step G21, an alpha blend adjustment sub-module 32-6 applies a Gaussian blur operation to soften the edges of the lip mask data 16a-1 (defining which parts of an image are lip and which are not) at step G21, and then at a step G22 is used to perform an alpha blend stage with the adjusted overlay, received from the blend colour adjustment sub-module 32-2, and the captured image data.

$$f_{alphablend}(a,b,w) = (a \cdot q) + b \cdot (1-w)$$

Advantageously, this prevents the colourisation from being applied outside the lip region of the input image, and softens the colourisation at the boundary of the lips. In summary, the overall computed highlight intensity calculated by this exemplary lip shader module 7a-1 is as follows:

Highlight Adjustment
CH=Gamma(Exposure(Greyscale(BlendSoftLight(WC, LD)), EP), GP)*SP
    where CH is the computed highlight intensity, WC is the captured image pixel colour, LD is the Lipstick Detail Texture pixel colour, EP is the Exposure Property 25a-2, GP is the Gamma Property 9-1-3, and SP is the Shininess Property 9-1-4.

Lip Colour Adjustment
CC=Overlay(LC, Greyscale(WC))
    where CC is the computed lip colour, and LC is the Lip Colour Property 9-1-1.

Glitter Adjustment:
CG=GT*NT*Guassian(AM)*GA

Lighting Model Adjustment
CL=Lerp(0.5, AM, LP)
    where CL is the computed lighting model intensity, and LP is the Lighting Property 9-1-6.

Blend Colour Adjustments
BC=Lerp(WC, Overlay(CC+CH+CG, CL))
    where BC is the blended colours adjustments.

Alpha Blend Adjustment
OT=AlphaBlend(BC,WC Guassian(LM))
    where OT is the 'Output Texture' pixel colour, and LM is the 'Lip Mask Texture' pixel colour.

Figure 47B:
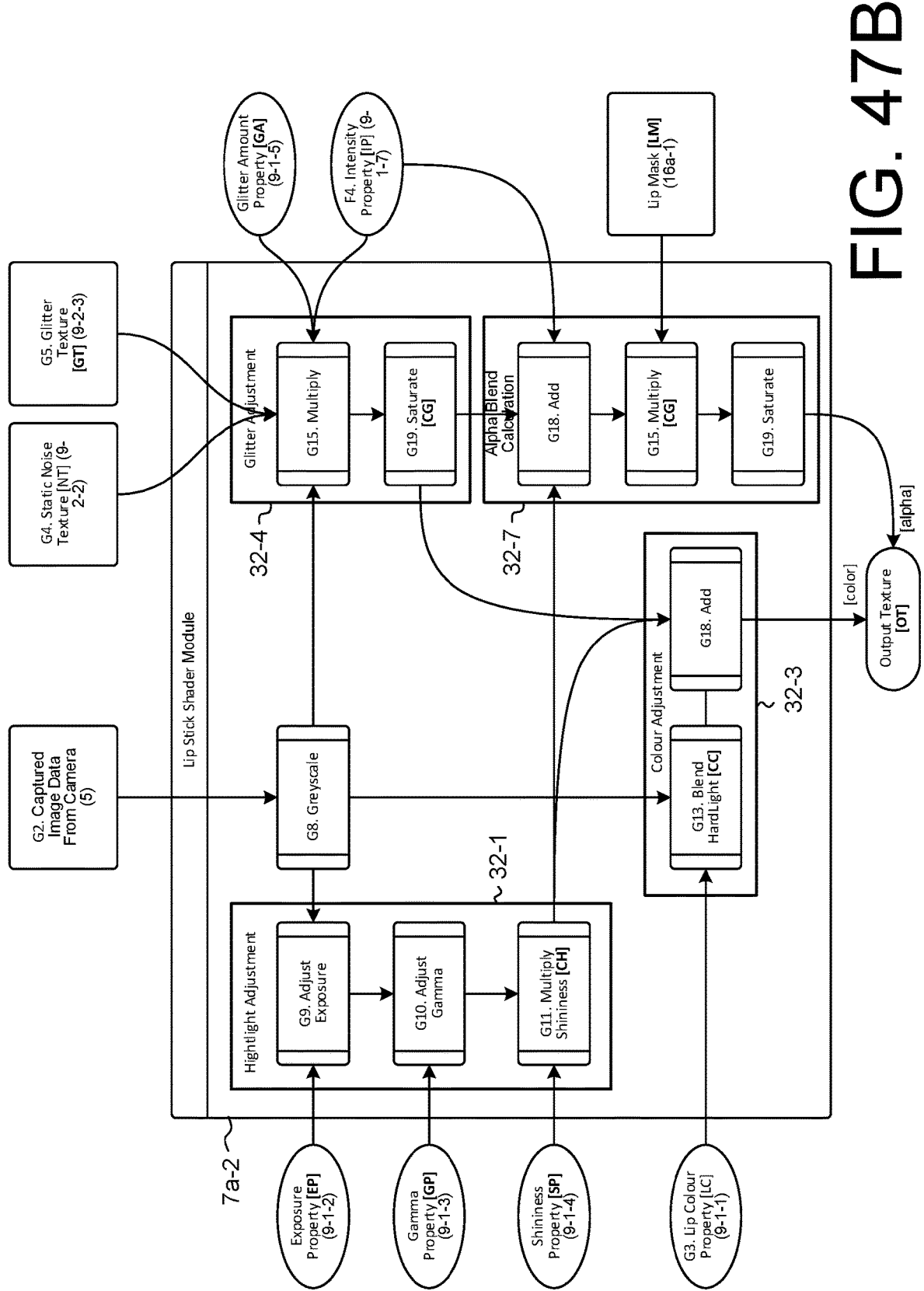

FIG. 47B illustrates a second example of a lip shader module 7a-2 for applying colourisation to a portion of the captured image data, based on a corresponding portion of a lipstick detail texture 9-2-1. As in the first example, the lip mask 16a-1 defines the masked portion as the lips of a face in the captured image data. However, in this example, the lip stick shader module 7a-2 is configured to use a different set of shader sub-modules 32 than the first example above. Additionally, instead of applying the alpha blend to the captured and adjusted image data, an adjusted colour value for each pixel is output as the resulting colourised texture data along with a corresponding calculated alpha value for each pixel. Accordingly, as shown in FIG. 47B, an alpha blend calculation sub-module 32-7 calculates the respective alpha blend values for the output texture portion by first receiving output data from a highlight adjustment sub-module 32-1 and a glitter adjustment sub-module 32-4, and adding the received data together at a step G18 based on an intensity property 9-1-7. The output of step G18 is then additively multiplied with data of the warped portion of the lip mask 16a-1 at step G115, and further processed in a subsequent saturation step G19. The intensity property 9-1-7 is also used by the glitter adjustment sub-module 32-4 as a further parameter to control the glitter adjustment.

G15, and further processed in a subsequent saturation step G19. The intensity property 9-1-7 is also used by the glitter adjustment sub-module 32-4 as a further parameter to control the glitter adjustment.

A colour adjustment sub-module 32-3 is used to apply the lip colour property 9-1-1 to a greyscale version of the portion of the captured image data to determine the colour values for the output texture. In this example, the colour adjustment sub-module 32-3 is configured to apply a "hard light" blend at a modified step G13, to combine the lip colour property 9-1-1 with the greyscale captured image data. For example, the operation can apply the property b to each input pixel a as follows:

$$f_{hardlight}(a, b) = \begin{cases} 2ab, & \text{if } b < 0.5 \\ 1 - 2(1 - a)(1 - b), & \text{otherwise} \end{cases}$$

Figure 47C:
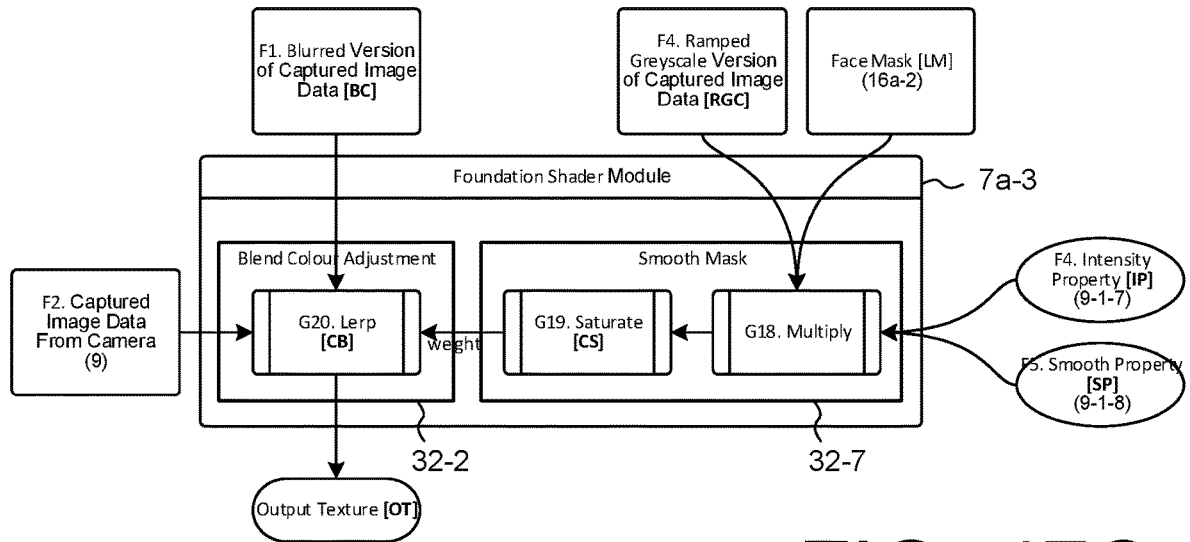

FIG. 47C illustrates an example of a foundation shader module 7a-3 for applying colourisation to another portion of the captured image data, based on a corresponding warped portion of a face mask 16a-4. In this example, the face mask 16*a*-4 defines the masked portion as the skin portion of a face in the captured image data, for example as shown in FIGS. 7D and 34. As shown in FIG. 47C, a blend colour adjustment sub-module 32-2 linearly interpolates the captured image data from the camera 5 with a blurred version of the captured image data, based on the weighted output of a smooth mask sub-module 32-7. The smooth mask sub-module 32-7 performs processing at a step G18 to add the face mask data 16*a*-4 with a ramped greyscale version of the captured image data, based on an intensity property 9-1-7 and a smooth property 9-1-8, and adjusts the saturation of the output at a step G19.

Figure 48:
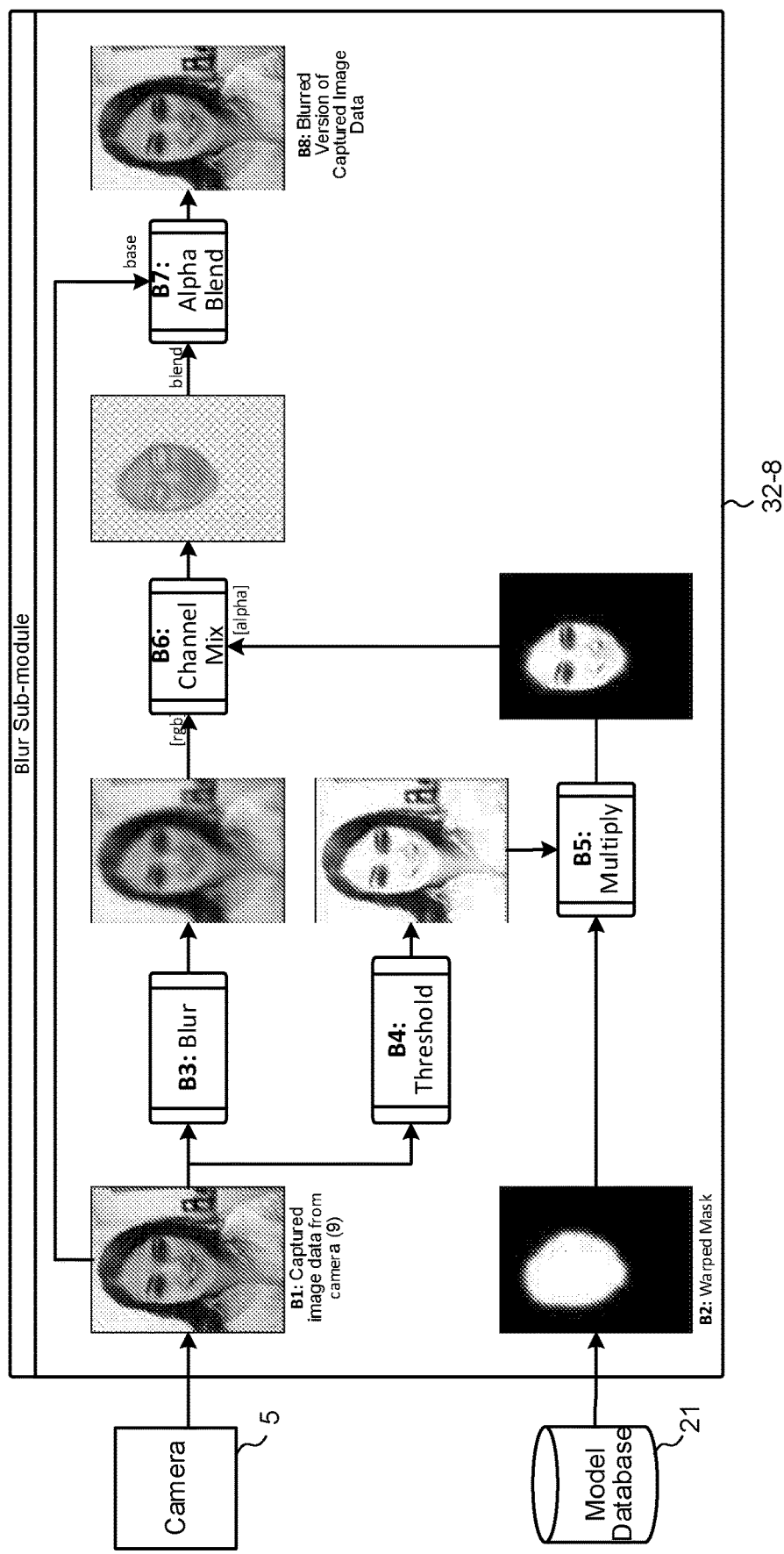
FIG. 48 schematically illustrates an example process for generating a blurred version of the captured image data.

FIG. 48 schematically illustrates an example process for generating a blurred version of the captured image data, which is particularly optimal in the context of applying virtual foundation make-up in a augmented reality system 3601. As shown in FIG. 48, a blurring sub-module 32-8 receives the captured image data from the camera 5. At a step B3, the captured image data is blurred by downsampling the input image data to a lower resolution. At a step B4, a threshold function is applied to the pixel values of the captured image data, for example by a function:

$$f(x)=\text{Greyscale}(x)^{\wedge}2.5*5.0$$

the input captured image data. At a step B7, the result of step B6 is alpha blended with the original captured image data. Advantageously, the blurring sub-module 32-8 outputs a resulting image with softened facial features, while maintaining sharp facial features. Although the blurring process in FIG. 48 is described as applied to the entire image as captured by the camera 5, it is appreciated that the blurring process can be applied to just the masked region of the captured image data for improved efficiencies.

Figure 47D:
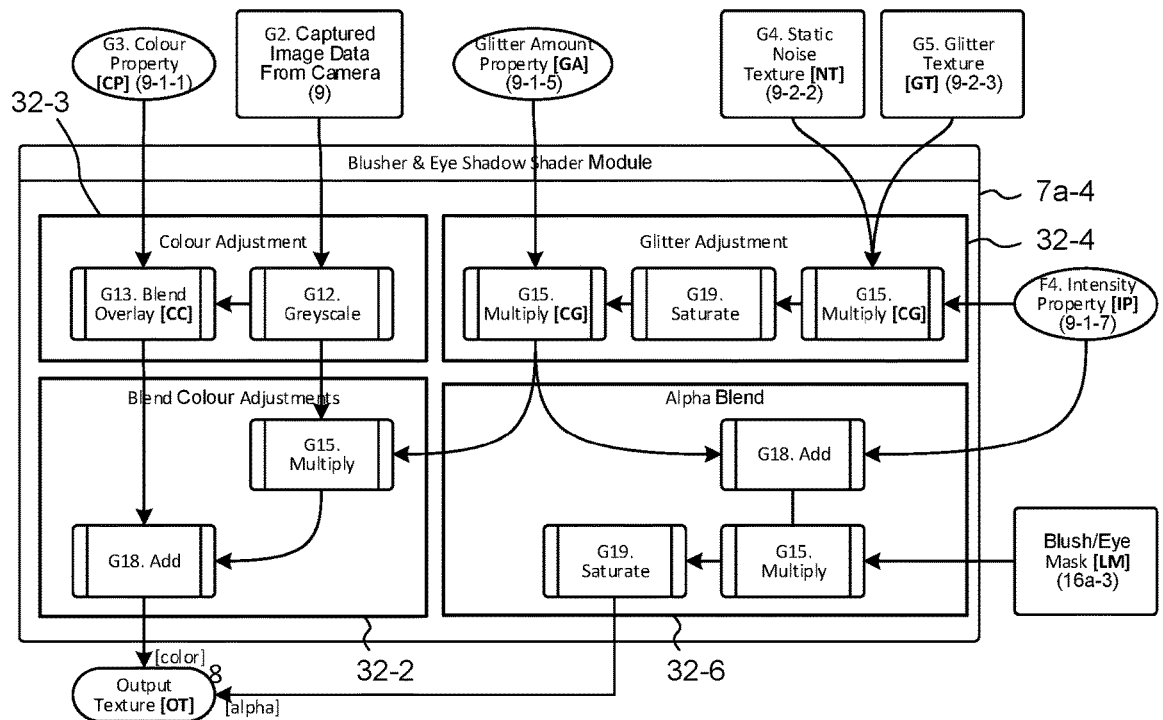

FIG. 47D illustrates an example of a blusher and eyeshadow shader module 7*a*-4 for applying colourisation to yet other portions of the captured image data, based on a corresponding portion of an eye mask 16*a*-2 or a blusher mask 16*a*-3. In this example, the eye mask 16*a*-2 defines the masked portion as the eye portions of a face in the captured image data, and the blusher mask 16*a*-3 defines the masked portion as the cheek portions of a face in the captured image data for example as shown in FIGS. 7D and 34. As shown in FIG. 47D, the colour values of the output texture portion are calculated by applying adjustments to the corresponding portion of the captured image data using the colour adjustment sub-module 32-3 and the blend colour adjustment module 32-2, similarly to the examples discussed above. The alpha blend calculation sub-module 32-7 calculates the corresponding alpha values for the output texture portion, based on the received output from the glitter adjustment sub-module 32-4, an intensity property 9-1-7, and the warped region of the blush or eye mask data 16*a*-3, in a similar manner as the examples discussed above.

Computer Systems

Figure 49:
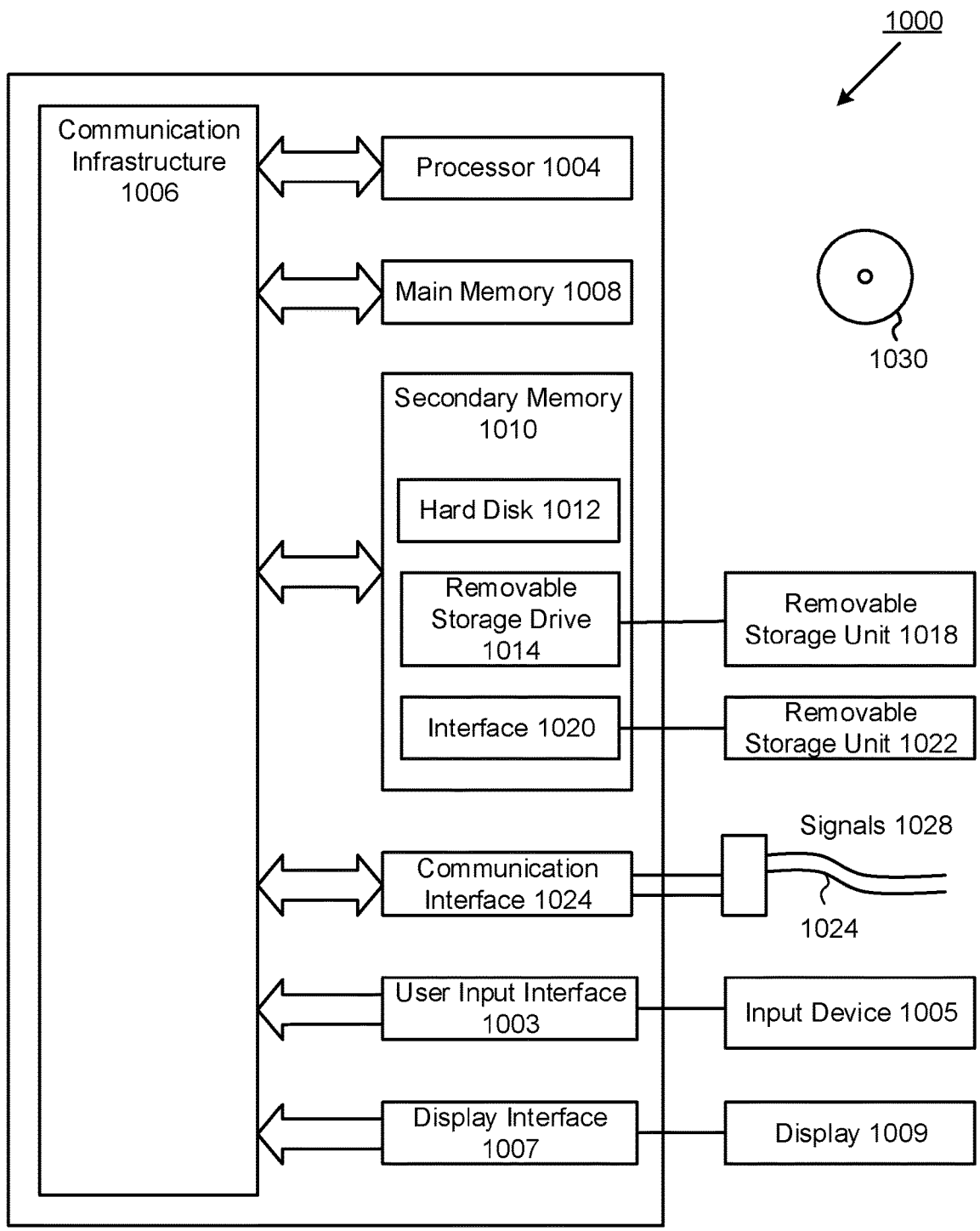
FIG. 49 is a diagram of an example of a computer system on which one or more of the functions of the embodiment may be implemented.

The modules described herein, such as the training, tracking and colourisation modules, may be implemented by a computer system or systems, such as computer system 1000 as shown in FIG. 49. Embodiments of the present invention may be implemented as programmable code for execution by such computer systems 1000.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Computer system 1000 also includes a user input interface 1003 connected to one or more input device(s) 1005 and a display interface 1007 connected to one or more display(s) 1009, which may be integrated input and display components. Input devices 1005 may include, for example, a pointing device such as a mouse or touchpad, a keyboard, a touchscreen such as a resistive or capacitive touchscreen, etc.

Computer system 1000 also includes a main memory 1008, preferably random access memory (RAM), and may also include a secondary memory 1010. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Various software implementations are described in terms of this exemplary computer system. Alternative embodiments may be implemented as control logic in hardware, firmware, or software or any combination thereof.

ALTERNATIVE EMBODIMENTS

It will be understood that embodiments of the present invention are described herein by way of example only, and that various changes and modifications may be made without departing from the scope of the invention. Further alternative embodiments may be envisaged, which nevertheless fall within the scope of the following claims.

For example, it will be appreciated that although the respective processes and associated processing modules are described as separate embodiments, aspects of the described embodiments can be combined to form further embodiments. For example, alternative embodiments may comprise one or more of the object tracking, shape training, texture training and object colourisation and augmentation aspects described in the above embodiments.

In the worked exemplary embodiments described above, the visible feature detector is configured to compute characteristics of foundation, blush, eyeshadow and lipstick makeup products applied to respective regions of a face in the captured image. As those skilled in the art will appreciate, the visible feature detector may be further configured to determine the absence of makeup products applied to one or more of the predefined visible features, whereby characteristics are not computed and provided for those makeup products that are not determined to have been applied to the face.

As yet another alternative, the source image processing module, the tracking module and/or the colourisation module may be provided as one or more distributed computing modules or processing services on a remote server that is in communication with the augmented reality system via a data network. Additionally, as those skilled in the art will appreciate, the source image processing module, the tracking module and/or the colourisation module functionality may be provided as one or more application programming interface (API) accessible by an application program executing on the augmented reality system, or as a plug-in module, extension, embedded code, etc., configured to communicate with the application program.

The invention claimed is:

1. A computer-implemented method of augmenting image data, the method comprising:
receiving data of an image captured by a camera, the captured image including a region having a visible subject facial feature of subject face;
processing training images to generate and store at least one trained shape model, wherein the training images each comprise an entire subject face including one or more subject facial features, and the training images further include the subject face in a plurality of different orientations and the subject facial features in a plurality of different poses;
processing the captured image data to identify the visible subject facial feature;
storing mask data based on the at least one trained shape model defining a group of masks associated with the identified visible subject facial feature, wherein each mask in the group of masks
is associated with one of the subject face in one of the plurality of different orientations and the subject facial features in one of the plurality of different poses, and the identified visible subject facial feature in the captured image, and
defines a respective masked portion of the region of the captured image corresponding to at least one polygonal region defined by three or more vertices, and
wherein the mask data further defines, for the group of masks, at least one sampling location in or relative to the corresponding at least one polygonal region;
retrieving the defined at least one sampling location associated with the identified visible subject facial feature;
sampling pixel values of the captured image data at the retrieved at least one sampling location;
identifying and retrieving, based on a trained classifier, a selected one of the group of masks that matches the identified visible subject facial feature, wherein the trained classifier is trained on the training images including the subject face in the plurality of different orientations and the subject facial features in the plurality of different poses;
determining a masked portion of the captured image using the selected at least one mask;
modifying pixel values in the determined masked portion based on colourisation parameters; and
outputting the captured image with the modified pixel values for display.

2. The method of claim 1, wherein the determining and retrieving the selected one of the group of masks further comprises generating a subject facial feature descriptor based on the sampled pixel values, and identifying a selected one of the group of masks based on the subject facial feature descriptor.

3. The method of claim 1, further comprising storing the at least one trained shape model defining a shape representation of the subject face, the shape representation identifying locations of a plurality of labelled points, at least a subset of said plurality of labelled points associated with the visible subject facial feature of the subject face.

4. The method of claim 3, further comprising determining a location of the subject face in the captured image.

5. The method of claim 4, wherein the determining the location comprises modifying, based on the identified locations of the plurality of labelled points in the captured image, an instance of the at least one trained shape model to fit the subject face in the captured image.

6. The method of claim 5, further comprising determining a transformation of the at least one polygonal region of a mask based on determined coordinates of the corresponding plurality of labelled points of the modified instance of the the at least one trained shape model.

7. The method of claim 6, wherein the colourisation parameters comprise data defining at least one texture image defining values to augment said masked portion of said captured image.

8. The method of claim 7, further comprising applying the determined transformation to corresponding regions of the at least one texture image data.

9. The method of claim 1, wherein at least one masked region comprises a plurality of discontinuous regions of pixels.

10. The method of claim 1, wherein the captured image is one of a captured sequence of images, and wherein the subject face is tracked from one image to a next image in the captured sequence of images.

11. The method of claim 1, wherein the at least one trained shape model includes a plurality of modes of variation, wherein each mode of the plurality of modes of variation describes deviations from a same mean shape of the at least one trained shape model.

12. The method of claim 11, wherein the deviations from the same mean shape of the at least one trained shape model are associated with the subject face in the plurality of different orientations and the subject facial features in the plurality of different poses.

13. A system for augmenting image data, the system comprising:
a memory; and
a processor, the processor configured to:
receive data of an image captured by a camera, the captured image including a region having a visible subject facial feature of a subject face;
process training images to generate and store at least one trained shape model, wherein the training images each comprise an entire subject face including one or more subject facial features, and the training images further include the subject face in a plurality of different orientations and the subject facial features in a plurality of different poses;
process the captured image data to identify the visible subject facial feature;
store, in the memory, mask data based on the at least one trained shape model defining the group of masks associated with the identified visible subject facial feature, wherein each mask in the group of masks
is associated with one of the subject face in one of the plurality of different orientations and the subject facial features in one of the plurality of different poses, and the identified visible subject facial feature in the captured image, and
defines a respective masked portion of the region of the captured image corresponding to at least one polygonal region defined by three or more vertices, and
wherein the mask data further defines, for the group of masks, at least one sampling location in or relative to the corresponding at least one polygonal region;
retrieve the defined at least one sampling location associated with the identified visible subject facial feature;
sample pixel values of the captured image data at the retrieved at least one sampling location;
identify and retrieve, based on a trained classifier, a selected one of the group of masks that matches the identified visible subject facial feature, wherein the trained classifier is trained on the training images including the subject face in the plurality of different orientations and the subject facial features in the plurality of different poses;
determine a masked portion of the captured image using the selected mask;
modify pixel values in the defined representative masked portion based on colourisation parameters; and
output the captured image with the modified pixel values for display.

14. A non-transitory computer-readable medium storing computer code in a memory for controlling a processor to cause the processor to augment image data, the computer code including instructions to cause the processor to:
receive data of an image captured by a camera, the captured image including a region having a visible subject facial feature of subject face;
process training images to generate and store at least one trained shape model, wherein the training images each comprise an entire subject face including one or more subject facial features, and the training images further include the subject face in a plurality of different orientations and the subject facial features in a plurality of different poses;
process the captured image data to identify the visible subject facial feature;
store, in the memory, mask data based on the at least one trained shape model defining a group of masks associated with the identified visible subject facial feature, wherein each mask in the group of masks
is associated with one of the subject face in one of the plurality of different orientations and the subject facial features in one of the plurality of different poses, and the identified visible subject facial feature in the captured image, and
defines a respective masked portion of the region of the captured image corresponding to at least one polygonal region defined by three or more vertices, and
wherein the mask data further defines, for the group of masks, at least one sampling location in or relative to the corresponding at least one polygonal region;
retrieve the defined at least one sampling location associated with the identified visible subject facial feature;
sample pixel values of the captured image data at the retrieved at least one sampling location;
identify and retrieve, based on a trained classifier, a selected one of the group of masks that matches the identified visible subject facial feature, wherein the trained classifier is trained on the training images including the subject face in the plurality of different orientations and the subject facial features in the plurality of different poses;
determine a masked portion of the captured image using the selected mask;
modify pixel values in the defined respective masked portion based on colourisation parameters; and
output the captured image with the modified pixel values for display.

* * * * *